United States Patent
Kurelowech

(10) Patent No.: US 10,184,684 B2
(45) Date of Patent: Jan. 22, 2019

(54) HEAT RECOVERY AND DEMAND VENTILATION SYSTEM

(71) Applicant: Richard S Kurelowech, Phoenix, AZ (US)

(72) Inventor: Richard S Kurelowech, Phoenix, AZ (US)

(*) Notice: Subject to any disclaimer, the term of this patent is extended or adjusted under 35 U.S.C. 154(b) by 0 days.

(21) Appl. No.: 14/121,378

(22) Filed: Aug. 26, 2014

(65) Prior Publication Data

US 2016/0370029 A1    Dec. 22, 2016

Related U.S. Application Data

(63) Continuation-in-part of application No. 13/135,099, filed on Jun. 24, 2011, now abandoned, which is a
(Continued)

(51) Int. Cl.
| | |
|---|---|
| F24F 12/00 | (2006.01) |
| F24F 13/10 | (2006.01) |
| F24F 11/00 | (2018.01) |
| F24F 110/70 | (2018.01) |
| F24F 110/30 | (2018.01) |
| F24F 11/64 | (2018.01) |

(52) U.S. Cl.
CPC .......... F24F 12/006 (2013.01); F24F 13/10 (2013.01); *F24F 11/64* (2018.01); *F24F 2011/0006* (2013.01); *F24F 2012/007* (2013.01); *F24F 2110/30* (2018.01); *F24F 2110/70* (2018.01); *Y02B 30/563* (2013.01); *Y02B 30/78* (2013.01)

(58) Field of Classification Search
USPC ....... 454/234, 233, 251; 165/58, 59, 66, 164
See application file for complete search history.

(56) References Cited

U.S. PATENT DOCUMENTS

| | | | | |
|---|---|---|---|---|
| 2,134,143 | A | * | 10/1938 | Paget .......... F24F 7/02 137/625 |
| 2,711,086 | A | * | 6/1955 | Eilers .......... F24F 1/02 29/33 D |

(Continued)

FOREIGN PATENT DOCUMENTS

| | | | | | |
|---|---|---|---|---|---|
| JP | 58178135 | A | * | 10/1983 | ............ F24F 12/001 |
| JP | 58205031 | A | * | 11/1983 | ............ F24F 12/001 |

(Continued)

*Primary Examiner* — Gregory Huson
*Assistant Examiner* — Frances F Hamilton
(74) *Attorney, Agent, or Firm* — Tod R. Nissle, P.C.

(57) ABSTRACT

A ventilation system for an air conditioning system includes dampers, a heat exchange unit, and a control unit. One damper controls the flow of ambient air into the system. The other damper controls the flow of relief/exhaust air that is utilized to scavenge energy from return air from a room or space being cooled (or heated) by the air conditioning system. The ventilation system utilizes a control algorithm in the control unit to calculate, at stepped spaced apart increasing room ventilation rates, increasing CO2 concentrations in the air in the room that are below a maximum desired CO2 concentration in a room. The control algorithm permits a control unit in the ventilation system to open and close the dampers to maintain a CO2 concentration in the room that is below the desired CO2 concentration level.

12 Claims, 39 Drawing Sheets

Related U.S. Application Data continuation-in-part of application No. 12/807,018, filed on Aug. 26, 2010, now abandoned.

(56) References Cited

U.S. PATENT DOCUMENTS

| | | | |
|---|---|---|---|
| 2,749,833 A * | 6/1956 | Hekelaar | B60H 1/00685 137/499 |
| 4,227,645 A | 10/1980 | De La Farge et al. | |
| 4,382,725 A * | 5/1983 | Dugge | B61D 7/08 222/485 |
| 4,436,090 A * | 3/1984 | Darling | A61M 16/20 128/204.26 |
| 4,841,733 A | 6/1989 | Dussault et al. | |
| 4,995,307 A | 2/1991 | Floyd | |
| 5,129,225 A * | 7/1992 | Tonks | F01D 17/148 251/304 |
| 5,290,188 A * | 3/1994 | Kiser | F24F 3/044 454/234 |
| 5,292,280 A | 3/1994 | Janu et al. | |
| 5,297,392 A | 3/1994 | Takata et al. | |
| 5,309,725 A | 5/1994 | Cayce | |
| 5,348,077 A | 9/1994 | Hillman | |
| 5,544,809 A | 8/1996 | Keating et al. | |
| 5,564,979 A * | 10/1996 | Sumiya | B60H 1/00685 454/121 |
| 5,674,125 A | 10/1997 | Xia et al. | |
| 5,725,148 A | 3/1998 | Hartman | |
| 5,741,180 A | 4/1998 | Xia et al. | |
| 5,938,527 A * | 8/1999 | Oshima | F24F 1/01 454/303 |
| 6,049,299 A | 4/2000 | Lunacek et al. | |
| 6,711,913 B1 | 3/2004 | Tung | |
| 6,857,281 B2 * | 2/2005 | Wightman | F16K 3/0209 236/92 B |
| 6,915,648 B2 * | 7/2005 | Wightman | F16K 3/0209 236/92 B |
| 7,090,575 B2 * | 8/2006 | Ito | B60H 1/00678 251/314 |
| 7,411,489 B1 | 8/2008 | Elwell et al. | |
| 7,475,828 B2 | 1/2009 | Bartlett et al. | |
| 7,575,044 B2 * | 8/2009 | Choi | F24F 7/08 165/103 |
| 7,967,669 B2 | 6/2011 | Baik | |
| 8,226,068 B2 * | 7/2012 | Azar | B60H 1/00678 251/314 |
| 9,121,625 B2 * | 9/2015 | Barcroft | F24F 13/18 |
| 9,470,432 B2 * | 10/2016 | Stenfors | F24F 12/006 |
| 9,551,502 B2 * | 1/2017 | Kim | F24F 7/00 |
| 2002/0134849 A1 | 9/2002 | Disser | |
| 2003/0109215 A1 | 6/2003 | Goncalves et al. | |
| 2005/0156052 A1 | 7/2005 | Bartlett et al. | |
| 2006/0117769 A1 | 6/2006 | Helt et al. | |
| 2006/0184283 A1 | 8/2006 | Lee et al. | |
| 2006/0196953 A1 | 9/2006 | Simon et al. | |
| 2006/0270335 A1 * | 11/2006 | Kim | F24F 3/147 454/237 |
| 2007/0044787 A1 | 3/2007 | Brice | |
| 2007/0045431 A1 | 3/2007 | Chapman | |
| 2007/0063059 A1 | 3/2007 | Votaw et al. | |
| 2007/0205297 A1 | 9/2007 | Finkam et al. | |
| 2007/0218827 A1 * | 9/2007 | Baik | F24F 13/1406 454/246 |
| 2007/0218830 A1 * | 9/2007 | Baik | F24F 13/14 454/323 |
| 2008/0003940 A1 | 1/2008 | Haglid | |
| 2008/0076346 A1 | 3/2008 | Ahmed | |
| 2008/0250800 A1 | 10/2008 | Betzel | |
| 2009/0236432 A1 | 9/2009 | Malloy | |
| 2010/0019051 A1 | 1/2010 | Rosen | |
| 2010/0178863 A1 | 7/2010 | Coward | |
| 2010/0224253 A1 * | 9/2010 | Azar | B60H 1/00678 137/1 |
| 2011/0088417 A1 * | 4/2011 | Kayser | F24F 3/1423 62/94 |
| 2011/0287707 A1 * | 11/2011 | Baik | F24F 13/14 454/333 |
| 2012/0064818 A1 * | 3/2012 | Kurelowech | F24F 12/006 454/251 |
| 2012/0171949 A1 * | 7/2012 | Baik | F24F 13/1406 454/333 |
| 2015/0126104 A1 * | 5/2015 | Ooes | B60H 1/34 454/254 |
| 2016/0245541 A1 * | 8/2016 | Karamanos | G05D 7/0635 |
| 2016/0341439 A1 * | 11/2016 | Karamanos | F24F 11/0078 |

FOREIGN PATENT DOCUMENTS

| | | |
|---|---|---|
| JP | 03267524 A | 11/1991 |
| JP | 3963936 B1 | 8/2007 |
| JP | 4092362 B1 | 5/2008 |
| JP | 2008224108 A | 9/2008 |
| JP | 2008224109 A | 9/2008 |
| JP | 2008281241 A | 11/2008 |
| JP | 2009186137 A | 8/2009 |

* cited by examiner

Fig. 1 (CHR/HHR)

Fig. 2 (ENHR)

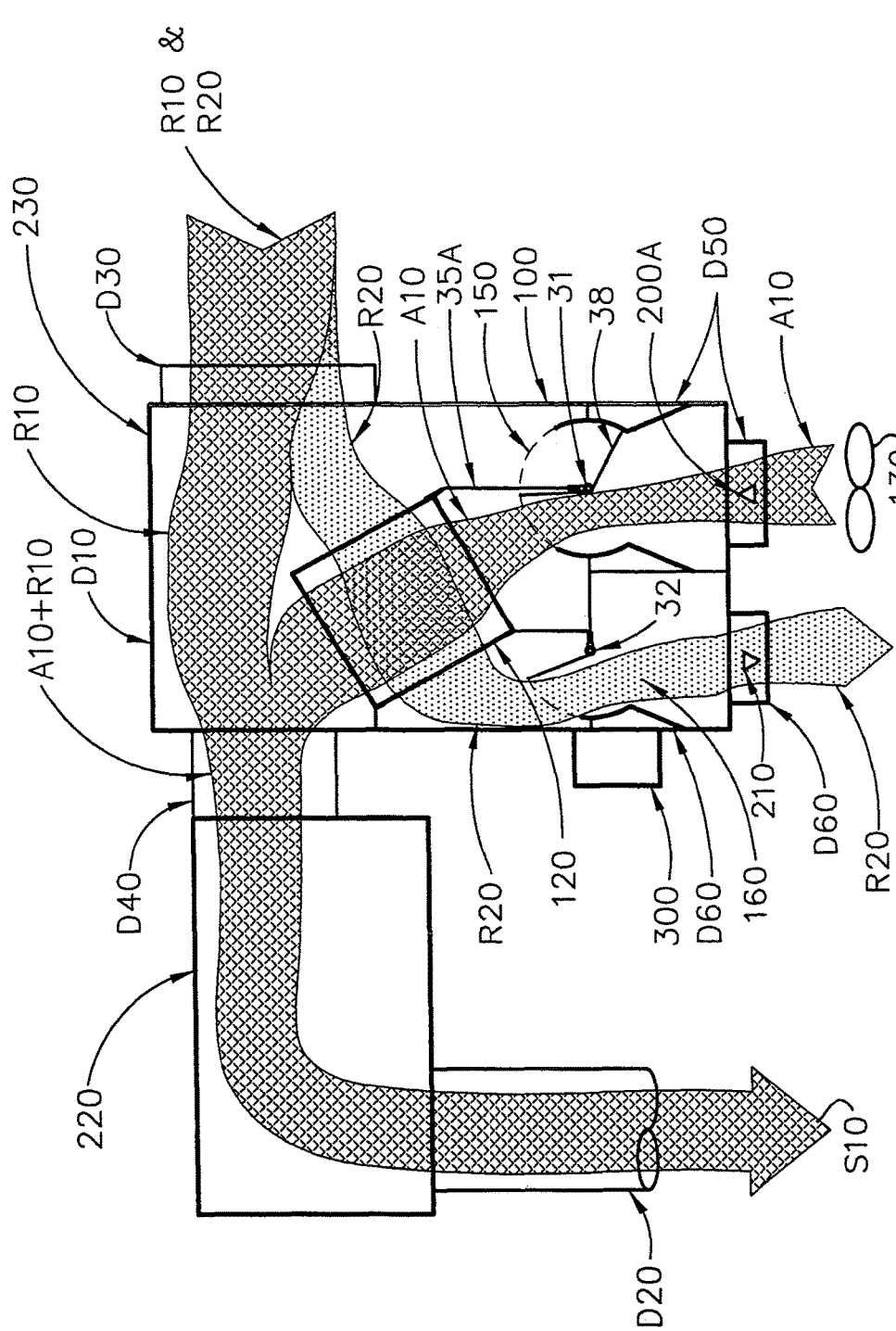
FIG. 6 (CHR/HHR)

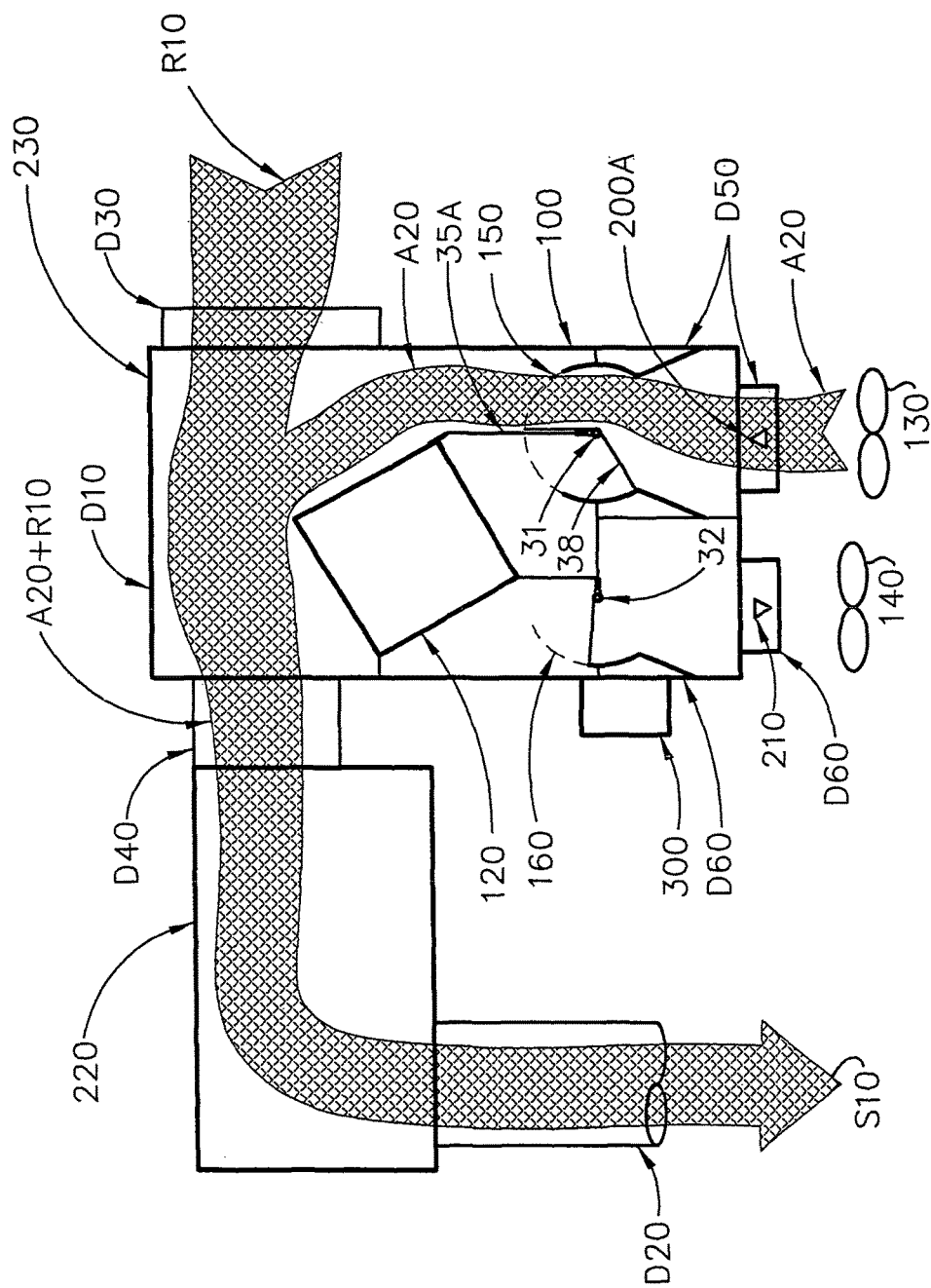
FIG. 7 (ENHR)

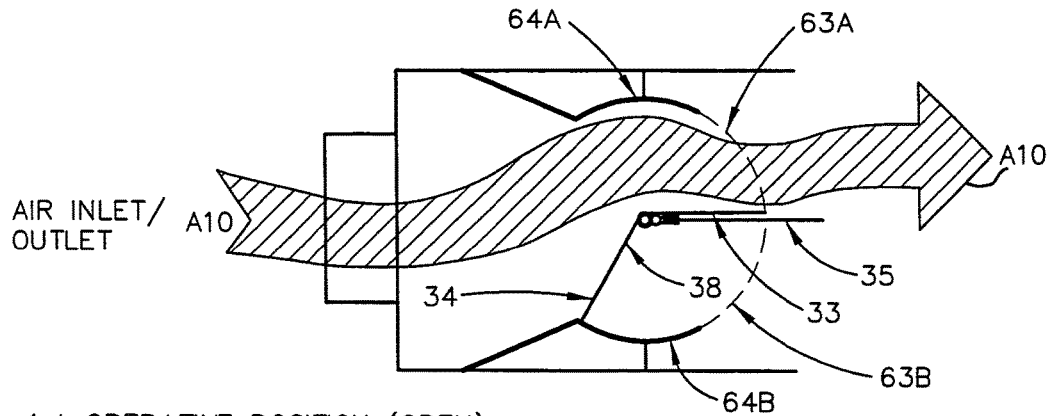
1st OPERATIVE POSITION (OPEN)
FIG. 8A PRIMARY AIR FLOW
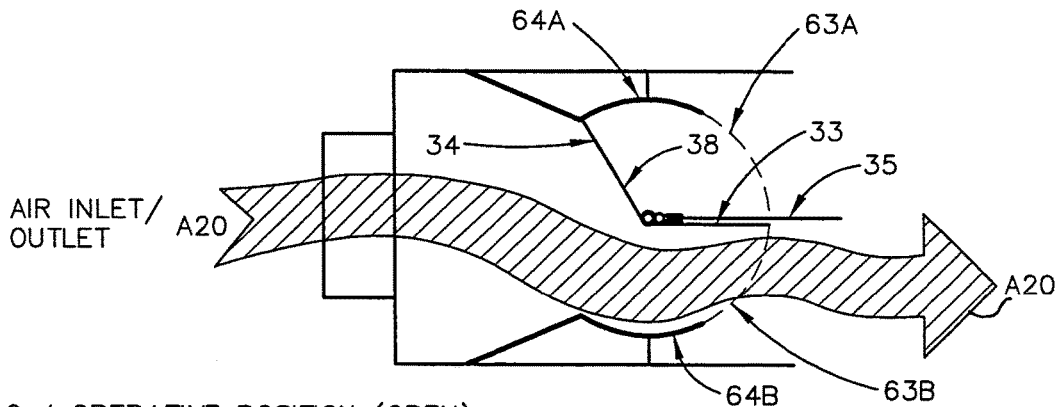
2nd OPERATIVE POSITION (OPEN)
FIG. 8B DIVERGED AIR FLOW
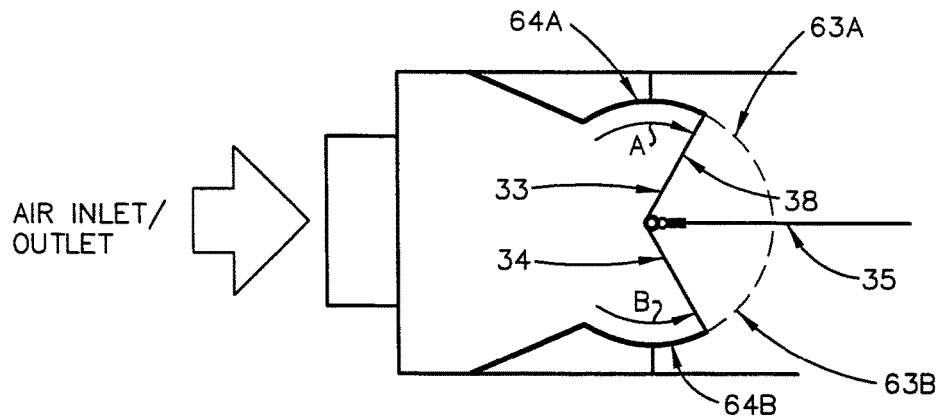
3rd OPERATIVE POSITION (CLOSED)
FIG. 8C AIR FLOW SHUT OFF

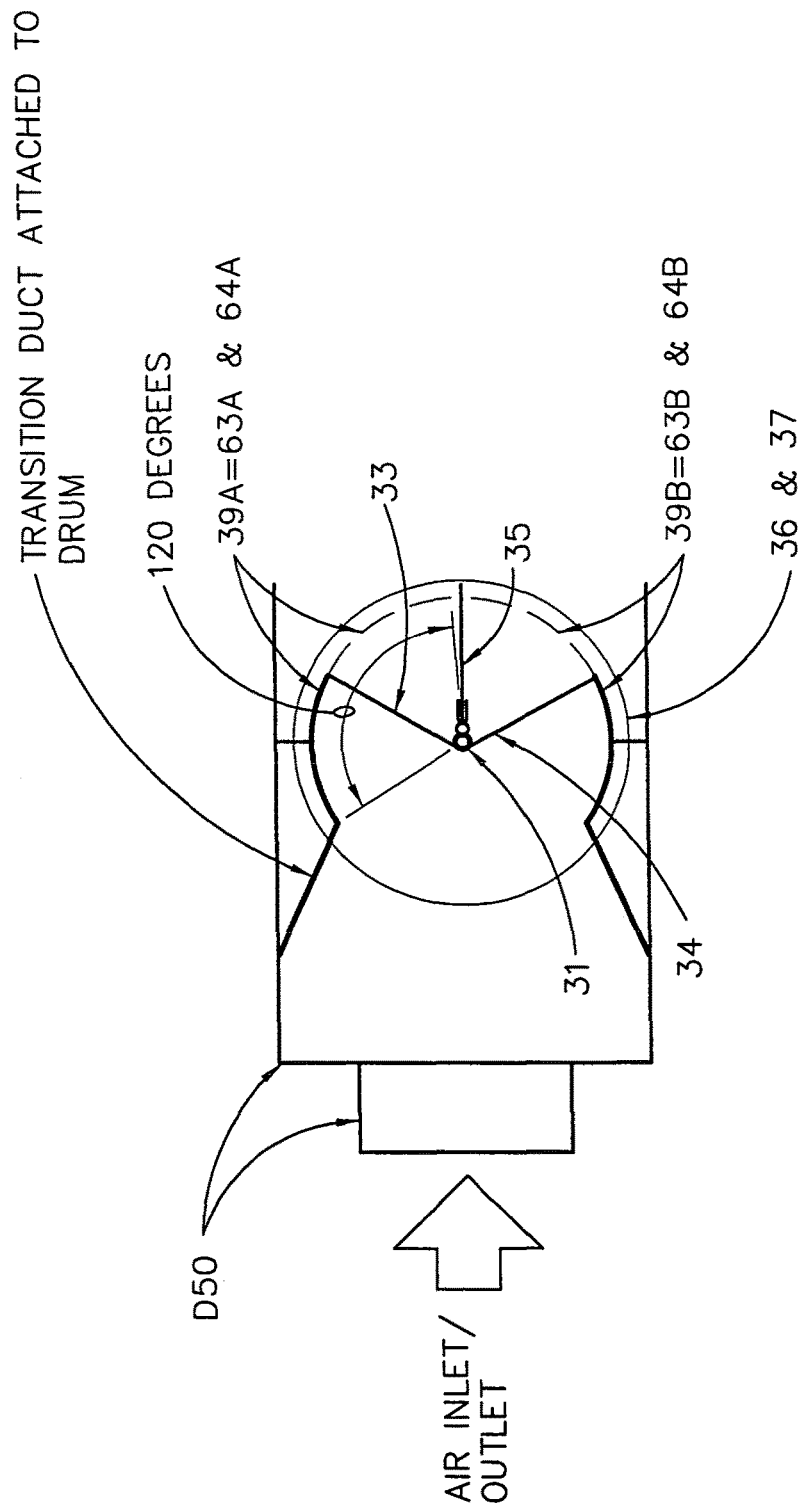
Fig. 9 (Plan View)

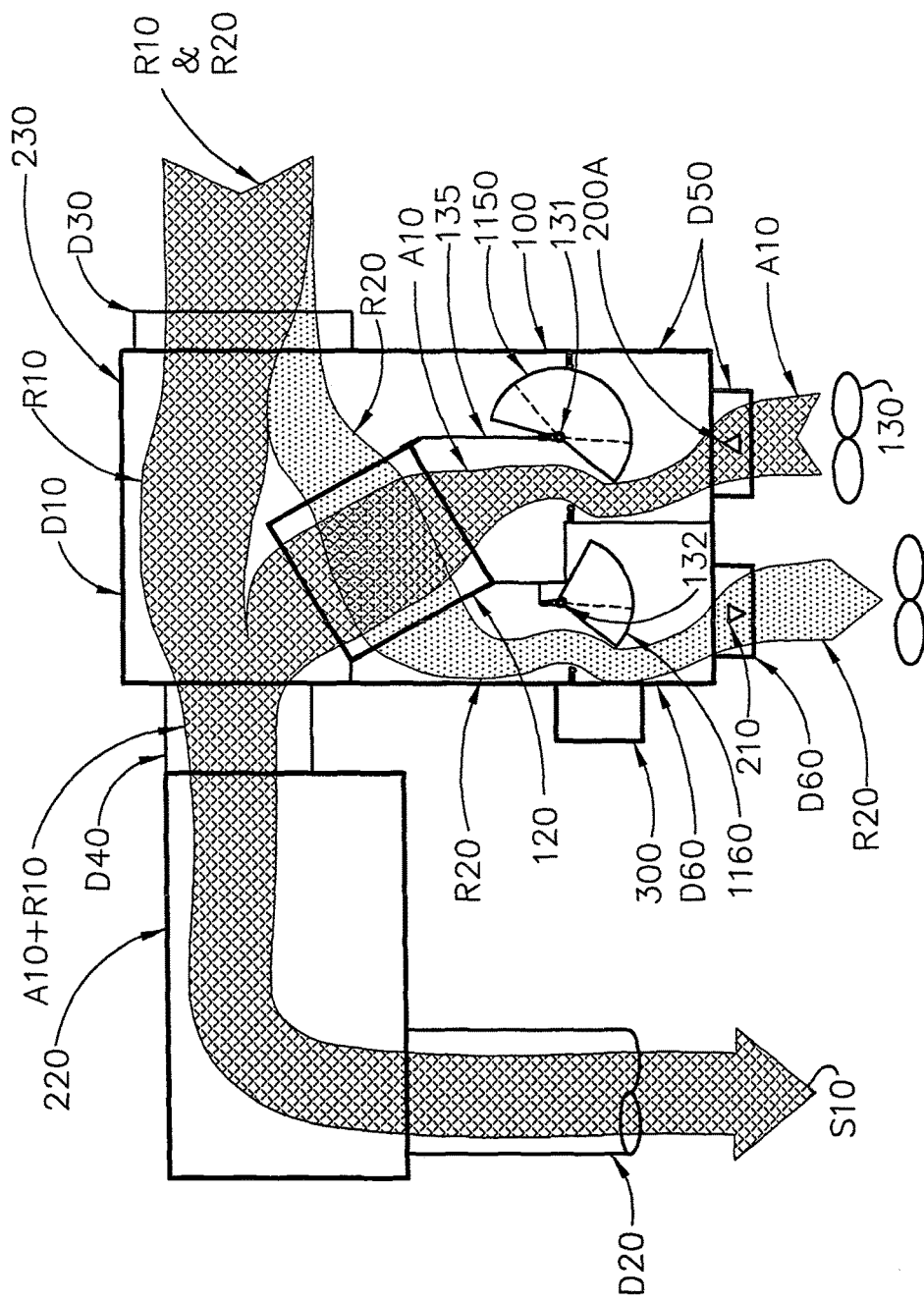
FIG. 16 (CHR/HHR)

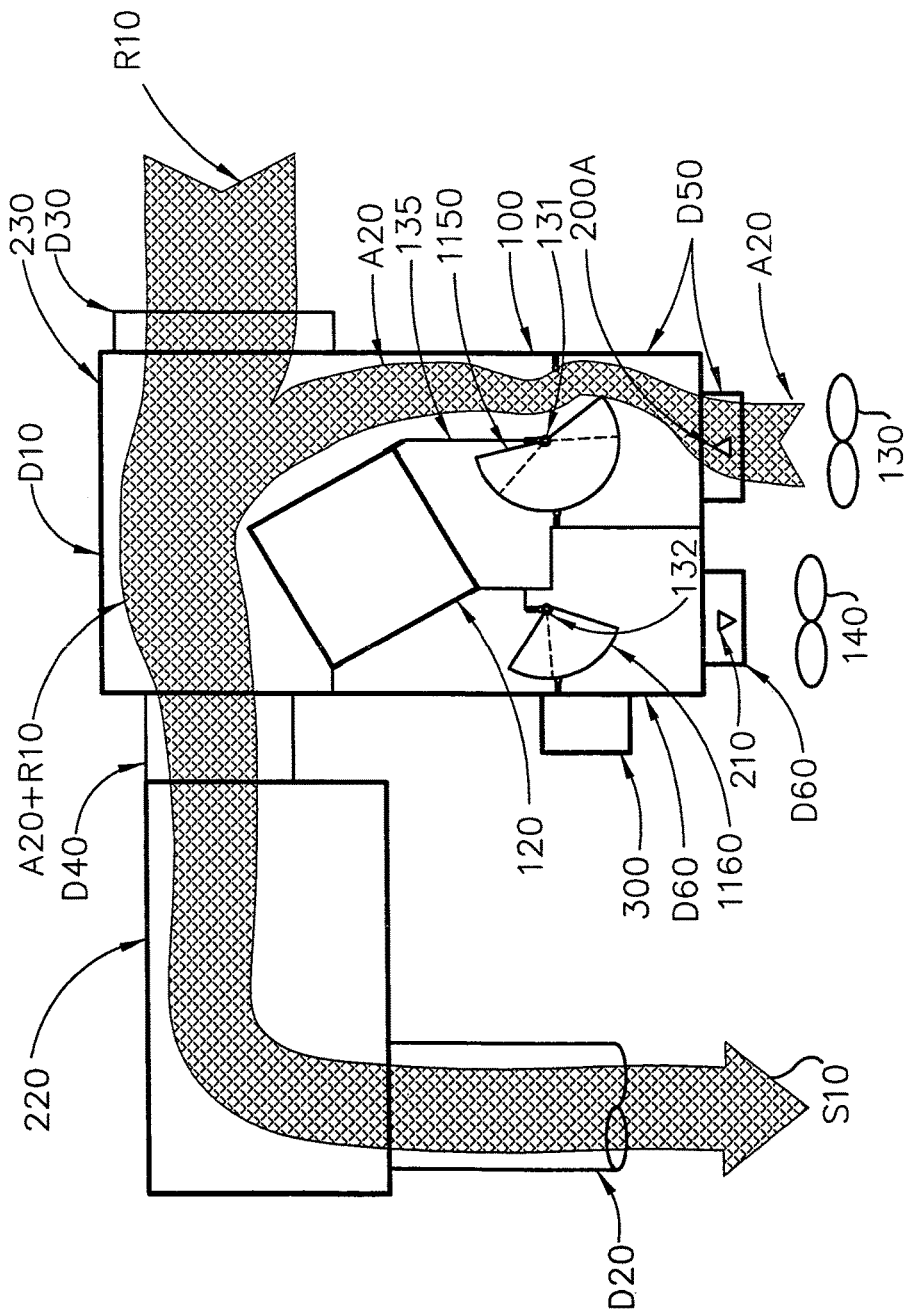
FIG. 17 (ENHR)

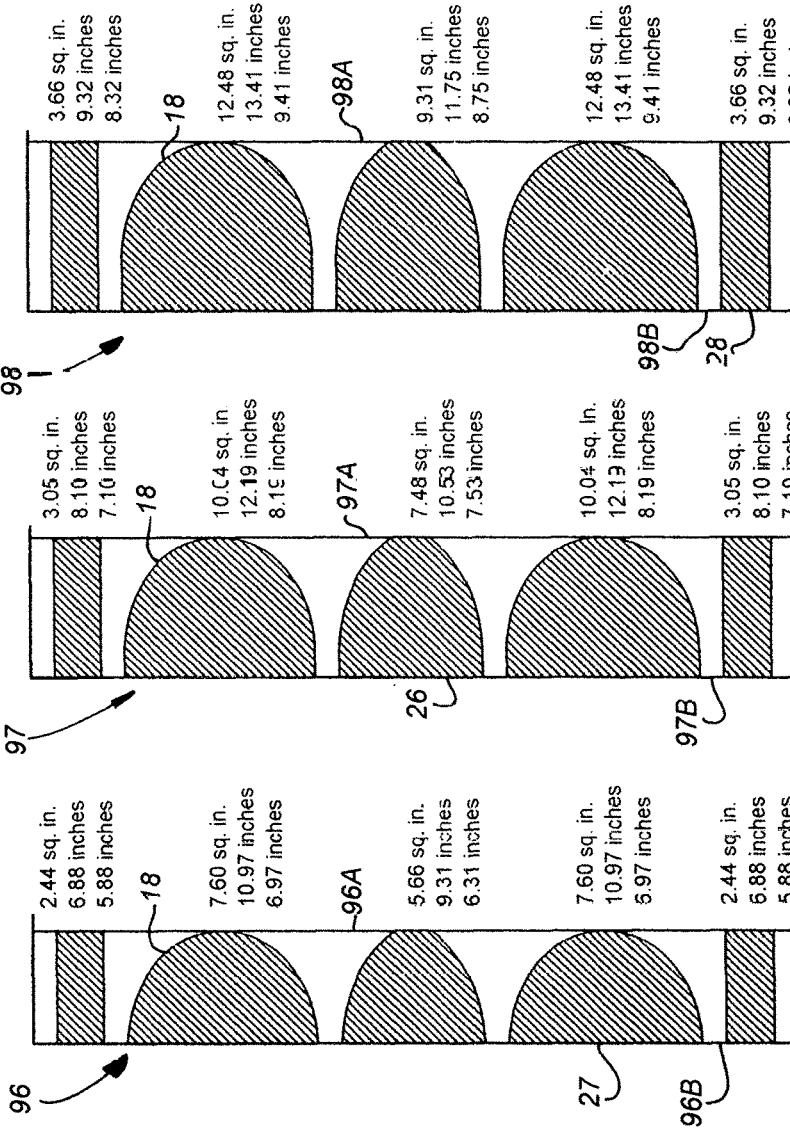

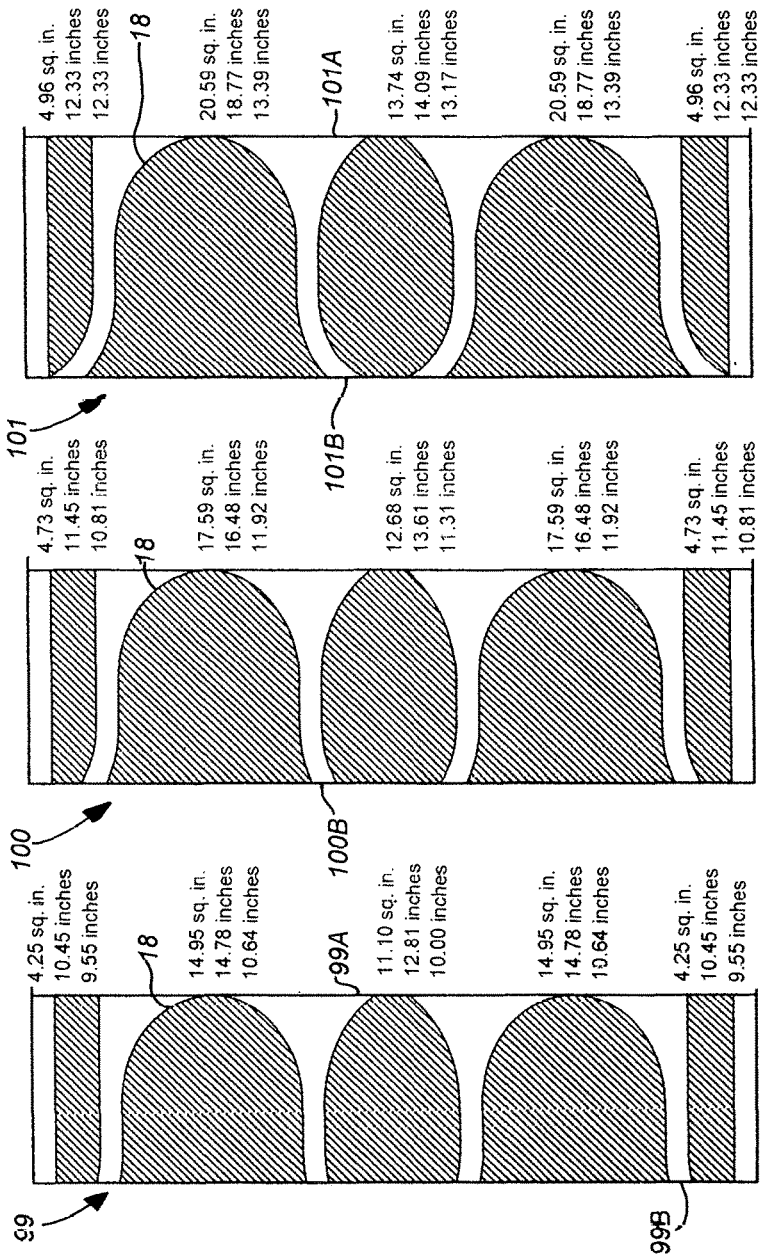

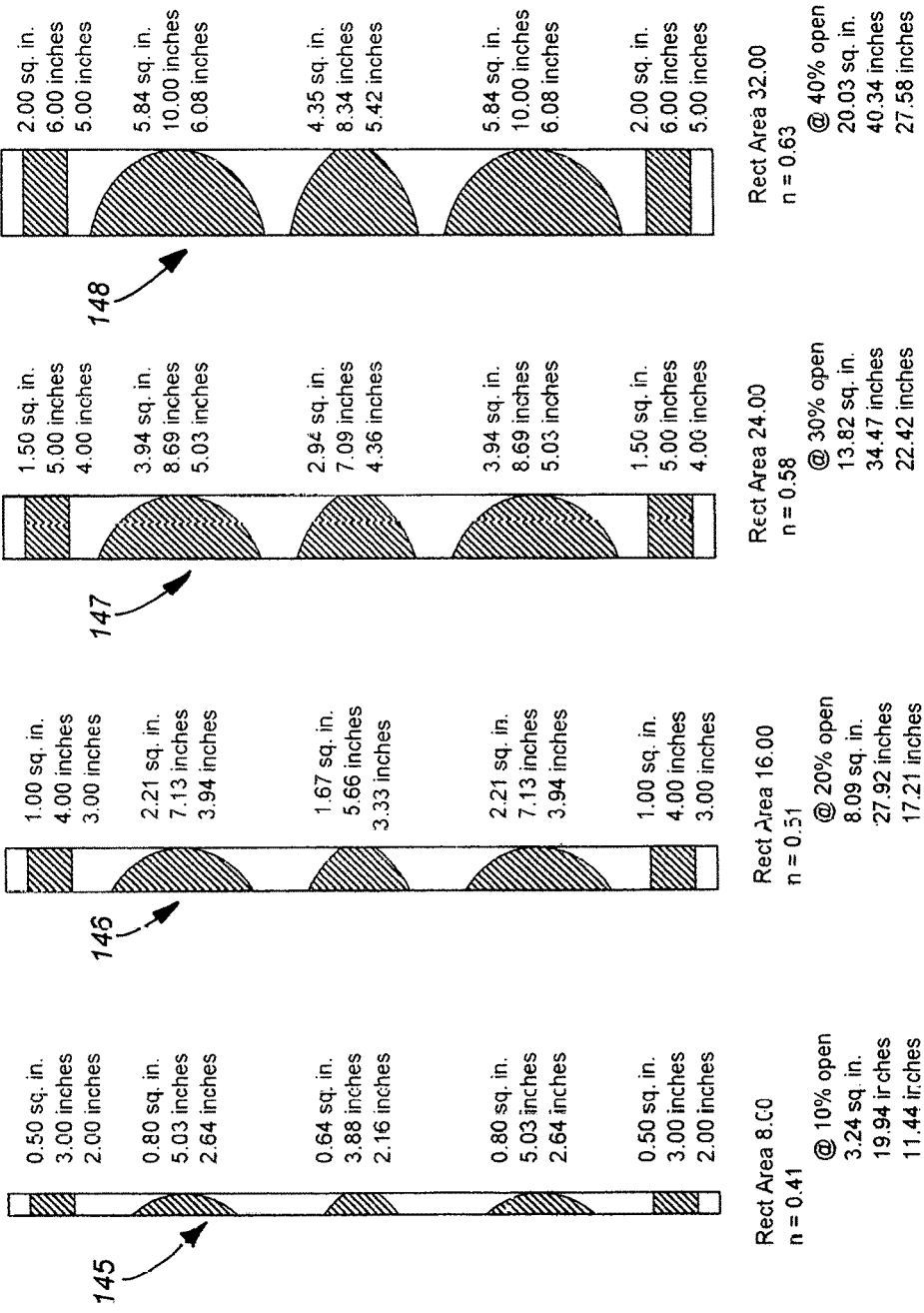

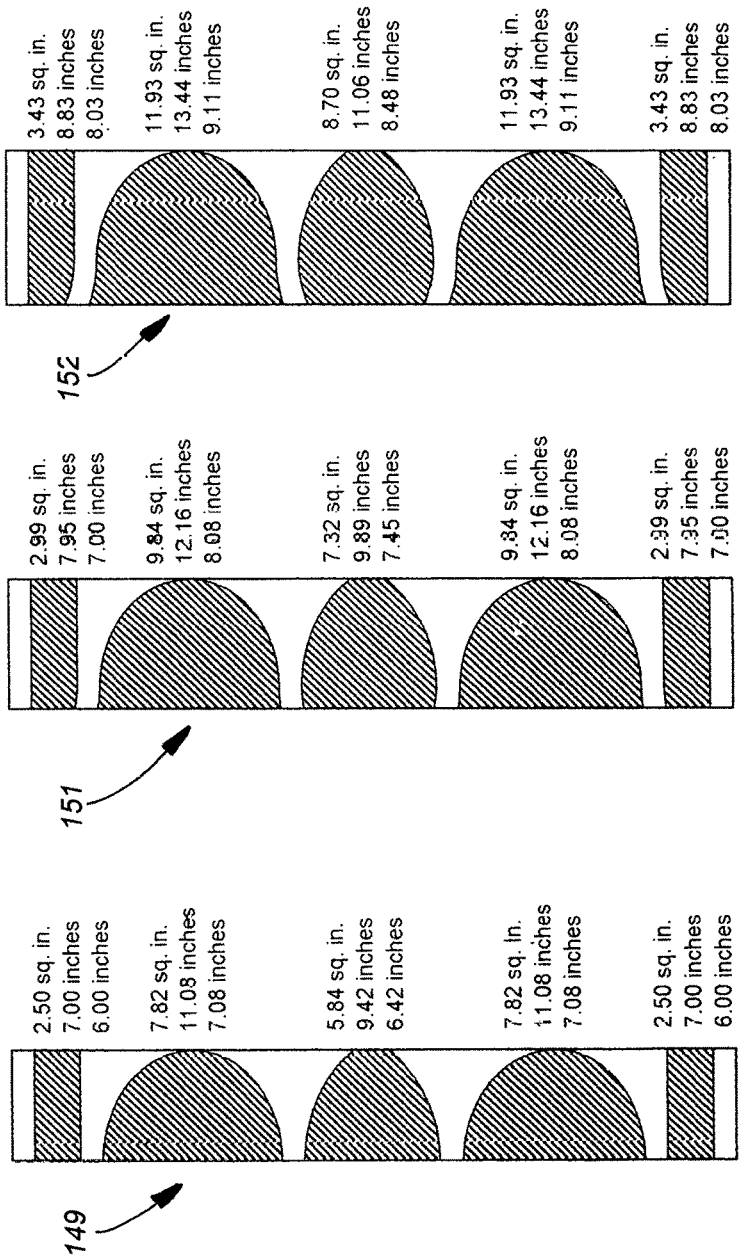

HEAT RECOVERY AND DEMAND VENTILATION SYSTEM

CROSS-REFERENCE TO RELATED APPLICATIONS

This application is a continuation-in-part of application Ser. No. 13/135,099, filed Jun. 24, 2011, which is a continuation-in-part of application Ser. No. 12/807,018, filed Aug. 26, 2010.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WED)

Not Applicable.

STATEMENT REGARDING PRIOR DISCLOSURE BY THE INVENTOR OR A JOINT INVENTOR

Not Applicable.

BACKGROUND OF THE INVENTION (1) Field of the Invention

This invention relates to heating and air conditioning systems.

More particularly, the invention relates to a system to facilitate ventilation air heat recovery and volume management while maintaining a high indoor air quality for human occupants. This invention will substantially reduce the energy consumption of heating and air conditioning systems in commercial and institutional buildings with high occupant densities (greater than 20 people per 1,000 square feet of occupied space).

(2) Description of Related Art Including Information Disclosed Under 37 CFR 1.97 and 1.98

Commercial and institutional buildings have long been equipped with constant air volume ventilation systems which employ a means for outside air to enter and leave the building. Recent technology also employs ventilation air volume control utilizing CO2 sensors and operable dampers. Such systems are controlled using a single point CO2 level as the ventilation reference value and the objective is to prevent objectionable odors and vapors from accumulating in buildings.

It has for many years been desirable to provide, when possible, improvements to such ventilation air systems.

Therefore, it is a principal objective of this invention to provide an improved system to ventilate a building in the most cost effective, energy efficient manner, and meet the requirements of indoor air quality standards developed by recognized authorities in the industry, specifically, ASHRAE Standard 62.1-2010.

BRIEF DESCRIPTION OF THE SEVERAL VIEWS OF THE DRAWINGS

This and other further objects will be apparent to those skilled in the art from the following detailed description thereof, taken in conjunction with the drawings, in which:

FIG. 6 is a top view illustrating a retrofit module constructed in accordance with another embodiment of the invention and installed in a pre-existing air conditioning or heating system;

FIG. 7 is a top view further illustrating the retrofit module of FIG. 6 and the mode of operation thereof;

FIG. 8A is a top view illustrating a duct-damper assembly in the module of FIG. 6 with the damper in a first operative position;

FIG. 8B is a top view illustrating the duct-damper assembly of FIG. 7 with the damper in a second operative position;

FIG. 8C is a top view illustrating the duct-damper assembly of FIGS. 6 and 7 with the damper in a third operative position;

FIG. 9 is a top view further illustrating portions of the duct-damper assembly of FIG. 8A;

FIG. 16 is a top view illustrating a retrofit module constructed in accordance with another embodiment of the invention and installed in a pre-existing air conditioning or heating system;

FIG. 17 is a top view further illustrating the retrofit module of FIG. 16 and the mode of operation thereof;

FIG. 28 is a view from inside a damper assembly illustrating, when the damper blade is moved to a position in which the damper is 40% open, a rectangular portion of the damper assembly wall and portions of outlet openings formed through the damper assembly wall;

FIG. 29 is a view from inside a damper assembly illustrating, when the damper blade is moved to a position in which the damper is 50% open, a rectangular portion of the damper assembly wall and portions of outlet openings formed through the damper assembly wall;

FIG. 30 is a view from inside a damper assembly illustrating, when the damper blade is moved to a position in which the damper is 60% open, a rectangular portion of the damper assembly wall and portions of outlet openings formed through the damper assembly wall;

FIG. 31 is a view from inside a damper assembly illustrating, when the damper blade is moved to a position in which the damper is 70% open, a rectangular portion of the damper assembly wall and portions of outlet openings formed through the damper assembly wall;

FIG. 32 is a view from inside a damper assembly illustrating, when the damper blade is moved to a position in which the damper is 80% open, a rectangular portion of the damper assembly wall and portions of outlet openings formed through the damper assembly wall;

FIG. 33 is a view from inside a damper assembly illustrating, when the damper blade is moved to a position in which the damper is 90% open, a rectangular portion of the damper assembly wall and portions of outlet openings formed through the damper assembly wall;

FIG. 52 is a view from inside a damper assembly illustrating, when the damper blade is moved to a position in which the damper is 10% open, a rectangular portion of the damper assembly wall and portions of outlet openings formed through the damper assembly wall;

FIG. 53 is a view from inside a damper assembly illustrating, when the damper blade is moved to a position in which the damper is 20% open, a rectangular portion of the damper assembly wall and portions of outlet openings formed through the damper assembly wall;

FIG. 54 is a view from inside a damper assembly illustrating, when the damper blade is moved to a position in which the damper is 30% open, a rectangular portion of the damper assembly wall and portions of outlet openings formed through the damper assembly wall;

FIG. 55 is a view from inside a damper assembly illustrating, when the damper blade is moved to a position in which the damper is 40% open, a rectangular portion of the damper assembly wall and portions of outlet openings formed through the damper assembly wall;

FIG. 56 is a view from inside a damper assembly illustrating, when the damper blade is moved to a position in which the damper is 50% open, a rectangular portion of the damper assembly wall and portions of outlet openings formed through the damper assembly wall;

FIG. 57 is a view from inside a damper assembly illustrating, when the damper blade is moved to a position in which the damper is 60% open, a rectangular portion of the damper assembly wall and portions of outlet openings formed through the damper assembly wall;

FIG. 58 is a view from inside a damper assembly illustrating, when the damper blade is moved to a position in which the damper is 70% open, a rectangular portion of the damper assembly wall and portions of outlet openings formed through the damper assembly wall;

BRIEF SUMMARY OF THE INVENTION

Figure 1:
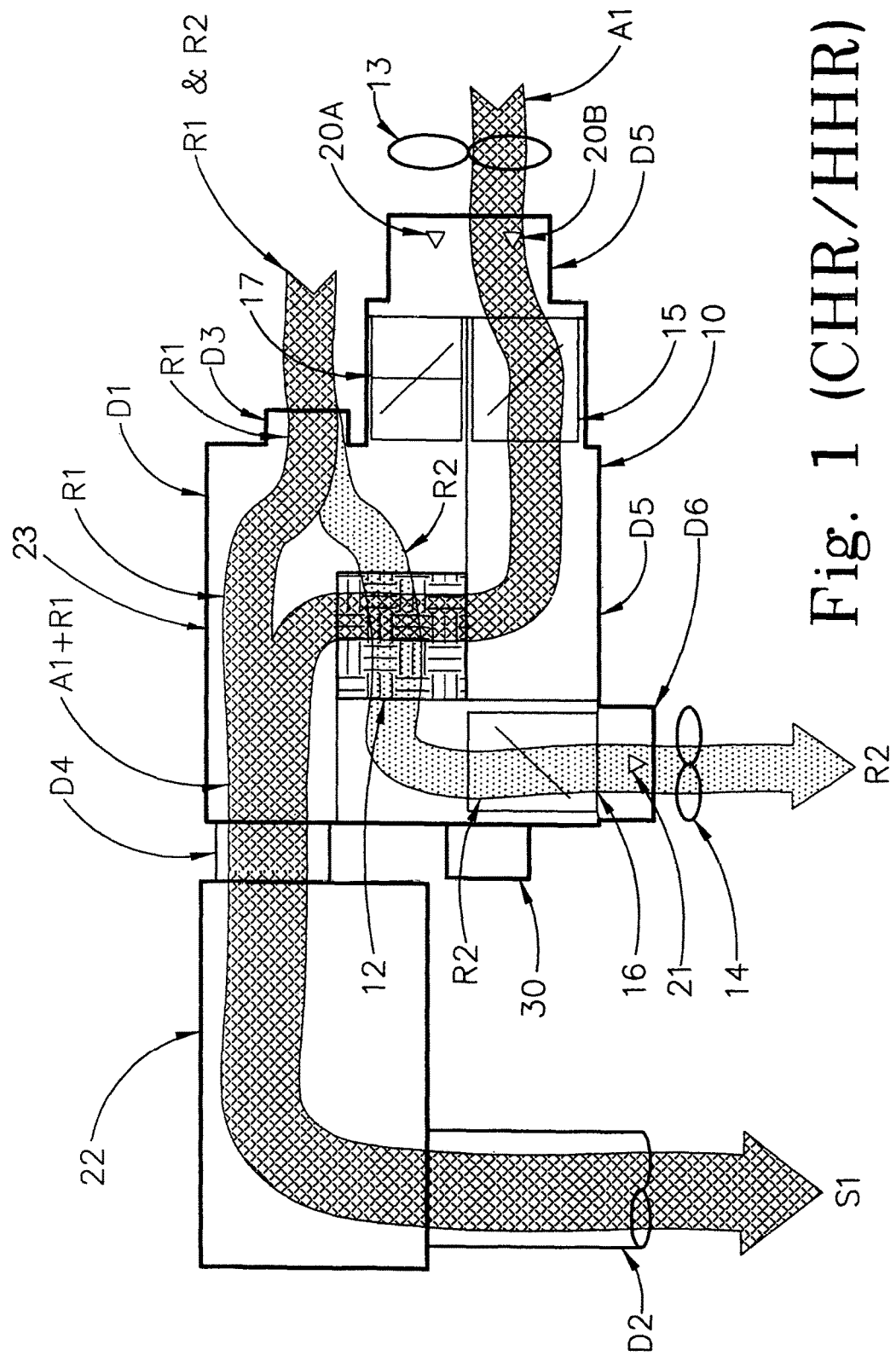
FIG. 1 is a top view illustrating a retrofit module constructed in accordance with one embodiment of the invention and installed in a pre-existing air conditioning or heating system.

Briefly, in accordance with the invention provided are heat recovery and ventilation improvements in combination with a building structure. The building structure includes a room with a minimum occupancy density of 20 people per 1,000 square feet, an air conditioning system including a heat transfer coil, and a first section of duct D4 leading to the heat transfer coil of the air conditioning unit 22 to direct return air from the building structure over the coil. The building structure also includes a second section of duct D2 leading away from the heat transfer coil to carry conditioned (heated or cooled) supply air S1 from the coil back into the building. The ventilation improvements in the building structure comprise a retrofit heat recovery and ventilation control unit (DVHR) connected to the first section of duct D4. The DVHR unit includes a housing; a heat exchange unit 12; a section of duct D5 operatively associated with an outside ambient air source fan 13 to direct ambient air over the heat exchange unit 12 and into the first section of duct D1; an inlet damper 15 controlling the flow of ambient air into duct section D5 and over the heat exchange unit into the first section of duct D1; a section of duct D3 connected to the first section of duct to direct a portion R2 of the return air flowing through the first section of duct over the heat exchange unit and into the duct section D6 directing the air to the outside atmosphere via exhaust/relief fan 14; an outlet damper 16 controlling the flow of the portion of return/exhaust air R2 from the first section of duct D1 over the heat exchange unit and into the outside atmosphere; a control unit 30 operatively associated with the inlet and outlet dampers to control the rates of flow of ambient and exhaust/relief air, respectively, through the dampers; a first flow sensor 20B operatively associated with the inlet damper to generate signals to the control unit representing the rate of flow of ambient air through the inlet damper 15; a second flow sensor 21 operatively associated with the outlet damper 16; and a $CO_2$ sensor in the room to generate signals to the control unit 30 representing the concentration of $CO_2$ in the air in the room. The DVHR also includes a first fan 13 to direct ambient air into the section of duct D5, over the heat exchanger 12, and into the first section of duct D1; a second fan 14 to direct return/exhaust air R2 through the first section of duct D1, through the heat exchanger 12, and through duct section D6 and into the atmosphere. The ventilation control system also includes an algorithm in the control unit 30 to calculate, at stepped spaced apart increasing room ventilation rates corresponding to increases in room occupancy, acceptable $CO_2$ concentrations below a maximum desired $CO_2$ concentration in the room, and to increase or decrease the outside air ventilation rate to achieve the acceptable $CO_2$ concentration.

In another embodiment of the invention, I provide improvements in combination with a building structure. The building structure includes a room with a maximum occupancy rating of at least twenty individuals per 1000 sq. ft. of occupied space, and an air conditioning system. The air conditioning system includes a heat transfer coil; a first section of duct (D4) leading to the heat transfer coil to direct return air from the building structure over the coil; and, a second section of duct (D2) leading away from the heat transfer coil to carry air from the coil back into the building. The improvements in the building structure comprise a retrofit ventilation control unit. The unit is attached to the first section of duct and includes a housing (23); a heat exchange unit (12); a third section of duct (D1) connected to the first section of duct (D4) to direct a first portion of return air from the room into the first section of duct; a fourth section of duct (D3) to direct a second portion of return air from the room over the heat exchange unit; a fifth section of duct (D5) to direct ambient air over the heat exchange unit into the third section of duct (D1). The heat exchange unit maintains the second portion of return air separate from the ambient air and transfers heat between the second portion of return air and the ambient air. The ventilation control unit also includes a sixth section of duct (D6) to direct the first portion of return air from the heat exchange unit into the outside atmosphere; an outlet damper (16) controlling the flow of the second portion of return air over the heat exchange unit (12) and into the outside atmosphere; an inlet damper (15) controlling the flow of the ambient air over the heat exchange unit (12); a control unit operatively associated with the inlet and outlet dampers to control the rate of flow of the ambient air and the second portion of the return air, respectively, through the dampers; a first flow sensor operatively associated with the inlet damper to generate signals to the control unit representing the rate of flow of ambient air through the inlet damper; a second flow sensor operatively associated with the outlet damper to generate signals to the control unit representing the rate of flow of the ambient air through the outlet damper; and, a CO2 sensor in the room to generate signals to the control unit representing the concentration of CO2 in the air in the room. The improvements also include a first fan to direct the ambient air into the fifth section of duct, over the heat exchanger, and into the first section of duct; a second fan to direct the second portion of return air from the fourth section of duct, and through the fourth section of duct over the heat exchanger, and into the atmosphere; and, an algorithm in the control unit to calculate, at stepped spaced apart increasing room ventilation rates, increasing CO2 concentrations in the air in the room that are below a maximum desired CO2 concentration in the room.

In a further embodiment of the invention, improvements are provided In combination with a building structure. The building structure includes a room with a maximum occupancy rating of at least twenty people per 1,000 sq. ft. of occupied space; and, an air conditioning system. The air conditioning system includes a heat transfer coil; a first section of duct (D40) leading to the heat transfer coil to direct supply air from the building structure over the coil; and, a second section of duct (D20) leading away from the heat transfer coil to carry air from the coil back into the building. The improvements in the building structure comprise a ventilation control unit attached to the first section of duct. The ventilation control unit includes a housing (230); a heat exchange unit (120); a third section of duct (D10) connected to the first section of duct (D40) to direct a first portion of return air from the room into the first section of duct; a fourth section of duct (D30) to direct a second portion of return air from the room over the heat exchange unit; a fifth section of duct (D50) to direct ambient air over the heat exchange unit into the third section of duct (D10), the heat exchange unit maintaining the second portion of return air separate from the ambient air and transferring heat between the second portion of return air and the ambient air, and to direct ambient air directly only to said third section of duct (D10) by bypassing the heat exchange unit; a sixth section of duct (D60) to direct the second portion of return air from the heat exchange unit into the outside atmosphere; an outlet damper assembly (160) controlling the flow of the second portion of return air over the heat exchange unit (120) and into the outside atmosphere; and, a generally semi-cylindrical inlet damper assembly controlling the flow of the ambient air into the ventilation control unit. The inlet damper assembly including a member (38, 1150) rotatable between at least three operative positions, a first operative position directing ambient air only over the heat exchange unit (120); a second operative position bypassing the heat exchange unit and directing ambient air only directly to the third section of duct (D10) to combine with the first portion of return air; and a third operative position preventing the ambient air from flowing to the heat exchange unit and to the third section of duct (D10) to combine with the first portion of return air. The ventilation control unit also includes a control unit operatively associated with the inlet and outlet damper assemblies to control the rate of flow of the ambient air and the second portion of the return air, respectively, through the damper assemblies; a first flow sensor operatively associated with the inlet damper assembly to generate signals to the control unit representing the rate of flow of ambient air through the inlet damper assembly; a second flow sensor operatively associated with the outlet damper assembly to generate signals to the control unit representing the rate of flow of a second portion of return air through the outlet damper; and, a CO2 sensor in the room to generate signals to the control unit representing the concentration of CO2 in the air in the room. The improvements also include a first fan to direct the ambient air into the fifth section of duct, over the heat exchanger, and into the first section of duct; a second fan to direct the second portion of return air from the fourth section of duct, and through the fourth section of duct over the heat exchanger, and into the atmosphere; and, a control algorithm in the control unit to calculate, at stepped spaced apart regulated room ventilation rates, in response to increasing and reducing CO2 concentrations in the air in the room that are above or below an algorithm calculated desired CO2 concentration in the room.

In still another embodiment of the invention an improved air circulation system is provided. The system comprises a building structure; an inlet air duct extending at least partially in the building structure; an air outlet duct extending at least partially in the building structure; and, a damper assembly interconnecting the air inlet duct and the air outlet duct. The damper assembly comprises a generally cylindrical damper housing wall having a top and a bottom; a damper blade mounted inside the damper housing wall and including an edge adjacent and conforming to the damper housing wall; at least one air inlet opening formed in the damper housing wall; and, at least one air outlet opening formed in the damper housing wall. At least one of the damper housing wall and the damper blade are rotatable between at least two operative positions, a first operative position in which the damper blade is in a closed position to prevent air moving through the outlet opening, and a second operative position in which the damper blade is in an open position. In the open position, at least a part of the air outlet opening is exposed. The exposed part of the air outlet opening has a cross-sectional area, a total perimeter, an outlet opening perimeter, and a leading edge. In the open position, a rectangular portion of the damper housing wall including the exposed part of the air outlet opening is exposed. The rectangular portion extends from the top to the bottom of the damper housing wall; extends from the leading edge to the edge of the damper blade; bounds the exposed part of the air outlet opening, and has an area. The open position permits air to move through the exposed part of the air outlet opening. In the open position, the ratio of the area of the rectangular portion to the total perimeter of said outlet opening is in the range of 1.0:0.6 to 1.0:1.4; the ratio of the cross-sectional area of the outlet opening to the actual outlet opening perimeter is in the range of 1.0:0.8 to 1.0:1.4; and, the ratio of the area of the rectangular portion to the actual outlet opening perimeter is in the range of 1.0:0.5 to 1.0:1.1. The air circulation system also includes a fan directing air into the air inlet duct, through the air inlet opening, through the damper assembly and out the outlet opening into the air outlet duct. In the second operative position the damper assembly can be 10%, 20%, 30%, 40%, 50%, 60%, 70%, 80%, 90%, or 100% open, and can be movable between any combination of two or more openings while maintaining the ratios set forth in this paragraph. The damper assembly can be open an amount selected from a group consisting of 50% open, 60% open, 70% open, 80% open, and 90% open. The rate of air flow in the second operative position when the damper assembly is 40% open, 50% open, 60% open, 70% open, 80% open, and 90% open increases substantially linearly such that a straight line representing air flow at each of the second operative positions can be drawn which varies from each of the air flow rates by no more than 20%; and, such that the statistical variance of n is no more than 0.05. The straight line can vary from each of the air flow rates by no more than 15%. The straight line can vary from each of the air flow rates by no more than 10%.

In still another embodiment of the invention, an improved damper assembly is provided. The damper assembly comprises a generally cylindrical damper housing wall having a top and a bottom; a damper blade mounted inside the damper housing wall and including an edge adjacent and conforming to the damper housing wall; at least one air inlet opening formed in the damper housing wall; and, at least one air outlet opening formed in the damper housing wall. At least one of the damper housing wall and the damper blade are rotatable between at least two operative positions, a first operative position in which the damper blade is in a closed position to prevent air moving through the outlet opening, and a second operative position in which the damper blade is in an open position. In the open position, at least a part of the air outlet opening is exposed. The exposed part of the air outlet opening has a cross-sectional area, a total perimeter, an outlet opening perimeter, and a leading edge. In the open position, a rectangular portion of the damper housing wall including the exposed part of the air outlet opening is exposed. The rectangular portion extends from the top to the bottom of the damper housing wall; extends from the leading edge to the edge of the damper blade; bounds the exposed part of the air outlet opening, and has an area. The open position permits air to move through the exposed part of the air outlet opening. In the open position, the ratio of the area of the rectangular portion to the total perimeter of said outlet opening is in the range of 1.0:0.6 to 1.0:1.4; the ratio of the cross-sectional area of the outlet opening to the actual outlet opening perimeter is in the range of 1.0:0.8 to 1.0:1.4; and, the ratio of the area of the rectangular portion to the actual outlet opening perimeter is in the range of 1.0:0.5 to 1.0:1.1. The air circulation system also includes a fan directing air into the air inlet opening, through the damper assembly and out the outlet opening.

DETAILED DESCRIPTION OF THE INVENTION

Turning now to the drawings, which depict the presently preferred embodiments of the invention for the purpose of illustrating the use thereof and not be way of limitation of the scope of the invention, and in which like reference characters refer to corresponding elements throughout the several views, in a preferred embodiment of the invention, the EMS (Energy Management System) serves primarily as a diagnostic tool to provide graphic user interface (GUI) capability for the entire campus HVAC and lighting systems. The GUI comprises a computer screen with graph interface software and includes (1) on screen representation of ambient air flow in cfm, (2) on screen representation of exhaust/relief air flow in cfm, (3) on screen representation of mode of operation i.e. (i) heat recovery heating mode (changeover function), (ii) heat recovery cooling mode (changeover function), and (iii) economizer cooling mode (changeover function), (4) on screen representation of occupied 'active' or 'inactive' mode, (5) on screen representation of which segment $CO_2$ concentration limit is prevailing, (6) on screen representation of room $CO_2$ concentration level, and (7) alarm functions associated with no air flow when dampers are expected to be in some open position or registering air flow, open damper position, when no air is to be moving. Room ventilation control functions and all algorithm defining characteristics, formulae and changeover functionality are embedded in the programmable controller hardware control board and processor. Ventilation control functions include (1) determining if the DVHR is to operate in the heat recovery mode or economizer mode based on outside air temperature (changeover functions), (2) calculating the IRV based on the algorithm, (3) varying the outside ambient air damper to maintain the proper $CO_2$ concentration limit, and (4) varying the exhaust/relief air damper position to maintain the correct volume of air based on the outside/ambient air quantity. Changeover functions include (1) heat recovery heating mode (changeover function), (2) heat recovery cooling mode (changeover function), and (3) economizer cooling mode (changeover function). Input variables, i.e. room square footage, room ventilation rate (Va), people ventilation rate (Vp), (Occmax), are transmitted to the controller from external sources, i.e. plug-in interface tools, a keyboard or other data input means. It is the intent of this embodiment of the invention to maintain a maximum steady state ventilation to achieve less than the 700 ppm $CO_2$ level exposure limit defined in ASHRAE 62-200. The maximum steady state ventilation rate is the calculated IRV based on the two independent ventilation rates of people and area. The steady state feature defines that the 700 ppm concentration increase in $CO_2$ above ambient is accounted for in the algorithm in addition to the area ventilation requirement. Further, the energy recovery principles employed in this embodiment of the invention transfer a minimum of 60% of the differential dry bulb temperature energy from the high air stream temperature to the lower air stream temperature.

During the summer (cooling) months, the higher outside air temperature is transferred to the lower room relief air temperature. During the winter (heating) months, the higher room relief air temperature will transfer its heat to the lower outside air temperature. During periods of time when free cooling is available, the heat recovery (temperature transfer) unit is by-passed. Heat recovery in the cooling mode should be active at about 80° F. ambient temperatures and higher. Heat recovery in the heating mode should be active at about 50° F. ambient temperatures and lower. Economizer cooling should be the temperatures in between. These temperatures are usually 'field' adjustable so that when extreme conditions exist, the changeover temperatures can be reset without completely reprogramming the controller.

High occupant spaces historically experience transient and variable occupant loads. Prior to the 2010 version of ASHRAE 62.1-2010, indoor air quality (IAQ) standards defined constant use ventilation rates which influenced sizing of heating and cooling systems based on peak occupant loads. ASHRAE 62.1-2010 explains the intent of the ventilation standards with respect to volatile organic compound (VOC) dilution ventilation and $CO_2$/physiological odor management. Two ventilation rates are independently derived to meet these separate IAQ comprising conditions and the sum of the two rates are intended to define the stead state rate $CO_2$+VOC dilution rates to achieve a maximum $CO_2$ exposure of 700 ppm above ambient.

The approach discussed below concerns the proper control of ventilation (ambient) air which is introduced into a room.

The Approach. ASHRAE 62.1-2010 requires a minimum cubic foot per minute (cfm) of outside air (Va) per square foot (sf) of occupied space (i.e., space in a room) for VOC dilution. Additionally, each person is assigned a ventilation value (Vp) in cfm per person for CO2/odor management which is based on occupant occupation or activity. All CO2 ventilation rates have been developed with the intent that a change of CO2 concentration in an occupied room will not be objectionable if the CO2 level is kept below 700 ppm above the outside ambient CO2 level. Since CO2 sensors measure the total CO2 in air, ambient CO2 levels (OSACO2) need to be measured. Ambient CO2 levels normally are in the range of 300 to 500 ppm. The maximum desired total CO2 concentration in a room in parts per million (ppm) is then equal to (OSACO2+700), or 1000 to 1200 ppm. When a ventilation system operates during periods when a room is occupied, and when a low occupant count is in the room, the CO2/odor management dilution rate can be met with the minimum VOC ventilation rate. The minimum ventilation rate equals (Va)(x), although this is a logical expression ASHRAE still requires separate dilution ventilation rates for CO2, even though it appears the VOC dilution rate can achieve both criteria.

If priority is placed on meeting the VOC ventilation requirements independently of the CO2 ventilation requirements, then upon start of any initial space ventilation sequence, the VOC dilution ventilation rate will define any minimum ventilation rate requirement. If the VOC dilution air quantity remains an independent ventilation air quantity (variable) in the total required steady state ventilation rate calculation, the resultant CO2 ppm concentration will always be substantially lower than the maximum allowable 700 ppm exposure limit, even at full occupancy of the room.

1. The control logic for the ventilation set forth in the approach discussed above requires an algorithm to define and respond to the rate of change in the occupancy of a room. A minimum unreduced VOC dilution ventilation air flow rate, (Va)(x) (where x=the sq. ft. area of a room), remains a constant to the controller when the room is occupied. ASHRAE 62.1-2010 defines a quantity of ambient ventilation air, Vp, per person to insure that the CO2 concentration in a room does not exceed a desired maximum concentration. Presuming that the Vp is calculated to insure that the CO2 concentration in a room does not exceed 700 ppm above the concentration, OSACO2, in the ambient air, then the outside air flow increases in response to an increase in occupant respiration (i.e., in response to an increase in the number of occupants in a room or a change in their activity level), and incremental target CO2 levels or checkpoints, RV, are defined to simultaneously achieve a constant VOC dilution ventilation rate and respond to increasing and decreasing occupancy of a room. The controller ventilation algorithm described below uses increases or decreases in room occupancy in incremental selected segments, where n is the number of segments selected, IRV is the size in cfm of each segment, and IRVpt is the estimated cumulative number of persons in a reset segment and any preceding reset segment. The number, and therefor the size, of each segment is adjusted as desired. The design airflow of the VOC dilution ventilation (i.e., the base ventilation rate of Rb=(Va)(x)) plus the CO2 control ventilation (i.e., the size of each segment, IRV, times the number of segments S (1, 2, 3 . . . n)) is the divisor in the algorithm. The dampers 15, 16 (FIG. 1) which regulate the amount of outside air to the space have a defining minimum VOC dilution air flow, (Va)(x), as the initial open position. The occupied mode is determined by time schedule stored in the control unit 30 or by an occupant sensing mechanism operatively associated with the control unit 30. A velocity sensor utilizing a transducer records the inlet air flow quantity and adjusts the damper position to maintain a minimum set point. This is a pressure independent control function which is employed for air quantity and quality management functions of all air flow regulating devices in the system. When, as room occupancy increases, a maximum cfm of incoming ambient ventilation air, IRVcfm, is reached for a segment, the CO2 limit (i.e., the RV) for that segment is the upper CO2 limit for the prior segment. The minimum VOC ventilation rate=(Va)(x). This would suggest that the CO2/odor management rate is a duplicate of the minimum VOC ventilation rate. ASHRAE does not recognize this comparative analysis.

The control unit 30 achieves this upper CO2 by adjusting the damper that regulates the flow of incoming ambient air. In contrast, when the occupancy levels in a room decreases and the CO2 concentration in the room drops, the maximum cfm of a segment, IRVcfm, must be overshot by a selected amount before the target CO2 concentration is altered. For example, if in the system represented in FIG. 3, the room occupancy and CO2 concentration are decreasing, when the CO2 level reaches 668 ppm, coinciding with 228 cfm, the control unit 30 does not adjust the damper to achieve a CO2 concentration of 668 ppm (at 228 cfm) from 738 ppm (above 228 cfm) until the value drops to below the IRV cfm quantity of 228 by at least 10% of the difference of the segment air quantity, which in this case is 60 cfm×10%=6 cfm. This will allow the IRV to change once the outside air quantity reduces to less than 222 cfm. This percentage is a field adjustable value based on the normal occupancy of the space and how quickly it can gain or lose occupants. Its use is for this example.

When a building starts in the occupied 'inactive' mode, the ventilation rate is at its minimum. If no one enters the room, the room CO2 concentration will be essentially the ambient CO2 level. It is the intent of the control function to move to the first calculated segment RV upon occupant entry into the room. There is no way the ambient CO2 level of the room can be maintained once people enter. Therefore, the RV adjustment takes place once the air quantity exceeds its segment limit. Using FIG. 3, RV2 @ 550 ppm will be the first occupied 'active' value. At 300 ppm (RV1), the ventilation rate is in the occupied 'inactive' mode.

The various necessary ventilation criteria set forth below are incorporated in the control unit 30 (FIG. 1). In one embodiment of the invention, ASHRAE 62.1-2010 VOC and CO2 management air flow rates are provided via a handheld plug-in. In another embodiment, this data is programmed into the control unit 30. When ASHRAE 62.1-2010 ventilation data is revised, a plug-in or any other desired data entry system is utilized to update the control unit 30.

Prior art ventilation systems typically have either fixed or on/off flow rates. Outside air introduced into a room or other space must be relieved from the space. When a space has no operable windows or doors which communicate with outside (ambient) air, the intake and relief systems permit equal volumes of air in and air out. Gravity air relief systems are most common. Exterior relief hoods or louvers are connected to a building or space via either a direct duct and grille in the ceiling, or a return/relief air grill in the ceiling which communicates with a return/relief air plenum.

During any ambient climate temperature condition, when the outside air can provide a lower temperature source to the air conditioning system than the set point of the temperature sensor without over cooling the space, the outside air supply source should not be tempered to a higher temperature in the heat exchange unit 12 (FIG. 1). This defeats the cooling process. Instead, in one embodiment of the invention, in the free cooling mode outside air is introduced to the return air path in the manner indicated by arrow A2 in FIG. 2, bypassing the heat exchange unit 12. This lowers the return air temperature to the air conditioning unit 22, thereby reducing the amount of compressorized cooling energy required to maintain the set point temperature in a room or other space. This is called the partial outside air economizer mode. Excess air generated by introducing air in a room or other space during the partial outside air economizer mode is relieved from the space via a gravity relief air system. The gravity relief air system has a back draft regulating damper to prevent outside air from entering into the building when the air conditioner if off. The back draft damper can be fitted with either a counterbalanced barometric relief damper or an electronically operated motorized damper. Either kind of damper will open when the air conditioner is operating during the partial outside air economizer mode.

When the ambient climate temperature conditions are not suitable for either free cooling or reduced compressorized cooling, the gravity relief air system is disabled and the heat exchange unit 12 is enabled. The heat exchange unit 12 works efficiently down to about 20% of the maximum air flow rate. In the system illustrated in FIG. 3, the maximum air flow rate is 408 cfm.

In the heat recovery mode of the module 10 (FIGS. 1 and 2) of the invention, as the ventilation air quality increases and decreases, dampers 15 and 16 are operated by the control unit 30. The control unit 30 ordinarily comprises a microprocessor. The control unit 30 utilizes the ventilation algorithm described below, along with any other desired algorithms. Ambient air that is introduced through damper 15 as ventilation air is compensated for by exhaust/relief air R2 (FIG. 1) that is directed over heat exchanger 12 and into the ambient atmosphere via damper 16. A minimum desired flow rate for ambient air through damper 15 is determined by the potential for trapping air borne particulates in the heat exchange unit 12 when the air velocity drops to below the manufacturer recommend air flow. Some manufacturers permit an air flow rate that is less than 20% of the maximum desired air flow rate over heat exchanger 12. In FIG. 3, the maximum desired air flow rate of ventilation air is 408 cfm.

Where occupied spaces communicate with the outside ambient air via operable windows and doors, a minor positive air pressure is maintained to minimize migration of air borne particulates into a room or other space. Such minor positive air pressures are not set forth in published standards, but up to 20% of the design maximum air flow rate (408 cfm in FIG. 3) can be diverted to the pressurization mode with minimal energy recovery impact at the design maximum desired air flow rate (i.e., air flow at peak occupancy). In FIG. 3, the maximum air flow rate is 408 cfm. It is recommended that no more than 10% of the maximum air flow rate (i.e., in the system of FIG. 3 this would be 40.8 cfm) be relieved for ventilation air flow up to 50% of the maximum air flow rate, and that the 20% maximum pressurization air flow quantity should not be exacted on the system until 80% of the design maximum desired air flow rate is in use.

The heat recovery operation mode requires verifiable air flow measurements for proper application of the ventilation algorithm. In order to maximize the reduction in energy required to operate the system, the flow rates of the incoming ambient ventilation air and of the exhaust/relief air stream should be the same or nearly the same. Toward this end, each air inlet (or outlet) is provided with a velocity sensor 20A, 20B, 21. It may be possible to use a common sensor for dampers 15 and 17 because these dampers will not open together. Each sensor is preferably calibrated and can operate to within 2% accuracy at velocity pressures as low as 250 fpm (0.03" velocity pressure) at sea level.

During low occupant loads in a room or other building space, only a minimal amount of exhaust air, R2, may be available for heat recovery. During such periods of low ventilation air flow, however, the outside air cooling load on the room air conditioning system is also low, resulting in a minor increase to the cooling load of the air conditioning equipment above minimum (no outside cooling load). Algorithm calculated indoor air quality (IAQ) conditions are continuously maintained regardless of the quantity of exhaust air, R2, utilized.

The combination of heat recovery and demand ventilation control enables a substantial reduction in energy use, enables increased sustained IAQ, and enables enhancements in sustainable system performance. Enhancements include:

a. Reduction of AC unit sizes based on the reduction of the cooling load
b. Reduction of electrical service size based on smaller electrical loads of the smaller AC units
c. Energy reduction of HVAC system energy use of 25%-40%
d. Improvements of indoor air quality (IAQ)]
   i. Stable CO2 levels
   ii. Adequate VOC dilution
   iii. Reduction of space temperature variations
   iv. Noise reduction
e. Reduction of the carbon footprint with the reduction of required utility generation
f. Air conditioning system benefits
   i. Reduction of entering air temperatures to the evaporator and the resultant high differential pressures at the compressor
   ii. LEED compliance for all refrigerant systems if the normal size refrigerant charge is compared with the reduced unit size charge
   iii. Minimizing excess outside air into the building when occupancy is not at maximum
   iv. Partial outside air economizer use (not available with conventional heat recovery modules)
   v. Operable in all ambient temperatures from −10° F. to 120° F.
g. Hydrocarbon power generator emitted pollution reduction at generating plants
h. Water use reduction for cooling of utility generator equipment
i. Reduction of global warming
j. Refrigerant volume leakage reduction in package air conditioning equipment
k. Reduction of water chemical treatment at industrial cooling towers of utility generating plants
l. Reduction of ozone depleting and global warming refrigerant leakage.

Use of an occupant sensor(s) to manage IAQ and energy consumption is complimentary to a lighting control system. A lighting control system is an energy management tool required by the International Energy Conservation Code as an alternative to time clocks which use space occupant overrides for the light control system. One presently preferred occupant sensor utilizes infrared temperature sensor technology to determine the number of occupants in a room. Any human entry in to the sensor zone is detected and turns on light fixtures. EMS systems can control space lighting and HVAC during present hours of operation. Substantial energy and cost savings are realized if the sensor determine the presence of occupants and turn energy consuming systems on or off. Such an occupancy sensor can be furnished with an auxiliary contact to enable independent functioning of the lighting system from the HVAC system. The auxiliary contact determines if a ventilation adjustment is in order. The occupancy sensor also enables the "occupied" mode temperature sensor set point to be changed in response to an "active" status versus an "inactive" status. If, for example, during a scheduled "occupied" mode of the HVAC unit, the room sensor detects no human presence for a selected time period of five minutes, the HVAC unit serving the room can change to "occupied-inactive" status. This changes the room people and ventilation set points to zero outside air. When the room sensor detects human presence, the operating sequence for the DVHR (Demand Ventilation Heat Recovery) unit 10 of the invention begins. The first stage of the ventilation air management mode is utilized when a room is not occupied and is based on the outside ambient air temperature and includes the base ventilation rate, Rb=(Va)(x). Since the room is not occupied, (Vp)(Occact)=0. An outside air source temperature sensor determines if unit 10 operates in the Cooling-Heat Recovery (CHR) mode, the Heating-Heat Recovery (HHR) mode, or the Economizer-No Heat Recovery (EHNR) mode. When unit 10 operates either of the CHR or HHR modes, the occupancy sensor enables the "occupied-active" mode of the HVAC system. The ventilation ambient air damper 15 and the exhaust air damper 16 (FIG. 1) are opened, closed, or not adjusted in order to direct into the room the minimum necessary quantities of ventilation air as calculated by the ventilation algorithm. The velocity sensors 20A, 20B, 21, the indoor and outdoor temperature sensors, and the CO2 sensor in the room provide inputs to the EMS (Energy Management System). The indoor air quality (IAQ) and indoor and outdoor temperature sensors enable the cooling and heating systems to operate and the ventilation system algorithm determines calculates the RV set point of the room.

When operating in the ENHR mode, the bypass damper 17 (FIG. 2) is opened to its design maximum air flow as sensed by the velocity sensor 20A. The maximum outside air volume is calculated by the engineer using the peak air flow of the supply fan 13 divided by the number of DVHR units on its system. During the ENHR mode, the heat recovery module air pressure drop is excluded from the system losses because it is bypassed. This allows for the supply fan 13 to ramp up to a higher air flow because it doesn't have as much system resistance to overcome. This is a higher air quantity than the maximum fan capability if the sum of the total ventilation air flow required for proper IAQ is tabulated. This is a scheduled value on the drawings usually defined by the engineer.

The exhaust/relief damper 16 and the heat exchanger damper 15 are closed. Air is relieved from the room via a gravity relief system. When the ambient air quantity produces a temperature which is too cold and the room temperature drops to below the desired set point, the quantity of ventilation air is controlled based on readings produced by the room CO2 sensor until the IAQ set point can not be met and the temperature set point continues to drop. When this occurs, the HHR mode is enabled. In most cases, the morning warm-up condition shall enable the HHR mode. After the system begins operating in the HHR mode, the ENHR mode is enabled once the outside air temperature reaches 60 degrees F. or reaches another selected temperature. If at any time the ambient air temperature exceeds the set point of the room by five degrees F., the CHR mode is enabled.

An infrared sensor in the room or other space determines when the room is occupied. When the room is not occupied, the ventilation system of the invention is in an 'inactive' mode. When the room is occupied, the sensor generates and transmits signals to control unit 30. Control unit 30 places the ventilation system in the active mode, which triggers use of EQ. 1 (and consequently a graph comparable to that of FIG. 3) as set forth below.

Control unit 30 communicates with fans 13 and 14 to turn the fans on and off and to adjust the speed of operation of the fans.

Figure 2:
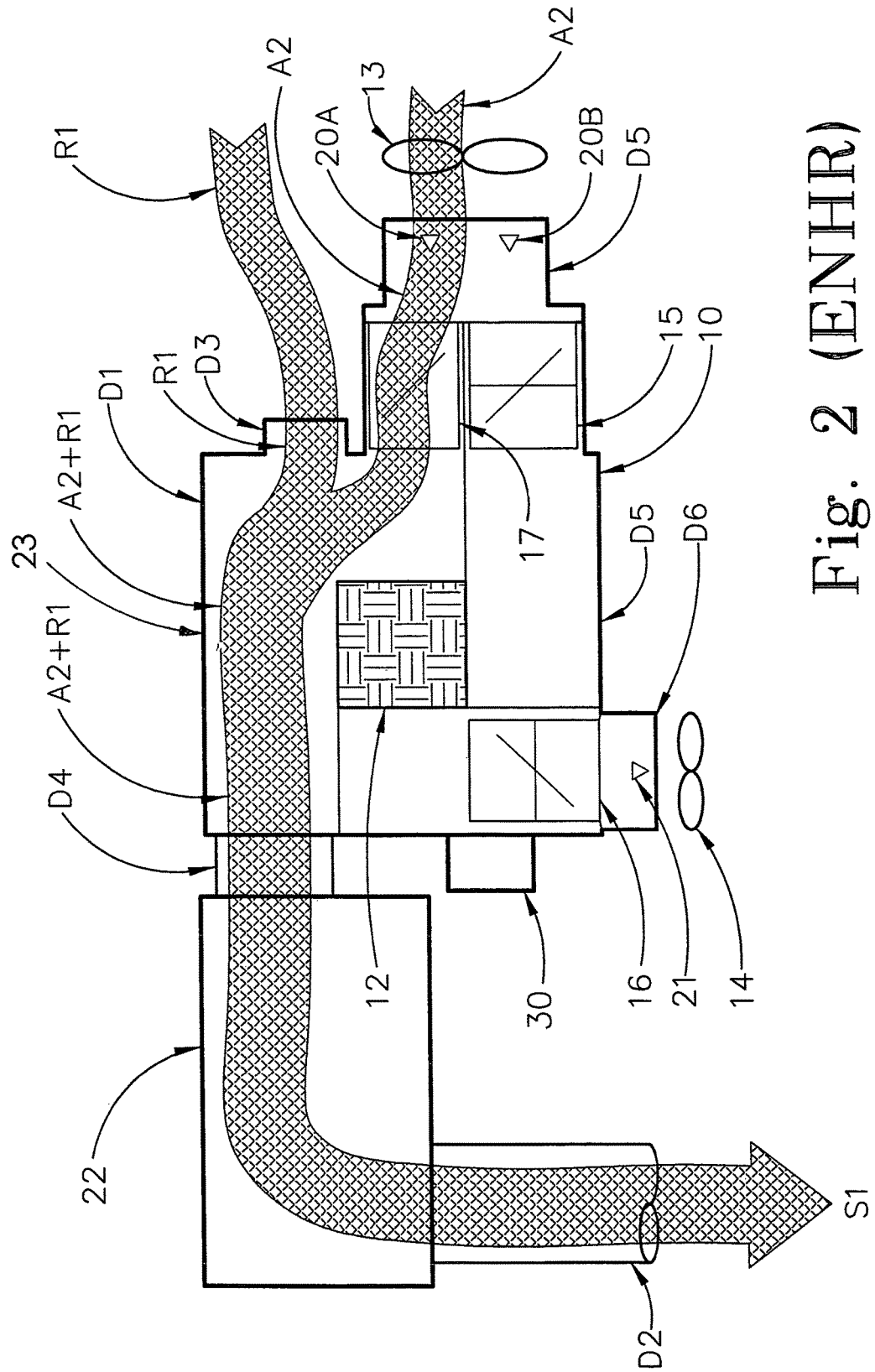
FIG. 2 is a top view further illustrating the retrofit module of FIG. 1.
Figure 3:
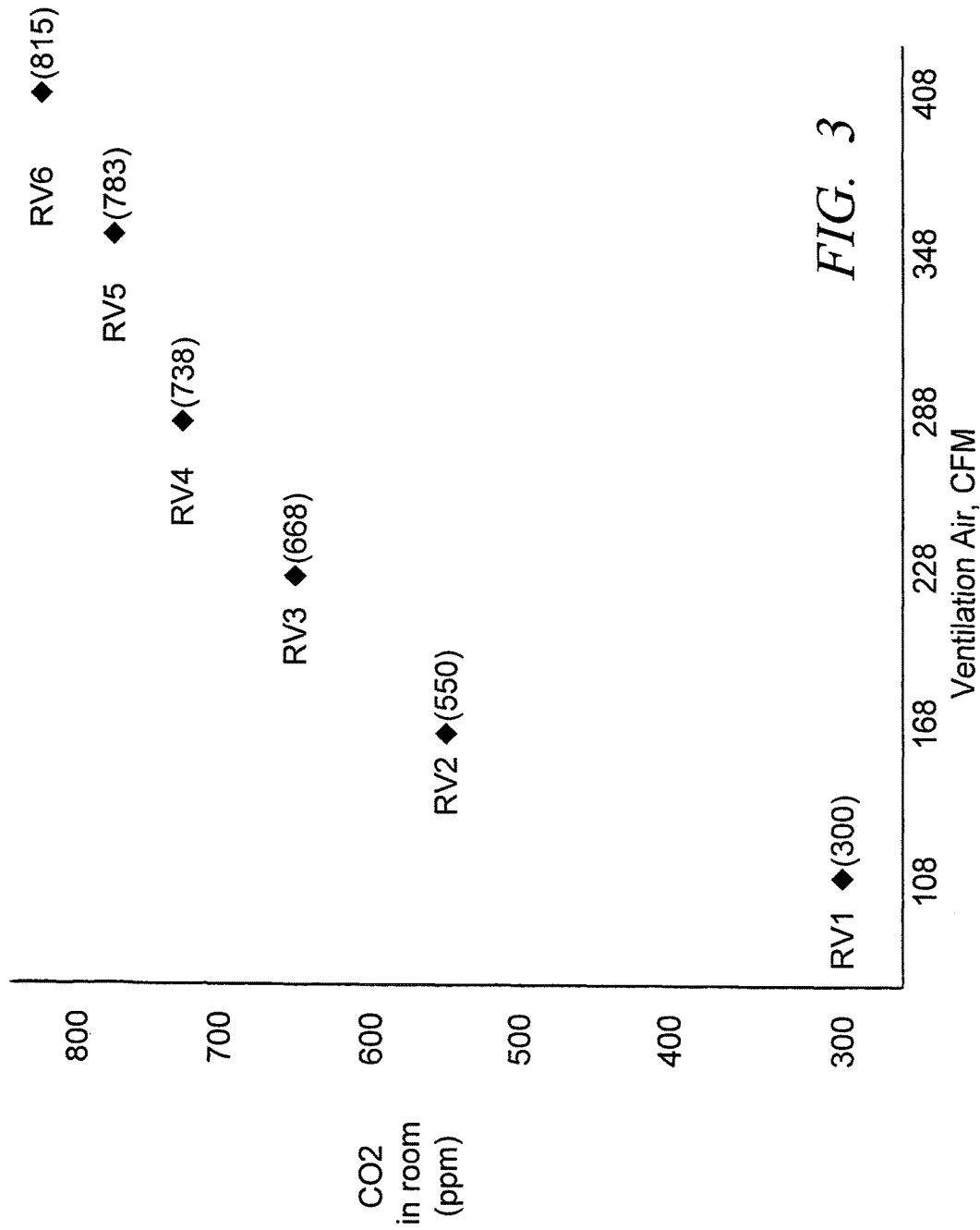
FIG. 3 illustrates an IRV graph prepared in accordance with the system of the invention.

The ventilation unit 10 illustrated in FIGS. 1 and 2 includes a housing 23, heat exchange unit 12 mounted in housing 23, damper(s) 15, 16, and 17 mounted in housing 23, velocity sensors 20A, 20B, and 21 mounted in housing 23, and a controller 30 mounted in the housing 23. Fans 13 and 14 can be mounted on housing 23, or can be mounted at locations separate from housing 23 to direct air through ducts that are connected to housing 23.

Inlet/bypass duct D5 guides incoming ambient ventilation air A1 over one side of heat exchange unit 12, out into the duct of D1, and through duct D4 interconnecting unit 10 and air conditioning unit 22 (FIG. 2). Duct D3 guides a portion R2 of the return air over the other side of heat exchange unit 12 and out into the ambient air as exhaust/relief air. The return air comes from the room being ventilated by unit 10. Dampers 15 and 17 are mounted in duct D5. Damper 16 is mounted in outlet duct D6.

Velocity sensors 20A, 20B, 21 are shown mounted in ducts D5 and D6, but that need not be the case. Sensors can be mounted at any desired location in ventilation unit 10 to obtain an accurate reading of ventilation air A1 entering duct D5 and of return air R2 exiting duct D6 as exhaust/relief air.

Velocity sensors 20A, 20B, 21 are operatively associated with control unit 30 and generate and transmit signals to control unit 30 defining the velocity of ambient air, indicated by arrow A1, traveling through ducts D5 and D1 into duct D4, and of return air, indicated by arrow R2, traveling through ducts D1 and D6.

Control unit 30 also receives signals from a CO2 sensor (not shown) in the room or other space being cooled (or heated) by the air conditioning unit 22. Control unit 30 can also, if desired, receive signals from a sensor that detects ambient temperature, from a sensor that detects the temperature in the room being cooled (or heated) by unit 22, from an infrared or other sensor that detects when one or more individuals are in the room, and from a sensor that indicates the desired temperature set point in the room.

While the shape and dimension of ventilation unit 10 can vary as desired, and unit 10 can be installed at any desired location near to or spaced apart from air conditioning unit 22, the embodiment of the invention illustrated in FIGS. 1 and 2 is a preferred embodiment because it is constructed to be inserted after a portion of ducting that leads to and carries return air to a previously installed air conditioning unit 22 is removed. After the portion of the return air ducting leading to the air conditioning unit 22 is removed, unit 10 is installed in-line to replace the portion of the return air ducting that was removed. Accordingly, return air R1 and R2 from the room flows into unit 10, portion R1 flows into ducts D3, D1 and D4 and into air conditioner 22, and portion R2 flows over or through heat exchanger 12 and out through duct D6. This, as can be seen in FIG. 2, eliminates or minimizes the amount of duct which must be utilized to install unit 10 in-line along a return air duct that is connected to air conditioner 22. In FIGS. 1 and 2, it is assumed that unit 10 is located outdoors. Unit 10 can also, if desired, be installed in a duct which is located indoors, or can be installed at any other desired location. And, as would be appreciated by those of skill in the art, unit 10 can be utilized and installed when a new air conditioner is being installed on or adjacent a building structure, or can be installed as an integral part of air conditioning unit during the manufacture of a new or refurbished air conditioning unit. Unit 10 is preferably, but not necessarily, manufactured as a self-contained module with a control unit 30 designed to receive necessary inputs from air velocity sensors 20A, 20B, 21, from a room CO2 sensor, from a room infrared occupancy sensor, from an ambient air temperature sensor, or from any other desired sensor that is part of self-contained unit or that is remote from unit 10. Fans 13 and 14 can be incorporated as a part of unit 10, or can be omitted from unit 10 and installed in or adjacent ducting that leads to unit 10. Similarly, dampers 15 to 17 can, as illustrated in FIGS. 1 and 2, be incorporated as part of unit 10, or can be omitted from unit 10 and installed in ducting leading to unit 10, as can control unit 30, velocity sensors 20A, 20B, 21, and heat exchange unit 12. The compact module configuration, with or without fans 13 and 14, illustrated in FIGS. 1 and 2 is presently much preferred in the practice of the invention.

As is illustrated in FIG. 1, a portion, R2, of the return air from the room is directed by fan 14 from duct D1 over one side of heat exchange unit 12 and into the ambient air as exhaust/relief air. The size, in cfm, of portion R2 is controlled by damper 16. Another portion R1 of the return air from the room continues through ducts D1 and D4 to air conditioning unit 22, where it travels over the cooling (or heating) coils and becomes part of the supply air, indicated by arrow S1, traveling through duct D2 to the room.

As is also illustrated in FIG. 1, ambient air, indicated by arrow A1, is directed by fan 13 over the other side of heat exchange unit 12 and into duct D1. This ambient air travels over the cooling (or heating) coils in air conditioning unit 22 and becomes part of the supply air, indicated by arrow S2, to the room.

When the ambient air is warmer than the desired temperature of the room, heat exchange unit 12 functions to transmit heat from the ambient air A1 to return air R2. When the ambient air A1 is cooler than the desired temperature of the room, heat exchange unit 12 functions to transmit heat from the return air R2 to the ambient air, A1.

In FIG. 2, damper 15 is closed. Ambient air A2 entering duct D5 travels through damper 17, through ducts D1 and D4, and into air conditioning unit 22. The operational configuration of FIG. 2 is utilized when the ambient air temperature is sufficiently cool to provide desired cooling to return air R1.

In FIGS. 1 and 2, D1 is an air duct integrated with D3 for return air to air conditioner 22; D2 is an air duct directing cooled (or heated) supply air S1 from air conditioner 22 back to the room; D3 is a duct through which return air from the room flows in unit 10; D4 is a duct that directs return air into the coil/fan section of air conditioner 22; D5 is a duct that directs ambient air A1 into unit 10 and over one side of heat exchange unit 12; D6 is a duct that directs exhaust/relief air from heat exchanger 12 into the ambient atmosphere; A1 and A2 are ambient air streams flowing into duct D5; A1 is a fan induced ambient air stream directed through or over heat exchange unit 12; A2 is a fan induced ambient air stream that bypasses heat exchange unit 12 and travels directing in the return air stream in the manner illustrated in FIG. 2; R2 is a portion of the return air stream that is drawn over or through heat exchange unit 12; and S1 is a combination of return air R1 and outside ambient air A1. FIG. 1 illustrates the heat recovery mode of the ventilation system of the invention. FIG. 2 illustrates the economizer mode of the invention. In the economizer mode, the temperature of the ambient air stream A2 permits it to be added directly to the return air stream R1 and obviates the necessity of passing an ambient air stream A1 over or through heat exchanger 12.

A control system ventilation formula is used to calculate the CO2 ppm target concentration levels that are required to maintain in a room a maximum 700 ppm CO2 exposure level for occupants as defined in ASHRAE 62.1-2010 (and earlier versions). This maximum 700 ppm CO2 exposure is in addition to the existing CO2 concentration in the ambient air.

There are two additive variables required to meet the ASHRAE standards:
 a. One variable is the base "area ventilation rate", i.e., the ventilation rate required for a room.
 b. The other variable is the "person" ventilation rate, i.e., the ventilation rate to compensate for each person in a room.

The calculation used below approaches each of the additive variables to achieve a critical steady state result based on maintaining a maximum CO2 concentration of 700 ppm above the CO2 concentration in the ambient air.

Variables Used in Conjunction with the Control System Ventilation Formula
 x=square footage of the room
 Va=area (i.e., room) ventilation rate requirement in cubic feet per minute (cfm/sq. ft), as listed in ASHRAE 62.1-2010, Table 6.1.
 Occmax=maximum code or user defined number of occupants in room
 Vp="per person" ventilation rate requirement in cfm/person, as listed in ASHRAE 62.1-2010 Table 6.1.
 CRT=rate reset variable based on outside air temperature during the cooling mode. This is used in relation to Va.
  CRT=1.0 for ambient less than or equal to 95 F
  CRT=0.8 for ambient less than or equal to 96 F and greater than 95.
  CRT=0.6 for ambient temperature less than or equal to 97 F and greater than 96 F.
  CRT=0.4 for ambient temperature less than or equal to 98 F and greater than 97 F.
  CRT=0.2 for ambient temperature less than or equal to 99 F and greater than 98 F.
  CRT=0.0 for ambient temperature greater than 99 F.

In other words, if the ambient temperature is greater than 99 F, ambient air is not utilized to meet the area ventilation rate requirement, but is still used to meet the "per person" ventilation requirement.

The CRT values are adjustable with a plug-in to take into account sensible cooling excesses associated with extremely high ambient conditions. Similar adjustments can be defined for very humid locations and will be based on a relative humidity—dry bulb temperature measurement which equals a wet-bulb temperature on the psychometric chart.

HRT=rate reset variable based on outside air temperature during the heating mode. This is used in relation to Va.
  HRT=1.0 for ambient temperature greater than 25 F.
  HRT=0.8 for ambient less than or equal to 25 F and greater than 24.
  HRT=0.6 for ambient temperature less than or equal to 24 F and greater than 23 F.
  HRT=0.4 for ambient temperature less than or equal to 23 F and greater than 22 F.
  HRT=0.2 for ambient temperature less than or equal to 22 F and greater than 21 F.

HRT=0.0 for ambient temperature less than or equal to 21 F.

HRT values are adjustable using a plug-in to take into account sensible heating excesses associated with extremely low ambient conditions.

OSACO2=concentration of CO2 in ambient air in ppm.

Occact=count of number of people in room, usually determined by a CO2 concentration that is in excess of the CO2 concentration in the ambient air.

IRV graph=a plot of selected spaced apart reset values (RVs). The units of measure on the vertical axis of the graph are ppm (parts per million) CO2. The units of measure on the horizontal axis of the graph are cfm (cubic feet per minute) ventilation air.

Rb=base ventilation rate for a room in cfm=(Va)(x).

n=the number of cfm reset segments selected for and represented on an IRV graph. Each cfm reset segment s ordinarily of equivalent size to other segments, although this is not necessarily the case. IRV is the size of each segment in cfm.

IRVpt=the cumulative number of calculated persons in a reset segment and any preceding reset segments.

IRVcfm=a selected cfm point on the horizontal axis of an IRV graph at which a reset segment ends, at which an associated reset value (RV) occurs, and which represents a cumulative quantity (in cfm) of outside (ventilation) air that is utilized. The value of such a cfm point is equal to:

$$(Vp)(IRVpt)+(Va)(x)$$

IRV=the size in cfm of each segment in an IRL graph. IRV equals the maximum outside air quantity (Vp×Occmax) divided by the number of reset segments (n) selected. If, for example, five reset segments are selected, the reset values (RV), or check points, occur at 0%, 20%, 40%, 60%, 80%, and 100% of the maximum (Vp×Occmax) outside air ventilation (in cfm) that will be utilized to offset the concentration of CO2 in the room that is above the concentration of CO2 in the ambient air. Each segment extends from one RV to an adjacent RV. For example, one segment extends from the cfm associated with the RV at 0% to the cfm associated with the RV at 20%. If ten reset segments are selected, the reset values occur at 0%, 10%, 20%, 30%, 40%, etc. of the maximum flow of ambient air that will be utilized to ventilate the room to offset CO2 concentrations above the CO2 concentration in the ambient air.

RV=RVd+OSACO2=a reset value on an IRV graph. The number of RVs presently is one greater than the number, n, of segments. Each set value (RV) represents a desired CO2 concentration which is noted on the vertical axis of the graph and which is associated with a selected cfm point (IRVcfm) on the horizontal axis of the graph. The value of the selected cfm point (IRVcfm) indirectly indicates the "metabolic equivalent" number of people (Occact) in the room, i.e., the value of the selected cfm points less the base cfm of (Va)(x) is divided by Vp to give the "metabolic equivalent" number of people in the room. A reset value (RV) defines a desired total room CO2 concentration limit at its associated IRVcfm. A velocity sensor 20A, 20B in the incoming supply stream of ambient air indicates the cfm of the incoming air stream. As reset value (RV) is used to reset the CO2 maximum allowable ppm value for its associated IRVcfm. The control system of the invention sends a signal to the outside or ambient air stream damper motors which modulate the damper blades to adjust the outside air quantity in response to the CO2 concentration detected by CO2 sensor(s) and in response to how much the room CO2 deviates from the CO2 concentration defined by the RV.

RVd=the difference, in ppm, at a selected cfm point on an IRV graph (IRVcfm) between the RV at that cfm and the ambient air CO2 concentration (OSACO2). Also known as CO2max.

$S_{(0, 1, 2, 3, \ldots n)}$=a numerical value (0, 1, 2, 3 . . . n) representing the number of segments used in calculating, with the formula noted below, both an RV and the amount by which the RV exceeds the ambient CO2 concentration. For example, when the first set point RV1 is calculated, a numerical value of 0 is used for S; when the second set point RV2 is calculated, a numerical value of 1 is used for S; when the third set point RV3 is calculated, a numerical value of 2 is utilized, and so on. When S=0, a segment is not utilized and the RV=OSACO2.

Altcorr=an altitude correction value. This value increases the IRV values above those established for sea level and extends the applicable segment maximum CO2 ppm value to a higher cfm value. This is a multiplier to the IRV segment values. The value is based on the specific density of air at sea level divided by the specific density of air at the altitude of the project site. When the location of a project is at sea level, the Altcorr is 10.

CO2max=the desired maximum CO2 concentration in ppm in a room above the CO2 concentration in the ambient air.

CO2target=RVd=the target CO2 (above ambient) for a segment.

Vamb=the cfm of ambient ventilation air entering the system as measured by a velocity sensor.

Vexit=the cfm of supply air that exits into the atmosphere after passing by the heat exchanger as measured by a velocity sensor.

CO2act=the actual measured CO2 in a room as measured by a CO2 sensor.

Tact=the actual temperature in a room as measured by a thermostat.

Control System Ventilation Formula. Given the above variables, the target CO2 above ambient, or RVd, for a segment is:

$$RVd = \frac{[(CRT \text{ or } HRT)(Rb)(OSASCO2) + (Occact)(Vp)(OSACO2 + CO2max)]}{(Rb) + IRV(Altcorr)(S_{(0,1,2,3 \ldots n)})} - OSACO2 \quad [\text{EQ. 1}]$$

The following example is presented by way of illustration, and not limitation, of the invention.

Example

In this example, it is assumed that a room will be occupied by school children in the age range of 5 to 8. The ambient temperature is 88 degrees F. The room is located as sea level. The size of the room is 900 square feet. The CO2 concentration in ambient air is 300 ppm. Five segments are selected to use in preparing an IRV graph. The following values are utilized:

n=5

No. of RV points on IRV graph=n+1=6

No. of occupants in a segment=(Occmax)/n=30/5=6 x=900 sq. ft. (size of room)

Va=0.12 cfm/sq. ft (from ASHRAE 62.1-2010: Table 6.1: Minimum Ventilation Rates In Breathing Zone).

Rb=(Va)(x)=(900)(0.12)=108 cfm

Occmax=30 (maximum number of children allowed in room per building code)

Vp=10 cfm/person (from ASHRAE Table 6.1).

CRT=1.0 (ambient temperature is less than 95 F)

HRT=N/A, because the ambient temperature requires cooling, and not heating.

OSACO2=300 ppm.

IRV=(Vp)(Occmax)/n=(10)(30)/5=60 cfm

Occact=number of people in the room. This number times (Vp) is added to Rb to determine the maximum airflow in a segment on an IRV graph. The first segment includes 6 occupants. Six occupants times (Vp)=6×10 cfm=60 cfm. 60+108=a maximum airflow of 168 cfm at the upper end of the first segment in the IRL graph. The second segment would also include 6 occupants, producing a total room occupancy equal to the occupancy in the first segment plus the occupancy in the segment or 6+6=12. Twelve occupants times (Vp)=12×10=120 cfm. 120+108=a maximum airflow of 228 cfm at the upper end of the second segment in the IRL graph, and so on.

Altcorr=1.0. The project site is at sea level.

CO2max=700 ppm. This value is a constant for all building types and occupancies.

$S_{(0, 1, 2, 3 \ldots n)} = S_{(0, 1, 2, 3, 4, 5)}$

Since CRT and Altcorr are each equal to 1.0, the control system formula is simplified to:

$$RVd = \frac{[(Rb)(OSACO2) + (Occact)(Vp)(OSACO2 + CO2max)]}{(Rb) + IRV(S_{(0,1,2,3,4,5)})} \quad [\text{EQ. 2}]$$

$$OSACO2 = \frac{[32,400] + (Occact)(10,000)}{(108) + (60)(S_{(0,1,2,3,4,5)})} - 300$$

At the first set point of 0%, Occact=0 (0% of the maximum occupancy of 30 students=room is not occupied), $S_{(0, 1, 2, 3, 4, 5)}=0$, and the formula is $$(\text{Unoccupied condition}) RVd1 = \frac{32,400}{108 + (60)(0)} - 300 = 0 \text{ ppm} \quad [\text{EQ. 3}]$$

$RV1 = 300$ ppm.

At the second set point of 20%, Occact=6 (20% of the maximum occupancy of 30 students), $S_{(0, 1, 2, 3, 4, 5)}=1$, and the formula is:

$$(\text{First occupied segment set point}) Rvd2 = \quad [\text{EQ. 4}]$$
$$\frac{[(32,400) + (6)(10,000)]}{(108) + (60)(1)} - 300 = 250 \text{ ppm}$$

$RV2 = 550$ ppm.

At the third set point of 40%, Occact=12 (40% of maximum occupancy of 30 students), $S_{(0, 1, 2, 3, 4, 5)}=2$, and the formula is:

$$(\text{Second occupied segment set point}) RVd3 = \quad [\text{EQ. 5}]$$
$$\frac{[(32,400) + (12)(10,000)]}{(108) + 60(2)} - 300 = 368 \text{ ppm}$$

$RV3 = 668$ ppm.

At the fourth set point of 60% the formula is:

$$(\text{Third occupied segment set point}) RVd4 = \quad [\text{EQ. 6}]$$
$$\frac{[(32,400) + (18)(10,000)]}{(108) + (60)(3)} - 300 = 438 \text{ ppm}$$

$RV4 = 738$ ppm.

At the fifth set point of 80% the formula is:

$$(\text{Fourth occupied segment set point}) RVd5 = \quad [\text{EQ. 7}]$$
$$\frac{[(32,400) + (24)(10,000)]}{(108) + 60(4)} - 300 = 483 \text{ ppm}$$

$RV5 = 783$ ppm.

At the sixth set point of 100%, the formula is:

$$(\text{Fifth occupied segment set point}) RVd6 = \quad [\text{EQ. 8}]$$
$$\frac{[(32,400) + (30)(10,000)]}{(108) + 60(5)} - 300 = 515 \text{ ppm}$$

$RV6 = 815$ ppm.

With reference to FIG. 3:

1. The reset values (RVs) or checkpoints in the IRV graph of FIG. 3 are: RV1=300 ppm CO2; RV2=550 ppm CO2; RV3=668 ppm CO2; RV4=738 ppm CO2; RV5=783 ppm CO2; RV6=815 ppm CO2.
2. In the system, when the room is in the 'occupied-inactive' mode at a zero occupancy count (empty room), the outside air control damper operates to bring in ambient air at approximately Rb=108 cfm (900 square feet×0.12 cfm/square foot). This air volume, Rb, is equal to (Vb)(x) and is a constant ventilation flow rate in the overall equation. If no one is in the room for 5 minutes or more, the ventilation system goes from the 'occupied-inactive' mode to the 'unoccupied' mode and is turned off so there is no ambient ventilation air flowing into the room. The five minute time element is adjustable as desired. The minute someone enters the room, the infrared occupancy sensor (or some other desired sensor) causes control unit 30 to activate the 'occupied-active' mode and control the dampers 15, 16 to establish the minimum ventilation value, Rb. As the CO2 concentration rises, the ventilation rate rises to dilute the CO2 concentration. The amount that dampers 15 and 16 (or 17) open depends on the difference between the actual CO2 concentration and the set point RV2, RV3, RV4, etc. The greater the difference, the more the dampers open.

By way of example, if after the dampers are opened to increase the flow rate of ambient ventilation air, the next reading by velocity sensor 20B indicates a flow rate of 190 cfm (in the second segment in FIG. 3) and the CO2 sensor in the room reads 400 ppm (in the first segment in FIG. 3), then control unit 30 begins closing damper 15 to reach an ambient air flow rate that is in the first segment (108 to 168 cfm) in FIG. 3. The CO2 and velocity readings preferably are made every three to five seconds, although this can vary as desired.

If in the next reading sensor 20B indicates a flow rate of 175 cfm and the CO2 sensor in the room reads 425 ppm, the control unit 30 continues to close damper 15 to reach an ambient air flow rate that is in the first segment toward the goal of raising room CO2 level to the segment CO2 set point of 550 ppm.

If in the next reading sensor 20B indicates a flow rate of 160 cfm and the CO2 sensor reads 425 ppm, the control unit 30 continues to close damper 15 because the CO2 ppm has not reached 550 ppm at set point RV2.

If at the next reading sensor 20B indicates a flow rate of 110 cfm and the CO2 sensor reads 560 ppm, then the control unit begins to open damper 15 to increase the ventilation rate to reduce the CO2 concentration to 550 ppm or less.

If at the next reading sensor 20B indicates a flow rate of 140 cfm and the CO2 sensor reads 450 ppm, then control unit 30 begins again to close the damper 15 since the CO2 concentration is once again less than 550 ppm. When the damper cfm is in the first segment (108 to 168), the desired CO2 set point is 550 ppm (or less). When the damper cfm is in the second segment (168 to 228), the desired CO2 set point is 668 ppm (or less). And so on.

If at the next reading, the CO2 ppm in the room is 740 ppm and the velocity sensor 20B reads 150 cfm, control unit 30 opens damper 15 to increase the flow of ventilation air.

If at the next subsequent reading, the CO2 ppm in the room is 680 ppm and the velocity sensor indicates an ambient air flow rate of 240 cfm, then the cfm being utilized and the CO2 concentration are each in the third segment (228 to 288) in FIG. 3 and the CO2 set point utilized is the set point for segment three, namely 738 ppm (or less). In addition, since the CO2 concentration is less than 738 ppm, the control unit 30 begins to close damper 15 toward the minimum flow rate of 228 cfm for the third segment.

If in the next subsequent reading, the CO2 room sensor indicates a concentration of 670 ppm, and the velocity sensor 20B indicates a flow rate of 235 cfm, the control 30 continues to slowly close damper 15 toward the minimum flow rate of 228 cfm for the third segment. As long as the ambient air flow (and the CO2 concentration) is in the third segment, the cfm measured by sensor 20B should not drop below 228 cfm. And so on.

3. Within a short period of time, the cfm value and CO2 value stabilize and the system modulates as necessary to meet the appropriate room CO2 sensor setpoint RV2, RV3, RV4, RV5, RV6. The initial set point concentration values for CO2 control are relatively low and the ventilation system responds immediately, overshooting the appropriate set point value. Very quickly, within a minute or so, the room sensor combines with the velocity sensor, in cfm, to determine which segment is in reference for the CO2 control set point reset value.

4. When an individual enters the room, a CO2 sensor in the room monitors the increase in CO2 above the initial stable RV1=300 ppm in the room (essentially the ambient air CO2 level) and begins to open the outside air damper to increase the amount of ventilation air entering the room. The first 'active' occupied CO2 concentration checkpoint RV2 is 250 ppm above ambient or 550 ppm total.

5. As the outside air damper opens, the velocity sensor in the air stream registers the increase in air flow and sends the value to the control unit 30 to determine into which segment air flow value the air quantity registers.

6. Since one individual will generate a CO2 amount requiring approximately 10 cfm of outside air for dilution to 700 ppm above ambient, approximately 6 students can enter into the room at the first segment upper CO2 limit RVd2 of 250 ppm above ambient. The 6 student load is coincidental with the first segment maximum air flow rate of [(Vp)(Occact)+(Va)(x)], as it should be. The total outside air entering the room at this segment limit is 108 cfm (area ventilation rate)+60 cfm (people ventilation rate)=168 cfm total ventilation rate.

7. During all modes of area occupancy (when the first person enters the room), the initial checkpoint or segment target CO2 value RVd2 added to the OSACO2 will be the first segment CO2 limit RV2. The only time the 300 ppm total RV1 (or 0 ppm above ambient) concentration will occur is when the room is unoccupied. The minute a person enters, the first segment value will define the limits until its maximum segment air flow value in cfm is exceeded. By way of example, the maximum air flow for segment one is, in the example set forth in FIG. 3, 168 cfm. The maximum air flow for segment two is 228 cfm.

8. As additional students enter the room, the CO2 sensor will register a coincidental rise in the CO2 concentration and the control unit 30 will open the outside air damper 15 further if the CO2 concentration exceeds the set or check point value RV2, RV3, etc. associated with the segment in which the damper ventilation rate is operating. When the ventilation rate exceeds the first segment 168 cfm value, which also defines the upper limit of the first segment CO2 value (i.e., 550 ppm), the measured air quantity enters into the region of the second segment, which defines an upper air flow rate of 228 cfm and a CO2 concentration upper limit of 368 ppm above the ambient air CO2 concentration, or, as is shown in FIG. 3, a total CO2 concentration RV3 of 668 ppm.

9. The 'five segment' calculation example created above defines the air flow rates and CO2 concentration limits of each segment. It does not control the space CO2. The space CO2 is limited by the CO2 sensor in the room and the operation of the outside air control dampers. The calculation accumulates the sensed outside air quantity and redefines the CO2 sensor set point, nothing more. However, this is the most critical part of Indoor Air Quality management, maintaining the proper CO2 limits with a moving occupant ventilation rate target combined with a fixed area ventilation rate.

10. As additional students enter the room and the CO2 concentration rises and the ambient air input damper 15 is opened further, a greater outside air quantity is measured by the velocity sensor. As the velocity sensor value in cfm continues to change, it will register into any one of the segment air value limits. When the CO2 sensor takes a reading and transmits its value to the control unit 30, the control unit 30 will look at the air quantity recorded at the velocity sensor, determine which segment it falls into, and compare the segment CO2 limit to the CO2 concentration sensed. The controller will send a signal to the outside air control damper to increase or decrease the air to the room to meet the segment set point RV2, RV3, RV4, RV5, RV6. Then, as the sensed air quantity continues to change, in response to the generation of CO2 (or to a decrease in CO2 when children leave the room) in the space, it will redefine which segment is applicable and redefine the CO2 limit as necessary. This is a dynamic function. CO2 measurements are taken, air flow rates are adjusted, CO2 measurements are taken, all the while, the calculations continue to reset the CO2 concentration target.

11. And so on.

Because measurements are taken constantly, it is not a good control scenario to make continuous adjustments because the control dampers will 'hunt' for a control point and never achieve it. Creating segments, where the CO2 target value is fixed for more than a minute amount of change of air quantity, allows for a more stable control of outside air quantity and helps prevent rapid cycling of air conditioning equipment in an attempt to meet a room temperature set point with a 'wild' mixed air temperature entering the cooling or heating coils or furnace.

Discussion of Formula. Since actual numbers sometimes aide understanding a calculation process, the values used in the above example are referenced in the following discussion.

This particular method of controlling the flow of ventilation air into a room is to continuously ventilate a room with ambient air at a base rate equivalent to the Area Outdoor Air Rate set forth in ASHRAE 62.1-2010: Table 6.1, and to increase the ventilation rate whenever an individual enters the room, and to decrease the ventilation rate whenever an individual leaves the room. For each person entering the room, the ventilation rate is increased to meet an approximate air quantity based on the People Outdoor Air Rate set forth in ASHRAE 62.1-2010: Table 6.1. In the above example, the People Outdoor Air Rate for an individual is 10 cfm. The 10 cfm value per person was set by ASHRAE 62.1-2010 after completing several studies which determined that for children 5-8 years of age, taking into account their volumetric CO2 generation and their activity levels, that it takes approximately 10 cfm per person to properly dilute the space CO2 to 700 ppm above ambient. 700 ppm above ambient CO2 is recognized by ASHRAE as the target CO2 concentration to minimize objectionable odor recognition for 80%+of occupants newly entering a space who have not become acclimated to the people generated odors of the space. Therefore, for the sake of this particular example calculation, it will be established that for approximately each 10 cfm of air entering the area through the outside air control damper, one student will be accounted for in the ventilation calculation. ASHRAE is the American Society of Heating, Refrigerating, and Air Conditioning Engineers.

Stated for this calculation, the base ventilation rate is (x)(Va), which in the above example is (900 sq ft)(0.12 cfm/sq. ft)=108 cfm. The system would, consequently, ventilate an empty room at 108 cfm. When the first person enters the room, the ventilation rate is increased by 10 cfm to 118 cfm. When the second person enters the room, the ventilation rate is increased to 128 cfm, and so on. Each time a person leaves the room, the ventilation rate is decreased by approximately 10 cfm.

Establishing that this control method utilizes the formula set forth above to control the ventilation of a room with ambient air, the formula calculates for set checkpoints at desired CO2 levels in the room above the CO2 level in the ambient air.

Examining the formula further, each air stream ventilation rate has its actual or maximum allowable CO2 concentration attribute. The area ventilation rate air stream contributes to the equation 108 cfm of 300 ppm CO2 concentration. This would be like comparing 108 gallons of water per minute at 300 degrees F. (under high pressure of course). The people ventilation rate air stream CO2 contribution to the equation includes the base 300 ppm of CO2 and allows for an additional 700 ppm CO2 increase. The people ventilation rate contributes 1000 ppm CO2 (total) for each cfm of air. When we are establishing the maximum allowable CO2 concentration at its specific target cfm limit, we know that the 300 ppm CO2 air stream will dilute the 1000 ppm CO2 air stream. We are adding the air stream CO2 values to quantify the assimilation of the total CO2 into the total of the two air streams and determine the influence of the ambient CO2 air quantity on the room generated CO2. Once assimilated, the resultant CO2 concentration should represent the discounted CO2 value, which achieves the ASHRAE defined individual ventilation air flow rate requirements for area and people.

In general, the formula has to take into account ventilation air flow into the room for two purposes:

1. Area ventilation of the room. The area ventilation air flow rate is determined using the Area Outdoor Air Rate Va set forth in ASHRAE Table 6.1 and using the size of the room in square feet.
2. Ventilation air to compensate for additional CO2 produced when individuals are in the room. This people ventilation air flow rate is determined using the People Outdoor Air Rate Vp set forth in ASHRAE Table 6.1 and the number of people in the room.

A. Area ventilation air flow rate for the room.
This ventilation rate is represented in the formula by:

$$[(CRT \text{ or } HRT)(x)(Va)]$$

And, when CRT or HRT and Altcorr each equal one, this becomes: $(x)(Va)$

B. Ventilation air flow rate for people
This ventilation rate is represented in the formula by:

$$(Vp)(Occmax)$$

C. Calculation of an IRVcfm.
The cfm of ventilation air is, as noted, physically measured to determine the cfm location on the horizontal axis of an IRV graph. The maximum cfm of a segment (i.e., the IRVcfm) is, on the IRV graph, associated with an RV. When the IRVcfm of an RV is reached or exceeded, as determined by the physical measurement of the incoming ventilation air in cfm, the next IRVcfm is selected.

One method of calculating an IRVcfm adding the base room area ventilation, Rb, to the ventilation for the number of people in a room, (Occact)(Vp). These terms are seen in EQ. 1 described above.

A second method of calculating an IRVcfm is to add the base room area ventilation to a calculation in which the total or maximum people ventilation rate of (Vp)(Occmax) is divided by the number of segments, n, and multiplied by the number of segments, $(S_{(0, 1, 2, 3, 4, 5)})$, which are, when moving from left to right on the horizontal axis of an IRV graph from the base area ventilation rate in cfm, required to reach the IRVcfm at issue.

Therefore, an IRVcfm=[(Vp)(Occmax)/$n$]
$(S_{(0,1,2,3,4,5)})$

Using either the first or the second method of calculating an IRVcfm gives the same result.

Figure 4:
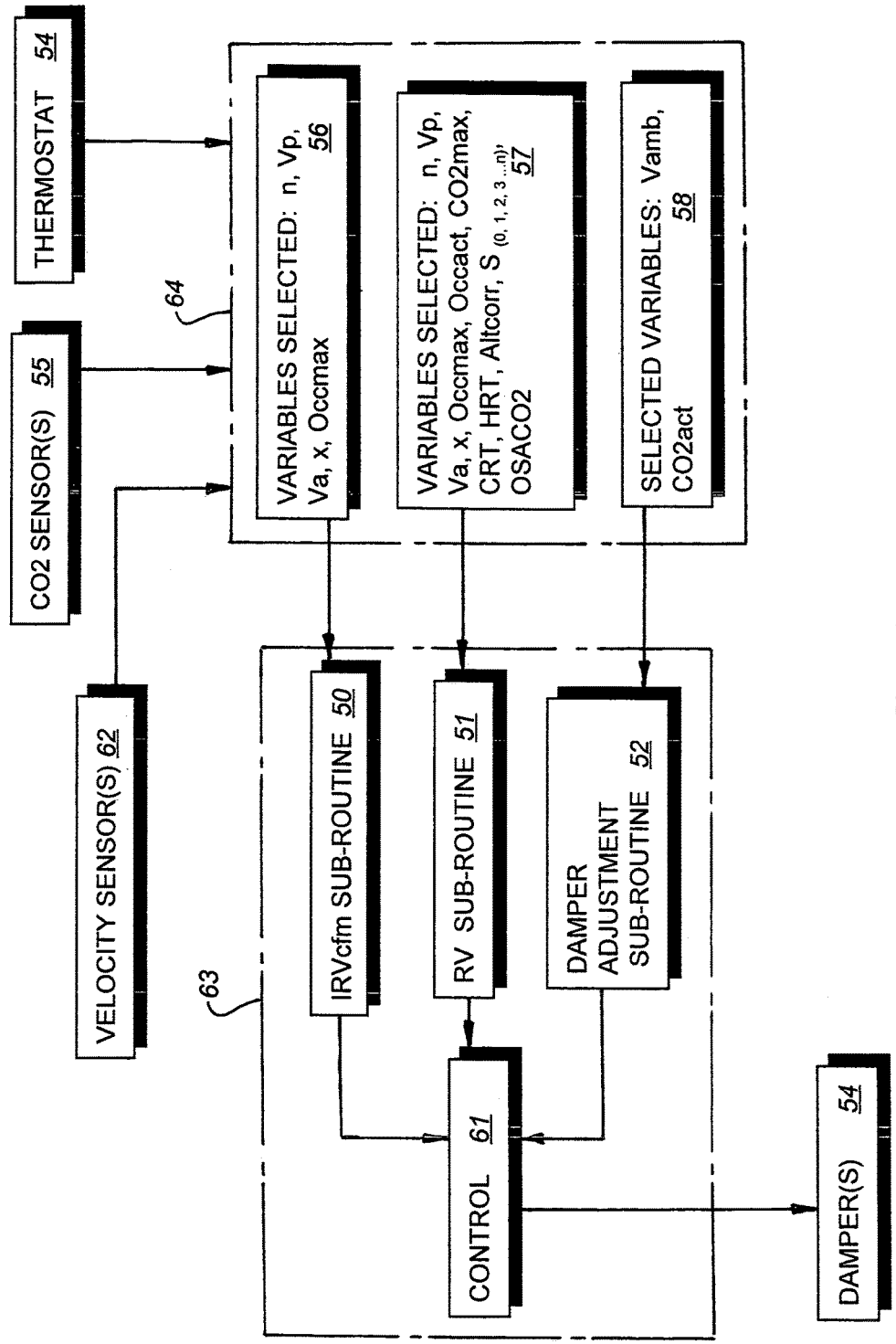
FIG. 4 is a block flow diagram illustrating a heat transfer and ventilation control system constructed in accordance with the invention.

The block flow diagram of FIG. 4 illustrates an embodiment of a ventilation system that can be utilized in the practice of the invention. The system includes a computer which can be utilized in the control unit 30 of ventilation unit 10. The computer includes controller 62 and memory 64. The computer can be a digital computer, analog computer, hybrid computer, or other programmable apparatus. In practice, the very large majority of computers comprise digital computers.

The memory 64 can be any suitable prior art memory unit such as are commonly used in digital or other computers. For example, electromagnetic memories such as magnetic, optical, solid state, etc. or mechanical memories such as paper tape.

Velocity sensor(s) 62, indoor and outdoor CO2 sensors 55, and room thermostat 54 input data to memory 64, and can also input the data to controller 63. An outdoor temperature sensor, room temperature sensor, and indoor occupancy sensor, or any other desired sensor or data input means can also be utilized to input data to memory 64 or controller 63.

Controller 63 includes IRVcfm calculation sub-routine 50, RV calculation sub-routine 51, and damper adjustment sub-routine 52. IRVcfm calculation sub-routine 50 utilizes variables n, Vp, Va, x, Occmax input 56 from memory. RV calculation sub-routine 51 utilizes EQ 1 above (Control System Ventilation Formula) and the variables 57 from memory 64 including n, Vp, Va, x, Ocmax, Occact, CO2max, CRT, HRT, Altcorr, $S_{(0, 1, 2, 3 \ldots n)}$, and OSACO2 to calculate RV values like those on the graph of FIG. 3. The damper adjustment sub-routine 52 utilizes variables 58 from memory 64 including Vamb (the desired velocity of incoming air to achieve the desired ppm CO2 (RV1, RV2, etc.) at the cfm checkpoints (108 cfm, 168 cfm, etc.) on the graph of FIG. 3. Once control 61 utilizes sub-routine 52 to calculate the desired cfm, control 61 transmits the necessary signals to damper(s) 54 to achieve the desired cfm of incoming ventilation air.

Figure 5:
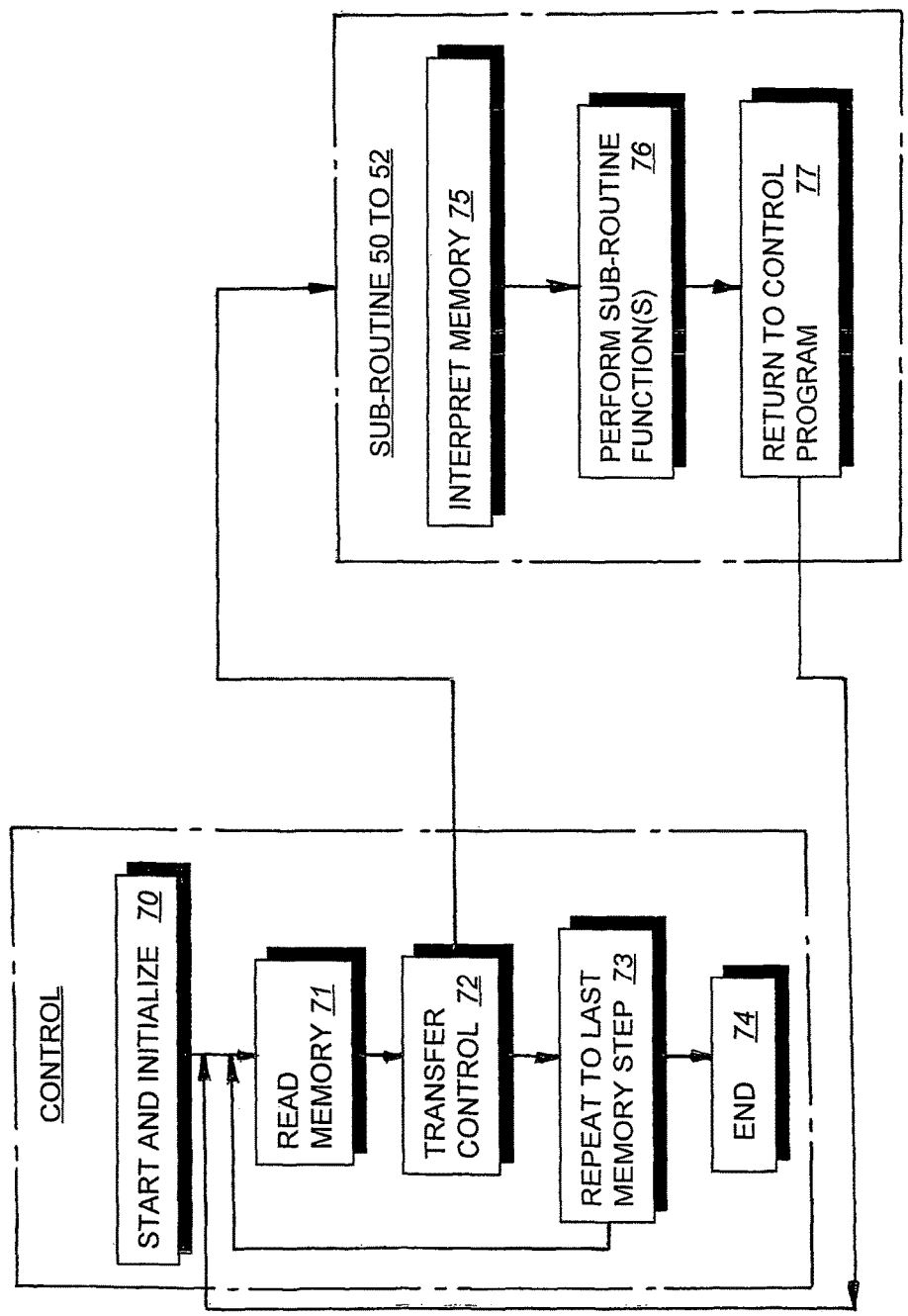
FIG. 5 is a block flow diagram illustrating a logic sequence utilized by a controller in the system of the invention illustrated in FIG. 4.

FIG. 5 is a block flow diagram which illustrates a typical program or logic function which is executed by the controller 63. The basic control program consists of commands to "start and initialize" 70, "read memory" 71, and "transfer control" 72 sequentially to one of subroutines 50 to 52. Each sub-routine 50 to 52 includes the steps of "interpret memory" 75, "perform the sub-routine function(s)" 76 (i.e., determine IRVcfm, RV. etc.), followed by "return to control program" 77. The sub-routines are repeated as indicated by the "repeat to last memory step" 73, followed by an "end" 74 program step which completes the execution of the program.

Control unit 30 controls the flow rate in cfm of ventilation air through unit 10 by opening and closing dampers 15, 16, 17. Fans 13 and 14 increase or decrease their flow volumes based on a static pressure sensor in the outside air duct or the exhaust air duct. A variable speed motor controller increases or reduces the fan speed to maintain a selected static pressure set point. The control unit 30 changes the speed of the fan motors to try maintain a static pressure level in each duct.

An alternate embodiment of the invention is illustrated in FIGS. 6 and 7. In FIGS. 6 and 7, D10 is an air duct integrated with duct D30 for return air to air conditioner 220; D20 is an air duct directing cooled (or heated) supply air S10 from air conditioner 220 back to the room; D30 is a duct through which return air from the room flows in unit 100; D40 is a duct that directs return air into the coil/fan section of air conditioner 220; D50 is a duct that directs ambient air A10 into unit 100 and into one side of heat exchange unit 120 and between and through finned layers comprising unit 120; D60 is a duct that directs exhaust/relief air from heat exchange unit 120 into the ambient atmosphere; A10 and A20 are ambient air streams flowing into duct D50; A10 is a fan induced ambient air stream directed through or over heat exchange unit 120; A20 is a fan induced ambient air stream that bypasses heat exchange unit 120 and travels through duct D50 and unit 100 to joint return air stream R10 in the manner illustrated in FIG. 7; and R20 is a portion of the return air stream that is drawn over or through heat exchange unit 120. In FIG. 7, S10 is a combination of return air R10 and outside ambient air A20. In FIG. 6, S10 is a combination of a portion R10 of the return air and of ambient air A10 that has passed through heat exchange unit 120. In FIG. 6, portion R20 of the return air passes through heat exchange unit 120 and out through duct D60. FIG. 7 does not call out a portion R20 because portion R20 is zero, i.e., in FIG. 7 none of the return air stream is directed through heat exchange unit 120. In FIG. 7, portion R10 comprises the entire return air stream, minus relief air which exits the room to outside the building through normal building relief air paths.

FIG. 6 illustrates the heat recovery mode of the ventilation system of the invention. FIG. 7 illustrates the economizer mode of the ventilation system of the invention. In the economizer mode, the temperature of the ambient air stream A20 permits it to be added directly to the return air stream R10 and obviates the necessity of passing an ambient air stream A10 over or through heat exchange unit 120.

Figure 11:
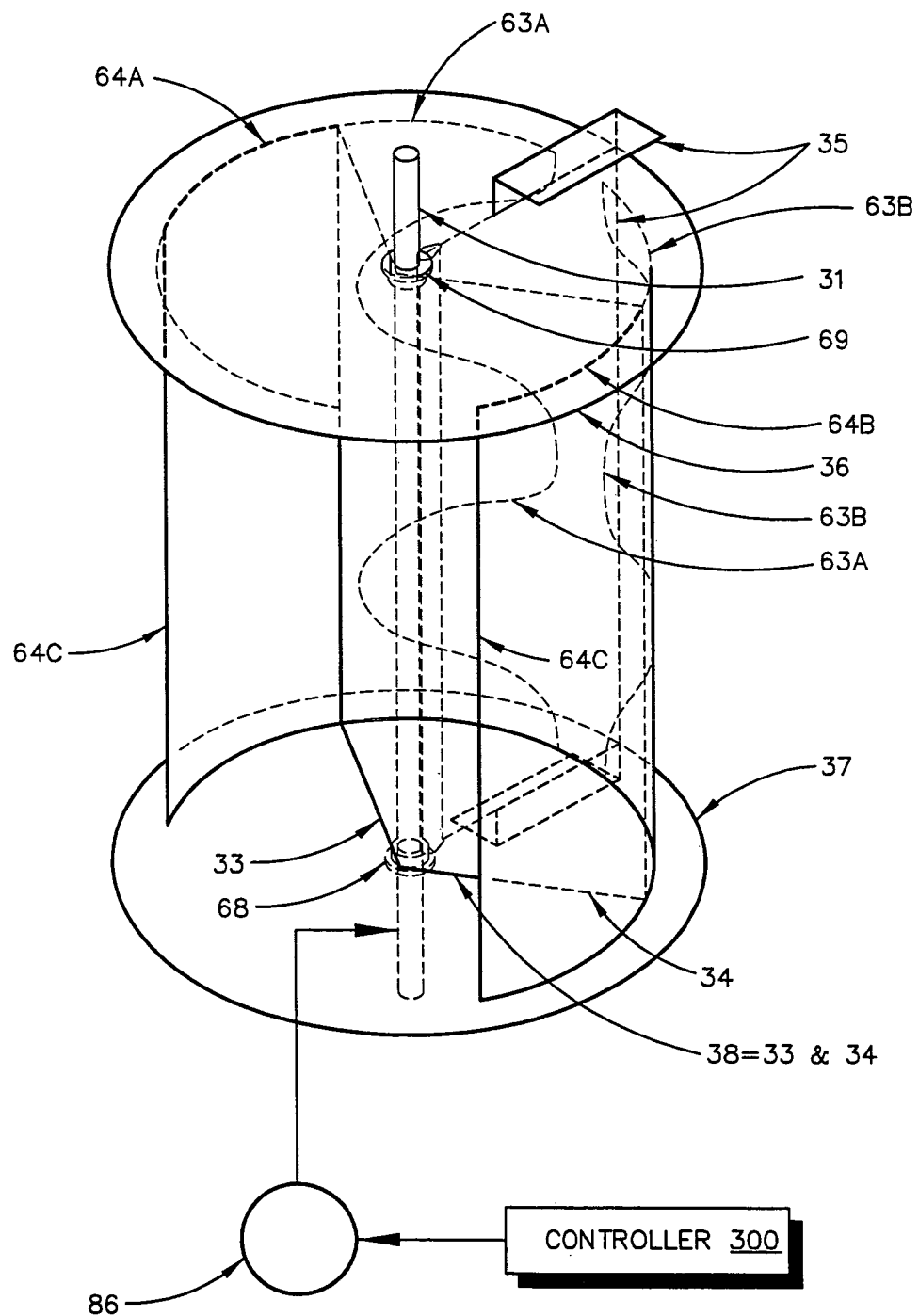
FIG. 11 is a perspective view of the assembled duct-damper assembly of FIG. 9 in conjunction with a control system and illustrating further construction details thereof.

In the embodiment of the invention illustrated in FIGS. 1 and 2, air streams A1 and R2 must make ninety degree turns while traversing ventilation unit 10. Air stream A1 makes a ninety degree turn to enter heat exchange unit 12. Air stream R2 makes a ninety degree turn after exiting heat exchange unit 12. Such ninety degree turns produce increased upstream pressure and increase the energy required for air streams A1 and R2 to pass through ventilation unit 10. In contrast, in FIGS. 6 and 7, air streams A10 and R20 need not make ninety degrees turns to while entering or exiting, respectively, heat exchange unit 120. Heat exchange unit 120 is rotated such that its faces are canted at angles less than ninety degrees with respect to walls 80 and 81 (FIG. 11). Air stream A10 need not make a ninety turn to enter unit 120. This decreases the energy consumed by air streams A10 and R20 while passing through ventilation unit 100.

In FIG. 6, damper assembly 150 is in a first open operative position which permits air stream A10 to flow through duct D50, through the left side of damper assembly 150, and into heat exchange unit 120. When angled damper blade 38 is in the first open operative position, air stream A20 is prevented from flowing into duct D50, through the right side of damper assembly 150, and into duct D10 along a path to the right of heat exchange unit 120 to join return air stream R10 in the manner illustrated in FIG. 7. Air stream A20 is produced only when damper blade 38 is in the second open operative position illustrated in FIG. 7. When damper blade 38 is in the second open operative position, air stream A10 is not produced because damper blade 38 blocks the path of travel illustrated in FIG. 6. When damper blade 38 is in the first open operative position, air stream A20 is not produced because damper blade 38 blocks the path of travel illustrated in FIG. 7.

When portion R20 of the return air stream travels through heat exchange unit 120 in the manner illustrated in FIG. 6, damper assembly 160 is in a first open operative position which permits air stream R20 to exit through duct D60. Alternatively, when a portion R20 of the return air stream does not pass through heat exchange unit 120, damper assembly 160 is in the second closed operative position illustrated in FIG. 7. Damper assemblies 150 and 160 each rotate or pivot about shafts 31 and 32, respectively (FIGS. 6 and 7).

FIGS. 8A, 8B, and 8C further illustrate three general operative positions of damper 150. In FIG. 8C, damper assembly 150 is in a third closed operative position which prevents ambient air from flowing into and through duct D50 and past damper 150. In FIG. 8B, damper assembly 150 is rotated from the third closed operative position of FIG. 8C in the direction of arrow B (FIG. 8B) to the second open operative position allowing ambient air to follow the path indicated by arrow A20 in FIG. 8B and FIG. 7. In FIG. 8A, damper assembly 150 is rotated from the third closed operative position of FIG. 8C in the direction of arrow A (FIG. 8A) to the first open operative position allowing ambient air to follow the path indicated by arrow A10 in FIG. 8A and FIG. 6. As would be appreciated by those of skill in the art, damper assembly 150 can be rotated (1) from the second open operative position through the third closed operative position to the first open operative position, and vice versa, (2) from the second open operative position back to the third closed operative position, and (3) from the first open operative position back to the third closed operative position. The majority of the time, damper assembly 150 will be in either the first or second open operative position.

The particular location of damper blade 38 when it is in the first (or second) open operative position is determined by the algorithm earlier described herein. The algorithm determines at any given instant in time a desired flow rate of air, either into the heat exchange unit 120 via the airflow path generally located by arrow A10 or bypassing heat exchange unit 120 via the air flow path generally located by arrow A20. As is indicated in FIG. 11, once controller 300 determines that damper blade 38 needs to be operated in, for example, the second operative position of FIG. 8B, controller 300 is using the previously described algorithm (or another desired algorithm) to continuously calculate a desired flow rate of air, and send signals to motor 86 to adjust the position of damper blade 38 to increase or decrease the flow rate of air along the path generally indicated by arrow A20 (FIG. 7). Motor 86 turns shaft 31, and therefore damper blade 38 and shaft 31, in the direction of arrow B or in a direction opposite that of arrow B. Minute adjustments of the damper blade 38 rotation in damper assembly 150 will continue to occur to meet the algorithm calculated air flow rate requirements.

FIG. 9 is a top (plan) view illustrating construction details of damper assembly 150 and its operatively associated divider panel 35. When ambient air is traveling along the path indicated by arrow A20, panel 35 (along with associated circumscribing walls of duct D50) prevents ambient air from crossing over into the path that is followed by air traveling along a path indicated by arrow A10. When ambient air is traveling along the path indicated by arrow A10, panel 35 (along with the associated circumscribing walls of duct D50) prevents ambient air from crossing over into the path that is followed by air traveling as indicated by arrow A20.

Figure 12:
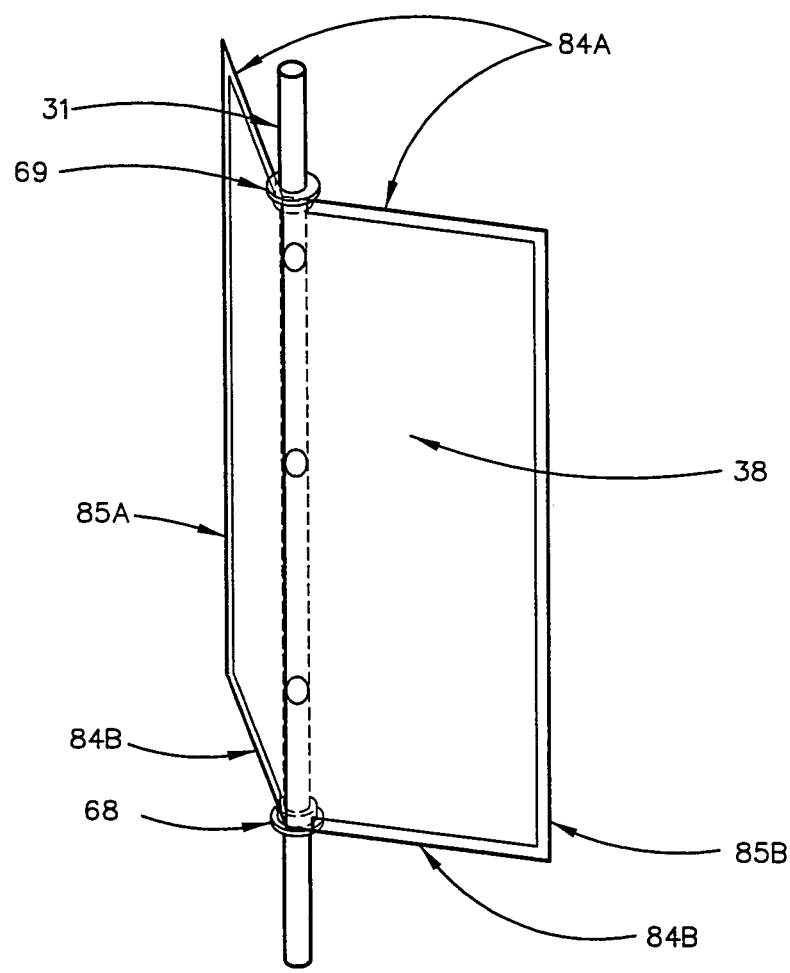
FIG. 12 is a perspective view of FIG. 11 illustrating an angled damper blade configuration and damper construction.
Figure 13:
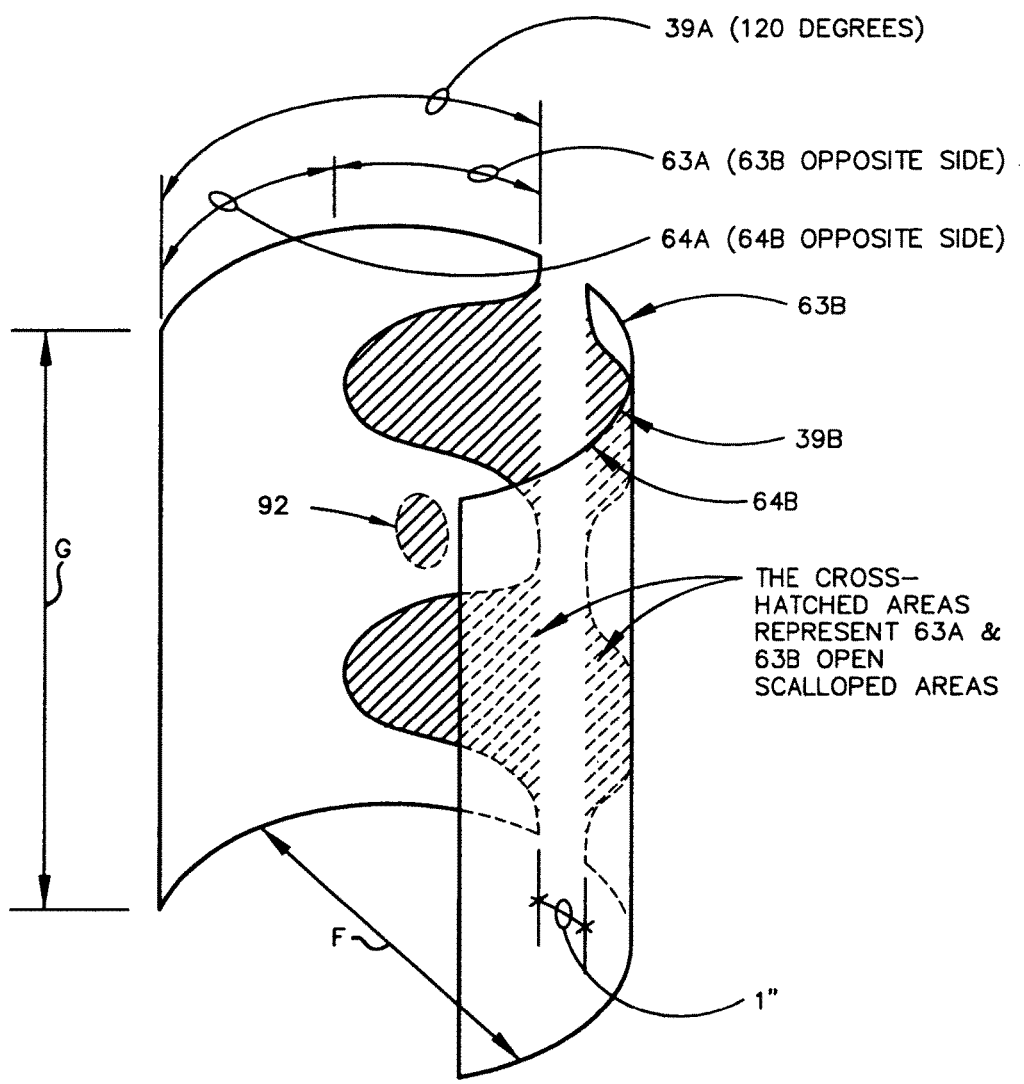
FIG. 13 is a segregated perspective view of FIG. 11 of the drum arc segments illustrating the undulating surface extending between the scalloped edges of the damper.
Figure 14:
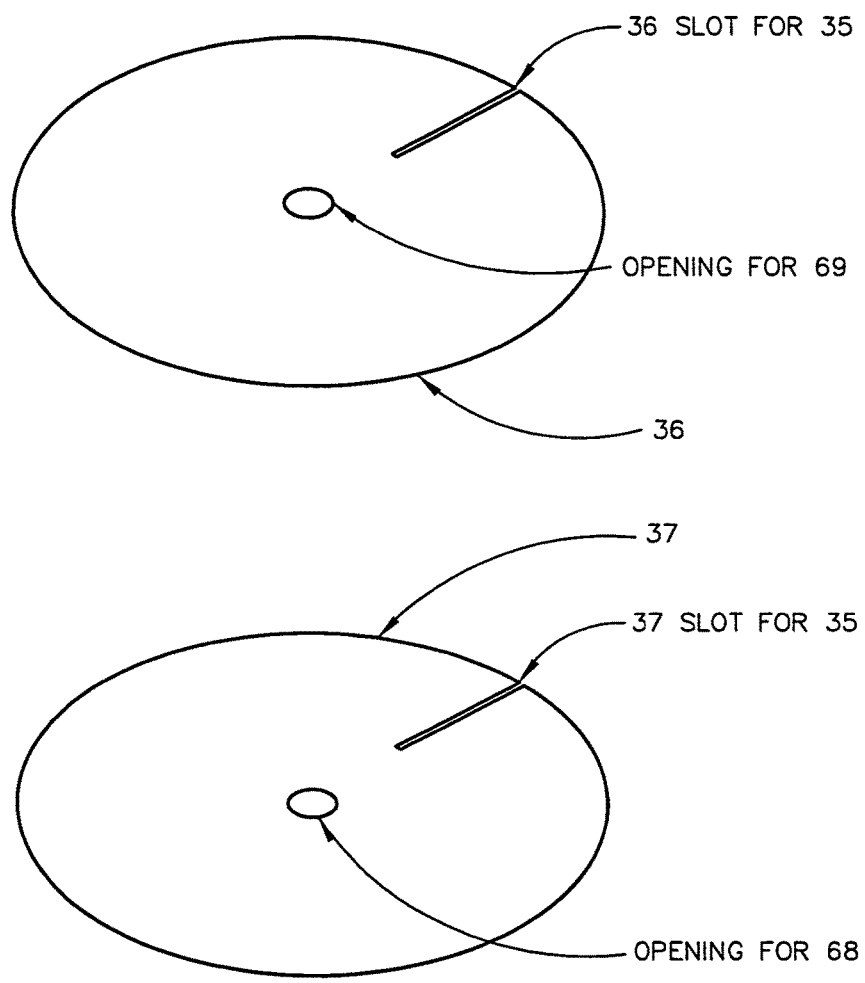
FIG. 14 is a segregated perspective view of FIG. 11 of the solid drum top and bottom of the damper assembly illustrating additional construction and operational details thereof.

Damper assembly 150 includes drum arc segments 39A and 39B with scalloped edges 63A and 63B, and solid contoured panels 64A and 64B (FIGS. 11 and 13). Damper assembly 150 also includes a slotted top generally circular panel 36 and a slotted bottom generally circular panel 37. The shape and dimension of panel 36 is presently equivalent to that of panel 37, although that need not be the case. Angled damper blade 38 extends between and interconnects spaced apart, scalloped edge drum arc segments 39A and 39B (FIG. 9). As is illustrated in FIG. 13, contoured panels 64A and 64B extend from the interior scalloped edges 63A and 63B approximately 60 degrees away from the scalloped edges, finishing with a linear edge which is perpendicular to the slotted drum top 36 and slotted drum bottom 37. Damper assembly 150 can be formed in any desired manner and can comprise a solid piece of material. It is presently preferred that damper assembly 150 be fabricated from sheet metal or sheet plastic in order to reduce the amount of material and weight required to produce a system in accordance with the invention. Any desired system can be devised to seal appropriately the peripheral edges of angled damper blade 38 to prevent air from flowing between damper blade 38 and scalloped drum segments 39A and 39B unless damper blade 38 is in the first or second open operative position. In FIG. 12, for example, elongated fixed neoprene or rubber edge gaskets 84A and 84B sealingly engage the top 36 and bottom 37 of the damper assembly 150, and elongated neoprene or rubber edge seals or gaskets 85A, 85B sealingly engage portions of drum segments 63A and 63B. In FIG. 11, and enhanced in FIG. 12, angled damper blade 38 is in the third closed operative position. In the third operative position, the entire length of each straight/perpendicular edge 84A and 84B and 85A and 85B is in contact with the interior solid, contoured or flat surfaces of the damper assembly 150 so that air cannot enter duct D50 and flow past damper assembly 150. Edge seals/gaskets 84A and 84B are fixedly attached to the top and bottom of angled damper blade 38 and seals/gaskets 85A and 85B are fixedly attached to the sides of angled damper blade 38. Bushings/bearings 69 and 68 sealingly engage shaft 31. Edge seals/gaskets 84A and 84B sealingly slide against slotted top and bottom 36 and 37, respectively. Edge seals/gaskets 85A and 85B sealingly slide against scalloped drum arcs 39A and 39B contoured interior surfaces FIG. 12 depicts how rotatable shaft 31 can extend completely through and be fixedly attached to angled damper blade 38. Rotatable shaft 31 can be drilled and tapped axially in angles separated by 120 degrees to match the angle of the damper blade. Threaded, locking screws or bolts can engage the tapped and threaded shaft openings, from the blade side of the shaft, to a maximum of 75% of the threaded depth to secure the blade to the shaft at a minimum of three places per angled surface.

As can be seen in FIGS. 8C and 9, blade segments 33 and 34 of angled damper blade 38 are not co-linear, but instead together form an inner obtuse angle of less than one hundred and eighty degrees, typically presently about 120 degrees. This provides space for scalloped drum segments 39A and 39B such that in FIGS. 8C and 9, edges 85A and 85B of damper blade segments 33 and 34 are in their entirety on the solid contoured, not scalloped, inner surfaces of drum arc segments 64A and 64B. In FIG. 8A, angled damper blade 38 will rotate from the third operative position through an arc having a length of between 0 degrees and 60 degrees toward the first operative position, allowing increasing air flow amounts to pass through the scalloped opening 63A of drum segment 39A in direction of air flow A10. Similarly for FIG. 8B, angled damper blade 38 will rotate from the third operative position through an arc of between 0 degrees and 60 degrees toward the second operative position, allowing increasing air flow amounts to pass through the scalloped opening 63 of drum segment 39B in direction of air flow A20.

During normal operation of shaft 31 and motor 86, when damper blade 38 is in the first operative position of FIG. 8A, damper blade segment 34 maintains contact with drum segment 64B and does not rotate past the perpendicular edge 64C (FIG. 11) of drum segment arc 64B. In FIG. 8A, damper blade 38 has rotated clockwise from the position of FIG. 8C through its greatest possible arc of travel and is in a first "fully open" position. Similarly, during normal operation of shaft 31 and motor 86, when damper 38 is in the second operative position of FIG. 8B, damper blade segment 33 maintains contact with drum segment 64A and does not rotate past the perpendicular edge 64D (FIG. 11) of drum segment arc 64A. In FIG. 8B, damper blade 38 has rotated counterclockwise from the position of FIG. 8C through its greatest possible arc of travel and is in a second "fully open" position.

The diameter, indicated by arrows F in FIG. 13, of damper 150 is presently ten inches, and the height, indicated by arrows G in FIG. 13, of damper 150 is presently sixteen inches. In the majority of cases, the diameter of damper 150 will be in the range of nine to eleven inches, and the height of damper 150 will be in the range of fifteen to seventeen inches. The diameter of damper 150 may, however, be in the range of six to twelve inches and the height of damper may be in the range of sixteen to thirty inches. The diameter and height of damper 150 are varied to meet desired air flow requirements, to meet sizing requirements of ducting and air conditioning units, and/or to meet other design criteria.

The referenced 10 inches diameter by 16 inches high damper assembly 150 has a generally cylindrical shape and includes two contoured panels 64A, 64B each with a scalloped edge 63A, 63B, respectively, which edge 63A, 63B provides a control surface for damper blade 38 to regulate air flow through one side of the damper module while damper blade 38 prevents air flow through the other side of the damper module. The contoured panels 64A, 64B of damper 150 each are configured with a 10 inches diameter, and extend through a 120 degree long arc. The 120 degree long arc includes a scalloped edge 63A, 63B which extends through a 60 degree long arc, and, also includes an arcuate solid panel with a vertical cut-off 64C, 64D (FIG. 11) which is perpendicular to the top and bottom of the drum. The solid panel extends through a 60 degree long arc. Each scalloped edge 63A, 63B is exposed to the air stream in varying amounts to allow regulation of air flow through the open areas in edge 63A, 63B using damper blade 38 in its varying positions contacting a solid portion of the scalloped segment arc length.

Figure 15:
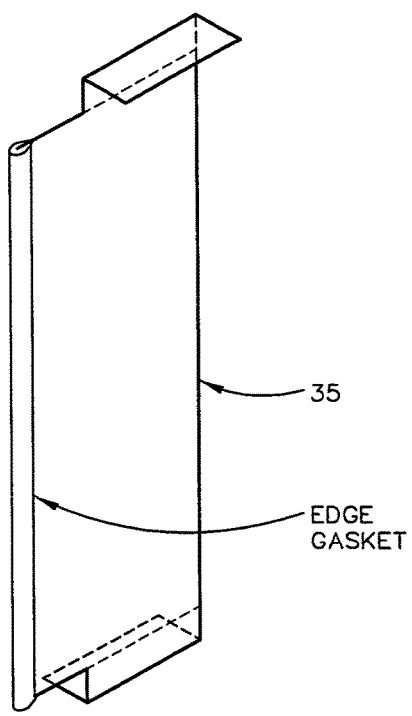
FIG. 15 is a segregated perspective view of FIG. 11 of the air diverter panel illustrating additional construction and operational details thereof.

The top 36 and bottom 37 of the damper assembly 150 are comprised of generally circular discs which are furnished with openings of the required size in the center of the discs. The openings are used to install the actuator shaft bushings/bearings 68 and 69. A slot is provided in each of the top 36 and bottom 37 disc to install the air diverter partition 35, FIG. 15. The air diverter partition separates the two air streams of A10 and A20 as required for the first operative position and the second operative position respectively of damper blade 38. Further, air diverter partition 35 extends through the top 36 and bottom 37 and attaches to the inside top and bottom of duct module D50. Air diverter partition 35 is attached to the top 36 and bottom 37 and sealed to prevent air leakage between first operative position air stream A10 and second operative position air stream A20.

Figure 10:
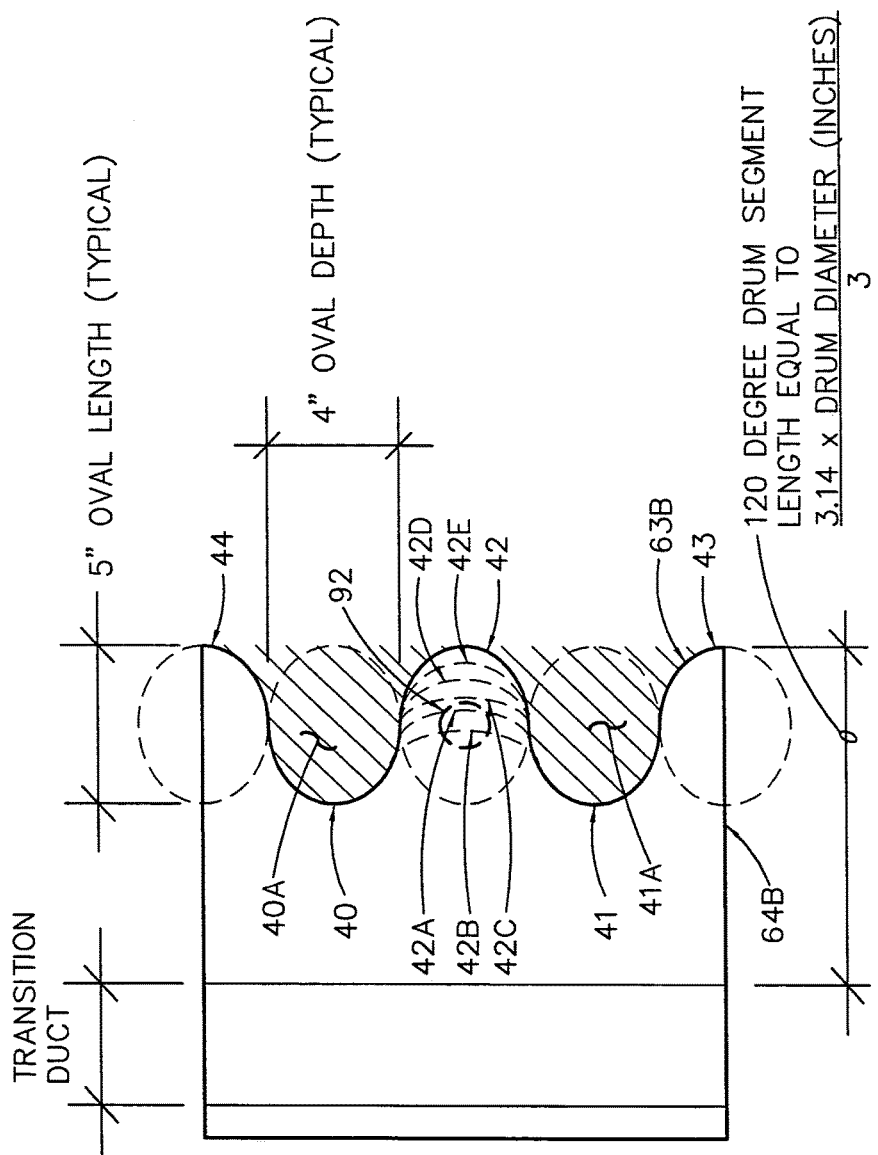
FIG. 10 is a side view illustrating the drum damper scalloped arc segment configuration.

When damper assembly 150 is in the economizer mode illustrated in FIG. 8B, the position of damper blade 38 is, for a damper assembly 150 with a diameter of ten inches and a height of sixteen inches, adjusted to vary the air flow A20 between 100 cfm (cubic feet per minute) and 700 cfm. When the damper assembly 150 is in the heat recovery mode illustrated in FIG. 8A, the position of damper blade 38 is, for a damper assembly 150 with a diameter of ten inches and a height of sixteen inches, adjusted to vary the air flow A10 between 100 cfm and 450 cfm. One way to increase the airflow A10 or A20 for a given amount of revolution of damper blade 38 is to make the damper assembly 150 taller. Another way to increase the airflow A10 or A20 for a given amount of revolution of damper blade 38 is to increase the diameter of the damper assembly 150. Still another way to increase the airflow A10 or A20 for a given amount of revolution of damper blade 38 is to reduce the height of damper assembly 150 and increase the diameter of the damper assembly 150 by a desired amount. Yet another way to increase the airflow of damper blade 38 is to increase the height and diameter of damper assembly 150. And yet another way to increase the airflow of damper assembly 150 is to change the scallop contours of arc segments 63A and 63B as illustrated by 42A, 42B, 42C, 42E, etc., FIG. 10. Reducing the airflow of damper assembly 150 is accomplished by carrying out the reverse of the foregoing size increasing procedures. The minimal desired airflow A10 or A20 into a classroom is typically 100 cfm.

The airflow A20 in the economizer mode of FIG. 8B is increased by rotating damper blade 38 and shaft 31 in the direction of arrow B (FIG. 8C). The incorporation in scalloped edge 63B of arcuate edge segments 40, 41, 43, 44 and 42, 42A, 42B, 42C, 42D or 42E, FIG. 9 is important in this respect because with each degree of rotation of damper assembly 150 in the direction of arrow B, the amount of increase in airflow A20 is less than if edge segments 40, 41, 43, 44 and 42, 42A, 42B, 42C, 42D or 42E were straight and parallel to edge 85B of damper blade 38. The rotational centerline of damper blade 38 is the centerline through shaft 31. As damper blade 38 begins to open to permit airflow A20, such airflow A20 initially can pass only through the open areas 40A and 41A of "valleys" 40 and 41 (FIG. 10) of edge 63B. This facilitates being able to adjust the airflow in small increments. In the practice of the invention, it is important to be able to adjust the airflow by increments at least as small as one to two percent of the maximum airflow in the heat recovery mode and the economizer mode. Consequently, for example, if the maximum airflow in the economizer mode is 700 cfm, it is important to be able to adjust the air flow by 7 to 14 cfm. Scalloped edge 63B facilitates such airflow adjustments.

The airflow A10 in the heat recovery mode of FIG. 8A is increased by rotating damper blade 38 and shaft 31 in the direction of arrow A (FIG. 8C). The incorporation in scalloped edge 63A of arcuate edge segments comparable to those illustrated in FIG. 10 for edge 63B is important in this respect because with each degree of rotation of damper 150 in the direction of arrow A, the amount of increase in airflow A10 is less than if said arcuate edge segments were straight and parallel to edge 85A of damper blade 38. The rotational centerline of damper blade 38 is the centerline through shaft 31. As damper blade 38 begins to open to permit airflow A10, such airflow A10 initially can pass only through the open areas of "valleys" of edge 63A. This facilitates being able to adjust the airflow in small increments. In the practice of the invention, it is important to be able to adjust the airflow by increments at least as small as one to two percent of the maximum airflow in the heat recovery mode and the economizer mode. Consequently, for example, if the maximum airflow in the heat recovery mode is 450 cfm, it is important to be able to adjust the air flow by four and one-half to nine cfm. Scalloped edge 63A facilitates such airflow adjustments.

The shape and dimension of scalloped edges 63A and 63B can vary as desired. The presently preferred design of edges 63A and 63B utilizes valleys 40 and 41 and peaks 42 which each correspond to one-half (valleys 40 and 41, and peak 42) or one-quarter (peaks 43 and 44) of the shape of an ellipse. The number and shape of such peaks and valleys can vary as desired. For example, valleys 40 and 41 may have a circular contour; or, an edge 63A can have a saw tooth configuration. One or more openings, such as the opening depicted by dashed line 92 in FIGS. 10 and 13, can be formed through damper arc segments 39A or 39B near an edge 63A or 63B respectively.

In one embodiment of the invention the diameter and/or height of damper assembly 150 is decreased sufficiently such that the air flow in the economizer mode is 70 to 450 cfm; and, the air flow in the heat recovery mode is 70 to 300 cfm.

In another embodiment of the invention, the diameter and/or height of damper assembly 150 is increased sufficiently such that the air flow A20 in the economizer mode is 150 to 2100 cfm; and, the air flow A10 in the energy recovery mode is in the range of 70 to 1400 cfm.

The diameter of damper assembly 150 typically corresponds to the width of the plenum D50 of DVHR module 100. The height of damper assembly 150 presently typically generally corresponds to the height of the heat exchange unit 120.

Accordingly, in general, during the practice of the invention, the airflow A20 in the economizer mode can be in the range of 70 to 2100 cfm, and the airflow A10 in the heat recovery mode can be in the range of 70 to 1400 cfm.

The maximum possible airflow during the economizer mode is always be greater than the maximum possible airflow during the heat recovery mode.

In FIG. 11, motor 86 is utilized to rotate shaft 31, and therefore damper blade 38, in the direction of arrow A and in a direction opposite that of arrow A. Motor 86 can be a stepper motor or an infinitely modulating motor. Motor 86 preferably is able to rotate damper blade 38 in increments at least as small as 0.1 degree.

A particular advantage of the damper blade 38 is that it enables small incremental changes in air flow while at the same time enabling and controlling the modulation of two separate airflows A10 and A20. Airflow A10 is modulated independently of airflow A20. If airflow A10 is being utilized during operation of the system of the invention, airflow A20 is not being utilized, and vice versa.

One goal of the invention is to make the increase in airflow A10 or A20 linear with respect to the amount of rotation of damper blade 38. As damper blade 38 is rotated to permit airflow A10 or A20 to increase, the cross-sectional area through which airflow A10 or A20 moves increases along with the perimeter of the cross-sectional area. Preferably, the cross-sectional area should change proportionally to the perimeter of the cross-sectional area to permit linear, or substantially linear, control of the volume of air passing through the cross sectional area. Ideally, a given increase in the cross-sectional area produces a like increase in the perimeter of the cross-sectional area, e.g., a 10% increase in cross-sectional area produces a 10% increase in the perimeter of the cross-sectional area.

In the presently preferred embodiment of the invention, damper blade 38 is rotated a maximum of 60 degrees from the third operative position of FIG. 8A in the direction of arrow A; and, similarly is rotated a maximum of 60 degrees from the third operative position of FIG. 8A in the direction of arrow B. Such maximum rotation values can be adjusted as desired.

In FIG. 8B, the cross-sectional area through which airflow A20 moves is bounded by the edge of damper blade seal 85B of damper blade segment 34 (FIG. 9), edge 63B of drum arc segment 63B, and top seal 84A and bottom seal 84B (FIG. 12). In FIG. 8A, the cross-sectional area through which airflow A10 moves is bounded by the edge of damper blade seal 85A of damper blade segment 33 (FIG. 9), edge 63A of drum arc segment 63A, and top seal 84A and bottom seal 84B (FIG. 12). When damper blade 38 is rotated to increase the flow of air through one of these cross-sectional areas, the pressure drop produced by the air as it moves through the cross-sectional areas decreases. If there is a pressure drop reduction produced when air flow A10 moves past damper 38, then there is a corresponding increase in the pressure drop produced as the air passes through heat exchange unit 120.

In addition to being utilized in connection with air conditioning (heating/cooling) systems, damper assembly 150 can be utilized in any atmospheric pressure gas/vapor regulating system which requires the division and modulation of a single gas/vapor stream into two separate independent gas/vapor streams.

While damper assembly 150 and other system components can be fabricated from any desired material, it is presently preferred that damper assembly 150 be constructed from a medium to high strength material such as, for example, carbon steel, aluminum, polymer or other materials. The particular material selected will depend on system pressures, corrosivity of the gas/vapor, and the maximum allowable smoke spread and flame development requirements of NFPA and local building codes. The preferred maximum leakage for seals 85A and 85B (FIG. 12) in an air conditioning system when damper blade 38 is in the third operative position is 2% of the design air flow at a system pressure of three inches water column pressure.

Motor 86, or any other desired actuator system, is preferably a low voltage (less than 115 volts) or line voltage (115 volts to 600 volts) motor capable of rotating shaft 31 through a minimum of 180 degrees of rotation, and includes a position feedback that can recognize when damper blade 38 is in the third operative position (shut off position) of FIG. 8C and can recognize any other desired position of damper blade 38. Alternate position sensing systems can be utilized, such as a magnetic end switch device attached to damper blade 38 and either the top drum disc 36 or bottom drum disc 37.

Still another embodiment of the invention is illustrated in FIGS. 16 and 17. In FIGS. 16 and 17, D10 is an air duct integrated with duct D30 for return air to air conditioner 220; D20 is an air duct directing cooled (or heated) supply air S10 from air conditioner 220 back to the room; D30 is a duct through which return air from the room flows in unit 100; D40 is a duct that directs return air into the coil/fan section of air conditioner 220; D50 is a duct that directs ambient air A10 into unit 100 and into one side of heat exchange unit 120 and between and through finned layers comprising unit 120; D60 is a duct that directs exhaust/relief air from heat exchange unit 120 into the ambient atmosphere; A10 and A20 are ambient air streams flowing into duct D50; A10 is a fan induced ambient air stream directed through or over heat exchange unit 120; A20 is a fan induced ambient air stream that bypasses heat exchange unit 120 and travels through duct D50 and unit 100 to joint return air stream R10 in the manner illustrated in FIG. 17; and R20 is a portion of the return air stream that is drawn over or through heat exchange unit 120. In FIG. 17, S10 is a combination of return air R10 and outside ambient air A20. In FIG. 16, S10 is a combination of a portion R10 of the return air and of ambient air A10 that has passed through heat exchange unit 120. In FIG. 16, portion R20 of the return air passes through heat exchange unit 120 and out through duct D60. FIG. 17 does not call out a portion R20 because portion R20 is zero, i.e., in FIG. 17 none of the return air stream is directed through heat exchange unit 120. In FIG. 17, portion R10 comprises the entire return air stream, minus relief air which exits the room to outside the building through normal building relief air paths.

FIG. 16 illustrates the heat recovery mode of the ventilation system of the invention. FIG. 17 illustrates the economizer mode of the ventilation system of the invention. In the economizer mode, the temperature of the ambient air stream A20 permits it to be added directly to the return air stream R10 and obviates the necessity of passing an ambient air stream A10 over or through heat exchange unit 120.

Figure 21:
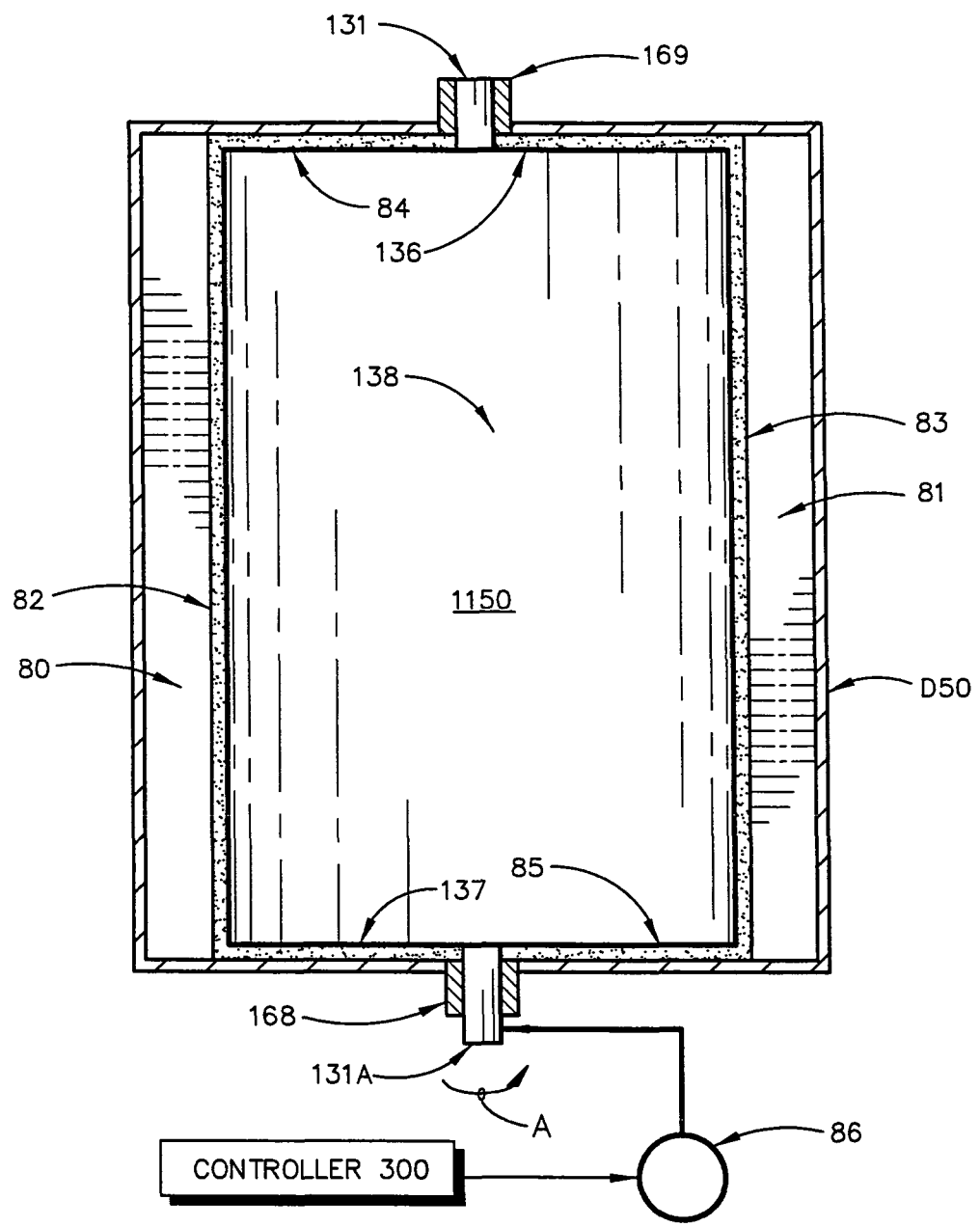
FIG. 21 is a front elevation view of the duct-damper assembly of FIG. 18A in conjunction with a control system and illustrating further construction details thereof.

In the embodiment of the invention illustrated in FIGS. 1 and 2, air streams A1 and R2 must make ninety degree turns while traversing ventilation unit 10. Air stream A1 makes a ninety degree turn to enter heat exchange unit 12. Air stream R2 makes a ninety degree turn after exiting heat exchange unit 12. Such ninety degree turns produce increased upstream pressure and increase the energy required for air streams A1 and R2 to pass through ventilation unit 10. In contrast, in FIGS. 16 and 17, air streams A10 and R20 need not make ninety degrees turns to while entering or exiting, respectively, heat exchange unit 120. Heat exchange unit 120 is rotated such that its faces are canted at angles less than ninety degrees with respect to walls 80 and 81 (FIG. 21). Air stream A10 need not make a ninety turn to enter unit 120. This decreases the energy consumed by air streams A10 and R20 while passing through ventilation unit 100.

In FIG. 16, damper assembly 1150 is in a first open operative position which permits air stream A10 to flow through duct D50, past the left edge of damper assembly 1150, and into heat exchange unit 120. When damper assembly 1150 is in the first open operative position, air stream A20 is prevented from flowing into duct D50, past the right edge of damper assembly 1150, and into duct D10 along a path to the right of heat exchange unit 120 to join return air stream R10 in the manner illustrated in FIG. 17. Air stream A20 is produced only when damper assembly 1150 is in the second open operative position illustrated in FIG. 17. When damper assembly 1150 is in the second open operative position, air stream A10 is not produced because damper assembly 1150 blocks the path of travel illustrated in FIG. 16. When damper assembly 1150 is in the first open operative position, air stream A20 is not produced because damper assembly 1150 blocks the path of travel illustrated in FIG. 17.

When portion R20 of the return air stream travels through heat exchange unit 120 in the manner illustrated in FIG. 16, damper assembly 1160 is in a first open operative position which permits air stream R20 to exit through duct D60. Alternatively, when a portion R20 of the return air stream does not pass through heat exchange unit 120, damper assembly 1160 is in the second closed operative position illustrated in FIG. 17. Damper assemblies 1150 and 1160 each rotate or pivot about shafts 131 and 132, respectively (FIGS. 16 and 17).

Figure 18A:
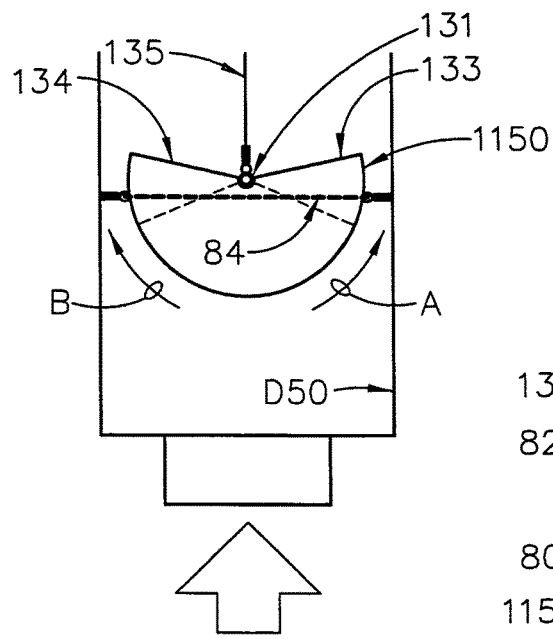
FIG. 18A is a top view illustrating a duct-damper assembly in the module of FIG. 16 with the damper in a third operative position.
Figure 18B:
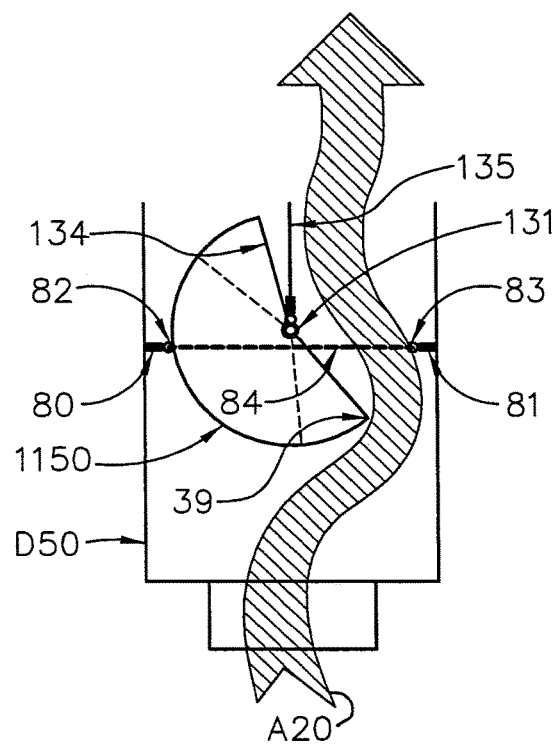
FIG. 18B is a top view illustrating the duct-damper assembly of FIG. 18A with the damper in a second operative position.
Figure 18C:
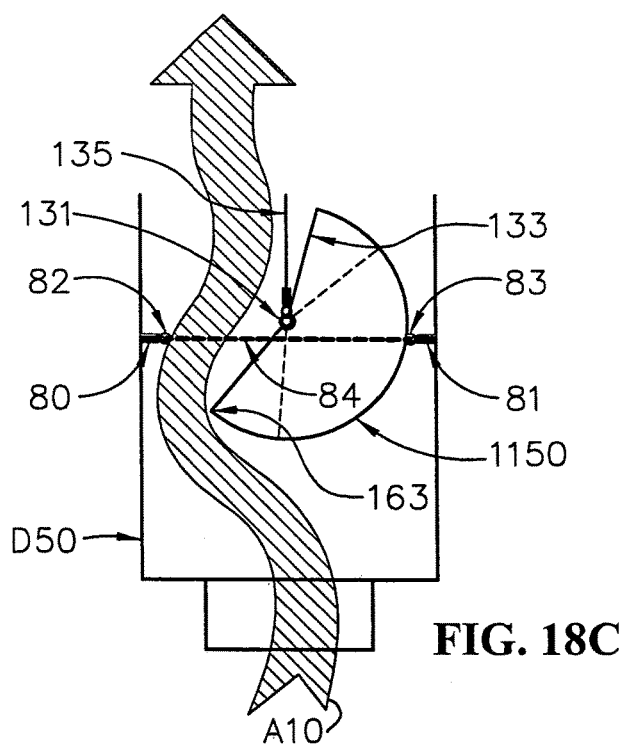
FIG. 18C is a top view illustrating the duct-damper assembly of FIG. 18A with the damper in a first operative position.

FIGS. 18A, 18B, and 18C further illustrate three general operative positions of damper assembly 1150. In FIG. 18A, damper assembly 1150 is in a third closed operative position which prevents ambient air from flowing into and through duct D50 and past damper assembly 1150. In FIG. 18B, damper assembly 1150 is rotated from the third closed operative position of FIG. 18A in the direction of arrow B (FIG. 18A) to the second open operative position allowing ambient air to follow the path indicated by arrow A20 in FIG. 18B and FIG. 17. In FIG. 18C, damper assembly 1150 is rotated from the third closed operative position of FIG. 18A in the direction of arrow A (FIG. 18A) to the first open operative position allowing ambient air to follow the path indicated by arrow A10 in FIG. 18C and FIG. 16. As would be appreciated by those of skill in the art, damper assembly 1150 can be rotated (1) from the second open operative position through the third closed operative position to the first open operative position, and vice versa, (2) from the second open operative position back to the third closed operative position, and (3) from the first open operative position back to the third closed operative position. The majority of the time, damper assembly 1150 will be in either the first or second open operative position.

The particular location of damper assembly 1150 when it is in the first (or second) open operative position is determined by the algorithm earlier described herein. The algorithm determines at any given instant in time a desired flow rate of air, either into the heat exchange unit 120 via the airflow path generally located by arrow A10 or bypassing heat exchange unit 120 via the air flow path generally located by arrow A20.

As is indicated in FIG. 21, once controller 300 (FIG. 21) determines that damper assembly 1150 needs to be operated in, for example, the second operative position of FIG. 18B, controller 300 is using the previously described algorithm (or another desired algorithm) to continuously calculate a desired flow rate of air, and send signals to motor 86 to adjust the position of damper assembly 1150 to increase or decrease the flow rate of air along the path generally indicated by arrow A20 (FIG. 17). Motor 86 turns shaft 131A, and therefore damper assembly 1150 and shaft 131, in the direction of arrow B to move damper assembly 1150 from the third operative position of FIG. 18A to the second operative position of FIG. 18B. Minute adjustments (i.e., minute rotation) of the damper drum 138 in damper assembly 1150 continues to occur to meet the algorithm calculated air flow rate requirements.

Figure 19:
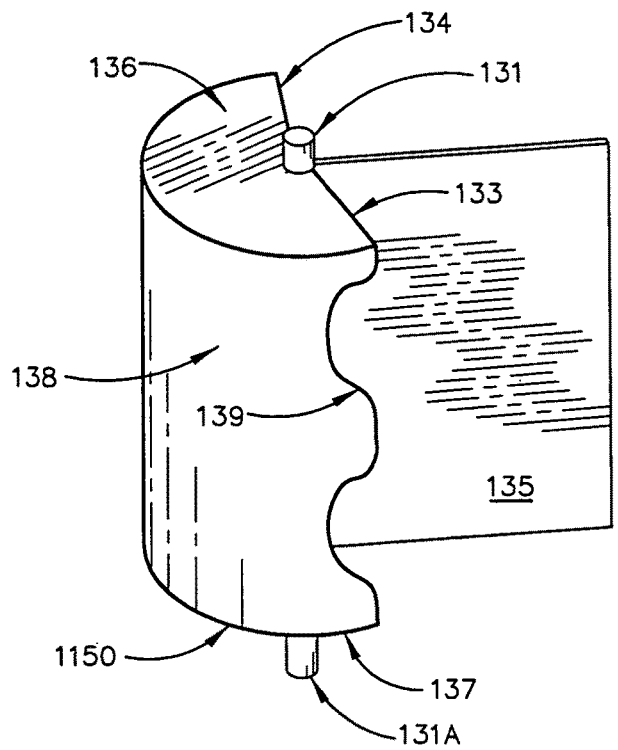
FIG. 19 is a perspective view further illustrating portions of the duct-damper assembly of FIG. 18A.

FIG. 19 is a perspective view illustrating construction details of damper assembly 1150 and its operatively associated divider panel 135. When ambient air is traveling along the path indicated by arrow A20, panel 135 (along with associated circumscribing walls of duct D50) prevents ambient air from crossing over into the path that is followed by air traveling along a path indicated by arrow A10. When ambient air is traveling along the path indicated by arrow A10, panel 135 (along with the associated circumscribing walls of duct D50) prevents ambient air from crossing over into the path that is followed by air traveling as indicated by arrow A20.

Figure 23:
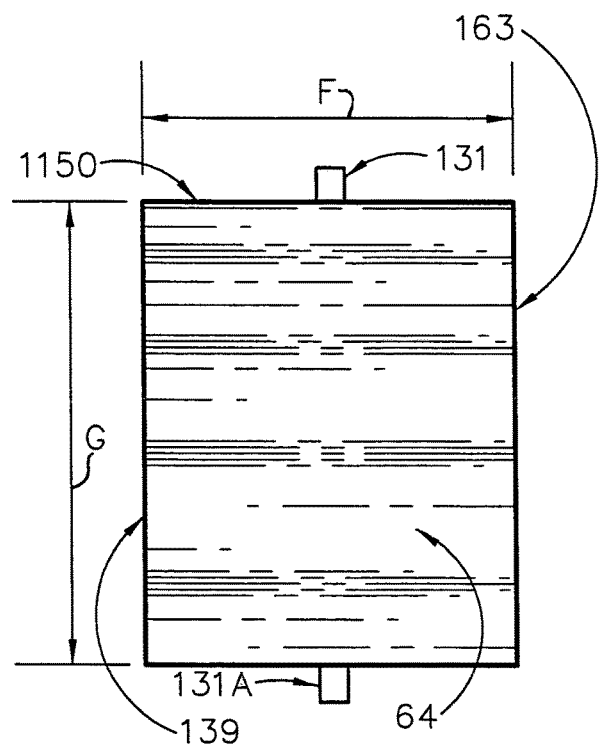
FIG. 23 is a front view of the damper of FIG. 19 illustrating the undulating surface extending between the scalloped edges of the damper.

Damper assembly 1150 includes scalloped edges 139 (FIG. 19) and 163 (FIG. 2 3). The shape and dimension of edge 139 is presently equivalent to that of edge 163, although that need not be the case. Damper 1150 also includes a top generally semicircular panel 136 and a bottom generally semicircular panel 137. The shape and dimension of panel 136 is presently equivalent to that of panel 137, although that need not be the case. Semicircular wall 138 extends between and interconnects spaced apart, parallel panels 136 and 137. As is illustrated in FIG. 23, contoured panel 64 extends between scalloped edges 139 and 163. Damper assembly 1150 can be formed in any desired manner and can comprise a solid piece of material. It is presently preferred that damper assembly 1150 be hollow in order to reduce the amount of material required to produce a system in accordance with the invention.

Figure 20:
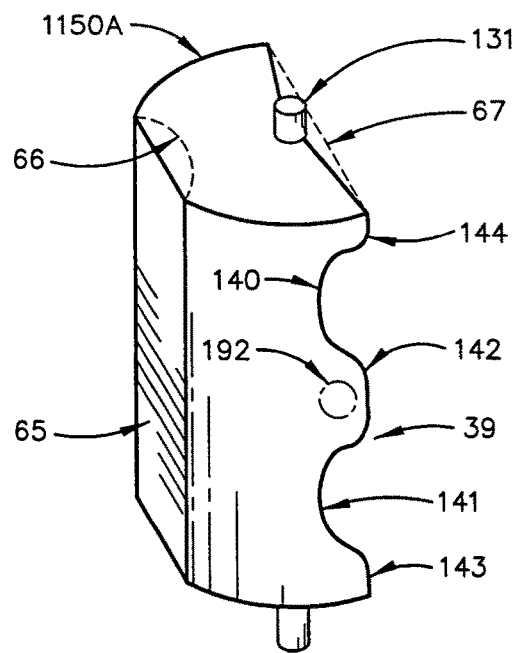
FIG. 20 is a perspective view illustrating an alternate damper construction.

The damper assembly 1150A in FIG. 20 is comparable to damper assembly 1105, provided, however, that damper assembly 1150A is truncated to produce flat surface 65. If desired, damper assembly 1150A can be truncated to form, instead of flat truncated surface 65, the arcuate concave surface indicated by dashed line 66. Scalloped edge 139 includes semi-elliptical concave portions 140 and 141, semi-elliptical convex portion 142, and quarter-elliptical convex portions 143 and 144. The shape and dimension of a scalloped edge 139, 163 can vary as desired. By way of example, and not limitation, concave portions 140 and 141 can be semi-circular and not semi-elliptical.

Figure 24:
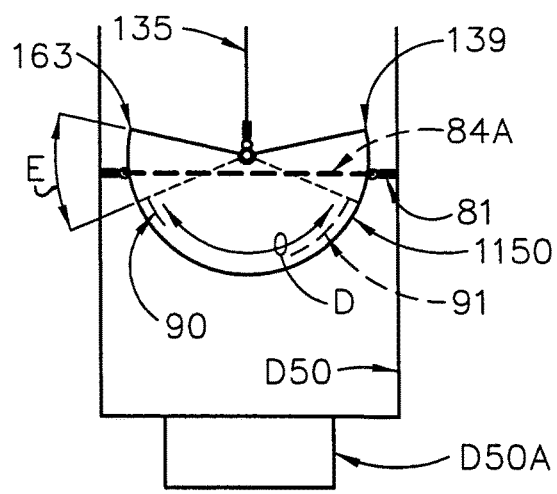
FIG. 24 is a top view of the damper of FIG. 18A illustrating additional construction and operational details thereof.

Any desired system can be devised to seal appropriately the periphery of damper assembly 1150 to prevent air from flowing around damper assembly 1150 unless damper assembly 1150 is in the first or second open operative position. In FIG. 21, for example, elongate fixed foam or felt or rubber strips or gaskets 84 and 85 sealingly engage the top 136 and bottom of damper assembly 1150, and elongate fixed foam or felt or rubber strips sealingly engage portions of cylindrical outer surface 138. In FIG. 21, damper assembly 1150 is in the third closed operative position. In the third operative position, the entire length of each scalloped edge 139, 163 is spaced apart and forwardly from strips 82, 83, 84, 85 so that air cannot enter duct D50 and flow past damper assembly 1150. Consequently, edges 139 and 163 are not visible in FIG. 21 because they are on the other side of and spaced apart from strips 82, 83, 84, 85 as shown in FIG. 24. Seal 82 is fixedly attached to wall 80. Seal 83 is fixedly attached to wall 81. Seal 84 is fixedly secured to the top of duct D50. Seal 85 is fixedly attached to the bottom of duct D50. In FIG. 24, the location of strip 84 is indicated by dashed line 84A. Bushings 169 and 168 sealingly engage shafts 131 and 131A, respectively. Outer surface 138 (FIG. 19) of damper assembly 1150 sealingly slides over strips 82 and 83. Top 136 of damper assembly 1150 sealingly slides over strip 84. Bottom 137 of damper assembly 1150 sealingly slides over strip 85.

Figure 22:
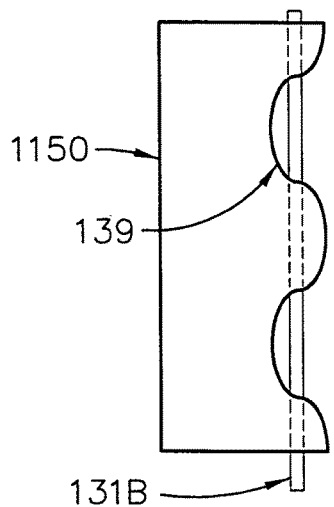
FIG. 22 is a side elevation view illustrating an alternate damper construction.

FIG. 22 depicts how a rotatable shaft 131B can extend completely through and be fixedly attached to a damper assembly 1150.

In FIG. 24, dashed lines 90 and 91 indicate reinforcing interior panels, or ribs, that extend from the top 136 to the bottom 137 of damper assembly 1150. The ribs 90 and 91 are spaced about one-half inch behind the concave portions 140 and 141 (FIG. 10) of the scalloped edges 139 and 163 of damper assembly 1150.

As can be seen in FIGS. 18A and 19, the upper edges 133 and 134 of damper assembly 1150 are not colinear, but instead together form an inner obtuse angle of less than one hundred eighty degrees. As a result, damper assembly 1150 is larger than one-half of a cylinder. This provides space for scalloped edges 139 and 163 such that in FIG. 24, edges 139 and 163 are in their entirety on the same side of wall 81 and seal 84 as is divider panel 135. No portion of edges 139 and 163 extends past walls 80 and 81 toward the opening D50A of duct D50. If desired, damper assembly 1150 can, as indicated by dashed line 67 in FIG. 20, be formed such that edges 133 and 134 are collinear. In that case, seals 82, 83, 84, 85 may have to be repositioned to insure that when damper assembly 1150 is in the third operative position illustrated in FIG. 24, no portion of edges 139 and 163 extends past seals 82 to 85 toward opening D50A.

The diameter, indicated by arrows F in FIG. 23, of damper assembly 1150 is presently ten inches, and the height, indicated by arrows G in FIG. 23, of damper assembly 1150 is presently sixteen inches. In the majority of cases, the diameter of damper assembly 1150 will be in the range of nine to eleven inches, and the height of damper assembly 1150 will be in the range of fifteen to seventeen inches. The diameter of damper assembly 1150 may, however, be in the range of six to twelve inches and the height of damper may be in the range of sixteen to thirty inches. The diameter and height of damper assembly 1150 are varied to meet desired air flow requirements, to meet sizing requirements of ducting and air conditioning units, and/or to meet other design criteria.

When damper assembly 1150 is in the economizer mode illustrated in FIG. 18B, the position of damper assembly 1150 is, for a damper assembly 1150 with a diameter of ten inches and a height of sixteen inches, adjusted to vary the air flow A20 between 100 cfm (cubic feet per minute) and 700 cfm. When the damper assembly 1150 is in the heat recovery mode illustrated in FIG. 18C, the position of damper assembly 1150 is, for a damper assembly 1150 with a diameter of ten inches and a height of sixteen inches, adjusted to vary the air flow A10 between 100 cfm and 450 cfm. One way to increase the airflow A10 or A20 for a given amount of revolution of damper assembly 1150 is to make the damper assembly 1150 taller. Another way to increase the airflow A10 or A20 for a given amount of revolution of damper assembly 1150 is to increase the damper assembly diameter. Still another way to increase the airflow A10 or A20 for a given amount of revolution of damper assembly 1150 is to reduce the height of damper assembly 1150 and increase the diameter of the damper assembly 1150 by a desired amount. Yet another way to increase the airflow of damper assembly 1150 is to increase the height and diameter of damper assembly 1150. Reducing the airflow of damper assembly 1150 is accomplished by carrying out the reverse of the foregoing size increasing procedures. The minimal desired airflow A10 or A20 into a classroom is typically 100 cfm.

The airflow A20 in the economizer mode of FIG. 18B is increased by rotating damper assembly 1150 and shafts 131 and 131A in the direction of arrow B (FIG. 18A). The incorporation in damper assembly 1150 of scalloped edge 139 is important in this respect because with each degree of rotation of damper assembly 1150 in the direction of arrow B, the amount of increase in airflow A20 is less than if edge 139 were straight and parallel to the centerline of damper assembly 1150. The centerline of damper assembly 1150 extends through the center of shafts 131 and 131A. As damper assembly 1150 begins to open to permit airflow A20, such airflow A20 initially can pass only through the "valleys" 140 and 141 (FIG. 20) of edge 39, This facilitates being able to adjust the airflow in small increments. In the practice of the invention, it is important to be able to adjust the airflow by increments at least as small as one to two percent of the maximum airflow in the heat recovery mode and the economizer mode. Consequently, for example, if the maximum airflow in the economizer mode is 700 cfm, it is important to be able to adjust the air flow by 7 to 14 cfm. Scalloped edge 139 facilitates such airflow adjustments.

The airflow A10 in the heat recovery mode is increased by rotating damper assembly 1150 and shafts 131 and 131A in the direction of arrow A (FIG. 18A). The incorporation in damper assembly 1150 of scalloped edge 163 is important in this respect because with each degree of rotation of damper assembly 1150 in the direction of arrow A, the amount of increase in airflow A10 is less than if edge 139 were straight and parallel to the centerline of damper assembly 1150. The centerline of damper assembly 1150 extends through the center of shafts 131 and 131A. As damper assembly 1150 begins to open to permit airflow A10, such airflow A10 initially can pass only through the "valleys" of edge 163. This facilitates being able to adjust the airflow in small increments. In the practice of the invention, it is important to be able to adjust the by increments at least as small as one to two percent of the maximum airflow in the heat recovery mode and the economizer mode. Consequently, for example, if the maximum airflow A10 in the heat recovery mode is 450 cfm, it is important to be able to adjust the air flow by four and one half cfm to nine cfm. Scalloped edge 163 facilitates such airflow adjustments.

The shape and dimension of scalloped edges 139 and 163 can vary as desired. The presently preferred design of edges 139 and 163 utilizes valleys 140 and 141, and peaks 142 which each correspond to one-half (valleys 140 and 141, and peak 142) or one-quarter (peaks 143 and 144) of the shape of an ellipse. The number and shape of such peaks and valleys can vary as desired. For example, valleys 140 and 141 may have a circular contour; or, edge 139 can have a saw tooth configuration. One or more openings, such as the opening depicted by dashed line 192 in FIG. 20, can be formed though damper assembly 1150 near an edge 139, 163.

In one embodiment of the invention the diameter and/or height of damper assembly 1150 is decreased sufficiently such that the air flow in the economizer mode is 70 to 450 cfm; and, the air flow in the heat recovery mode is 70 to 300 cfm.

In another embodiment of the invention, the diameter and/or height of damper assembly 1150 is increased sufficiently such that the air flow A20 in the economizer mode is 150 to 2100 cfm; and, the air flow A10 in the energy recovery mode is in the range of 70 to 1400 cfm.

Although the diameter and height of damper assembly 1150 can vary as desired, the diameter of damper assembly 1150 typically presently corresponds to the width of the plenum D40 of air conditioning unit 220; and, the height of damper assembly 1150 presently typically generally corresponds to the height of the heat exchange unit 120. The diameter of damper assembly 1150 can be based on the available scalloped open air spaces. A larger diameter provides more air flow. A smaller diameter provides less air flow.

Accordingly, in general, during the practice of the invention, the airflow A20 in the economizer mode can be in the range of 70 to 2100 cfm, and the airflow A10 in the heat recovery mode can be in the range of 70 to 1400 cfm.

The maximum possible airflow during the economizer mode is always be greater than the maximum possible airflow during the heat recovery mode.

In FIG. 21, motor 86 is utilized to rotate shaft 131A, and therefore damper assembly 1150, in the direction of arrow A and in a direction opposite that of arrow A. Motor 86 can be a stepper motor or an infinitely modulating motor. Motor 86 preferably is able to rotate damper assembly 1150 in increments at least as small as 0.1 degree.

A particular advantage of the damper assembly 1150 is that it enables small incremental changes in air flow while at the same time enabling and controlling the modulation of two separate airflows A10 and A20. Airflow A10 is modulated independently of airflow A20. If airflow A10 is being utilized during operation of the system of the invention, airflow A20 is not being utilized, and vice versa.

One goal of the invention is to make the increase in airflow A10 or A20 linear with respect to the amount of rotation of damper assembly 1150. As damper assembly 1150 is rotated to permit airflow A10 or A20 to increase, the cross-sectional area through which airflow A10 or A20 moves increases along with the perimeter of the cross sectional area. Preferably, the cross sectional area should change proportionally to the perimeter of the cross sectional area to permit linear, or substantially linear, control of the volume of air passing through the cross sectional area. Ideally, a given increase in the cross-sectional area produces a like increase in the perimeter of the cross-sectional area, e.g., a 10% increase in cross-sectional area produces a 10% increase in the perimeter of the cross-sectional area.

In the presently preferred embodiment of the invention, damper assembly 1150 is rotated a maximum of 75 degrees from the third operative position of FIG. 18A in the direction of arrow A; and, similarly is rotated a maximum of 75 degrees from the third operative position of FIG. 18A in the direction of arrow B. Such maximum rotation values can be adjusted as desired.

In FIG. 18B, the cross-sectional area through which airflow A20 moves is bounded by seal 83, edge 139 of damper assembly 1150, seal 85, and seal 84 (FIG. 21). In FIG. 18C, the cross-sectional area through which airflow A10 moves is bounded by seal 82, edge 63, seal 85, and seal 84. When damper assembly 1150 is rotated to increase the flow of air through one of these cross-sectional areas, the pressure drop produced by the air as it moves through the cross-sectional areas decreases. If there is a pressure drop reduction produced when air flow A10 moves past damper assembly 1150, then there is a corresponding increase in the pressure drop produced as the air passes through heat exchange unit 120.

In addition to being utilized in connection with air conditioning (heating/cooling) systems, damper assembly 1150 can be utilized in any atmospheric pressure gas/vapor regulating system which requires the division and modulation of a single gas/vapor stream into two separate independent gas/vapor streams.

While damper assembly 1150 and other system components can be fabricated from any desired material, it is presently preferred that damper assembly 1150 be constructed from a medium to high strength material such as, for example, carbon steel, polymer or other materials. The particular material selected will depend on system pressures, corrosivity of the gas/vapor, and the maximum allowable smoke spread and flame development requirements of NFPA and local building codes. The preferred maximum leakage for seals 82 to 85 (FIG. 21) in an air conditioning system when damper assembly 1150 is in the third operative position is 2% of the design air flow at a system pressure of three inches water column pressure.

Motor 86, or any other desired actuator system, is preferably a low voltage (less than 115 volts) or line voltage (115 volts to 600 volts) motor capable of rotating shaft 131A through a minimum of 180 degrees of rotation, and includes a position feedback that can recognize when damper assembly 1150 is in the third operative position (shut off position) of FIG. 18A and can recognize any other desired position of damper assembly 1150. Alternate position sensing systems can be utilized, such as a magnetic end switch device attached to damper assembly 1150 and a portion of duct D50 that circumscribes and houses damper assembly 1150.

FIGS. 35 to 38 illustrate components that can be utilized in an alternate configuration of a damper assembly constructed in accordance with the invention.

Figure 35:
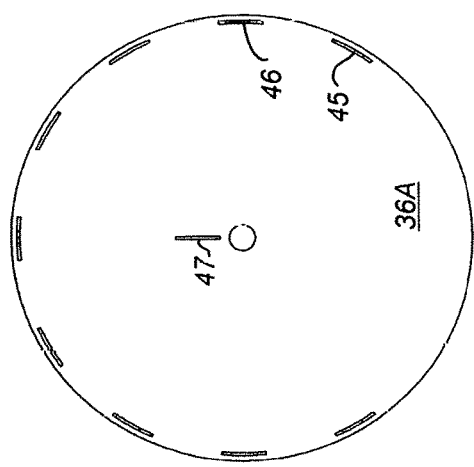
FIG. 35 is a top view illustrating a top circular plate utilized in constructing a damper assembly in accordance with the invention.

In FIG. 35, circular top panel 36A includes a plurality of spaced apart slots 45, 46 formed around the periphery of panel 36A and includes interior slot 47.

Figure 36:
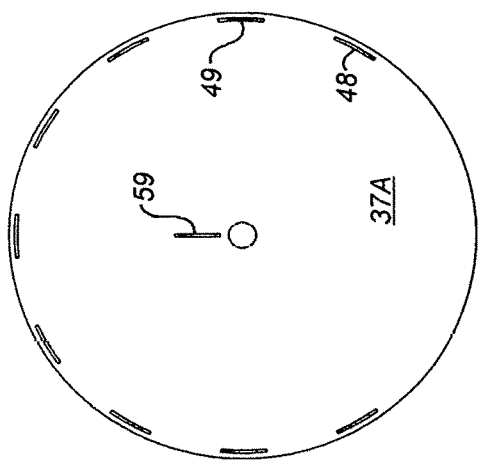
FIG. 36 is a top view illustrating a bottom circular plate utilized in constructing a damper assembly in accordance with the invention.
Figure 34:
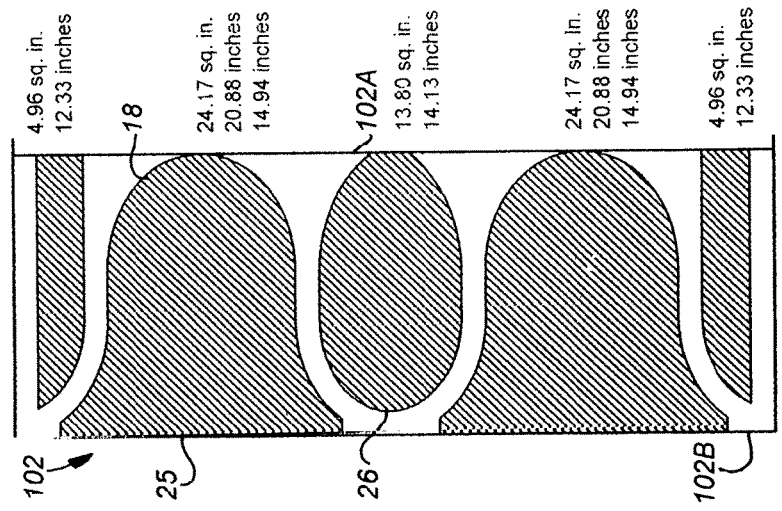
FIG. 34 is a view from inside a damper assembly illustrating, when the damper blade is moved to a position in which the damper is 100% open, a rectangular portion of the damper assembly wall and portions of outlet openings formed through the damper assembly wall.

In FIG. 36, circular bottom panel 37A includes a plurality of spaced apart slots 48, 49 formed around the periphery of panel 37A and includes interior slot 59.

Figure 38:
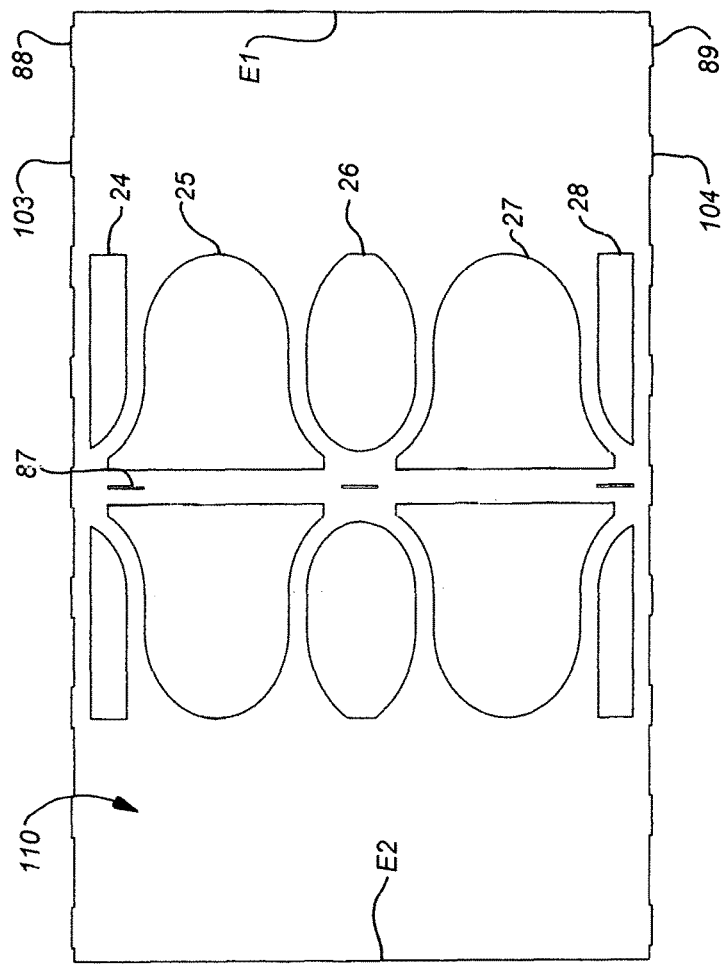
FIG. 38 is a top view illustrating a damper wall utilized in constructing a damper assembly in accordance with the invention.
Figure 37:
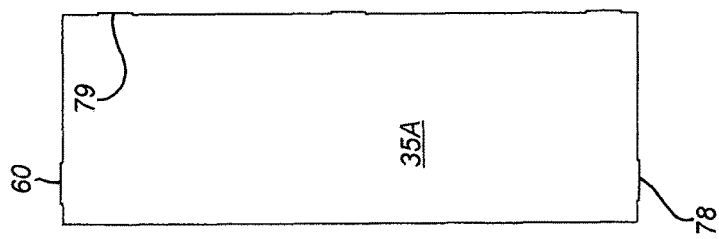
FIG. 37 is a side view illustrating a damper blade utilized in constructing a damper assembly in accordance with the invention.

During the assembly of the components of FIGS. 35 to 38, Interior slots 47 and 59 receive tabs 60 and 78, respectively, of divider panel 35A (FIG. 37). Panel 35A includes three spaced apart outwardly extending tabs 79. Each such tab is received by one of three spaced apart slots 87 formed in damper housing wall 110 (FIG. 38). When the components of FIGS. 35 to 38 are assembled, a damper assembly comparable to that illustrated in FIG. 11 results; provided, however, that a V-shaped damper blade assembly of the type illustrated in FIG. 12 is incorporated as part of the damper assembly.

Figure 45:
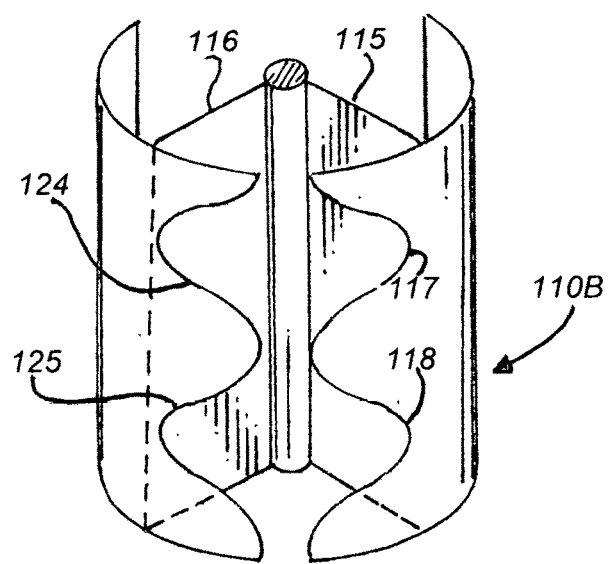
FIG. 45 is a perspective view further illustrating the damper assembly of FIG. 42 and including damper blades which are operated to open only one of the sets of openings at a time.
Figure 47:
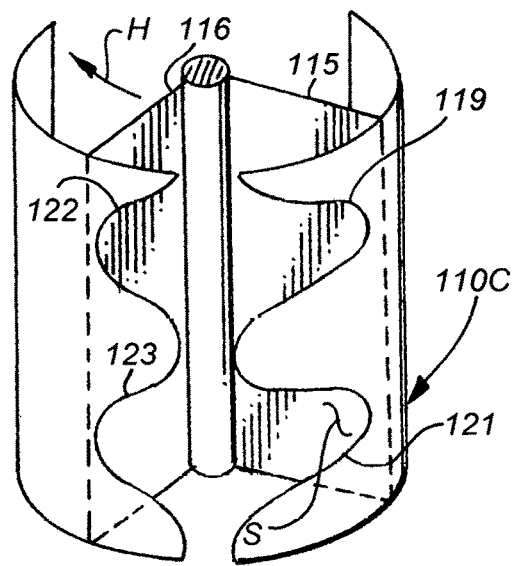
FIG. 47 is a perspective view illustrating a damper assembly of the general type illustrated in FIG. 42, but in which one set of damper openings is large than the other set of damper openings.

The V-shape produced by blade segments 33-34, 115-116 of the damper blade is important in the practice of the invention because when the blades are positioned in the manner illustrated in FIGS. 45 and 47 the static pressure produced against one blade segment 33 (or 115) is equivalent to the static pressure produced against the other blade segment 34 (or 116). This facilitates the clockwise or counterclockwise rotation, as the case may be, of the damper blade to open and close outlet openings. Utilizing only a single blade segment in a damper blade greatly increases the force required to rotate the blade because there is no static pressure balancing or offsetting the static pressure against the single blade segment.

In FIG. 38, damper housing wall 110 is illustrated as a flat panel because when damper housing wall 110 is in the flat configuration shown in FIG. 38, openings 24, 25, 26, 27, 28 are formed by punching out, cutting, etc. pieces of metal or of other material that comprises the flat panel. After the various openings 24 to 28, slots 87, or other desired openings are formed in the flat panel, the damper housing wall 110 is formed into a generally cylindrical configuration of the type illustrated in FIGS. 11, 13, 41 to 50. When damper housing wall 110 is in such a generally cylindrical configuration, tabs 88, 103 are received by slots 45 and 46, respectively, in top panel 36A and the remaining tabs along the top 103 of wall 110 in FIG. 38 are each received by a different one of the other slots formed around the periphery of top panel 36A. Similarly, when wall 110 is in such a generally cylindrical configuration, tabs 89 and 104 are received by slots 48 and 49, respectively, in bottom panel 37A (FIG. 36) and the remaining tabs along the bottom 104 of wall 110 in FIG. 38 are each received by a different one of the other slots formed around the periphery of bottom panel 37A. When damper housing wall 110 is in such a generally cylindrical configuration and is mounted intermediate top panels 36A and bottom panel 37A in the manner described in this paragraph, an inlet opening is formed which is bounded by edges E1 and E2 of wall 110. Air enters a damper assembly through this inlet opening and exits the damper assembly through outlet openings 24 to 28 which are, in the manner described above, formed through wall 110. The passage of air through a damper assembly in this manner can be seen in FIG. 46 where air, indicated by arrows J, enters through in inlet opening bounded by vertical edges E3 and E4 and exits through semi-elliptical openings formed through wall 110B.

Figure 41:
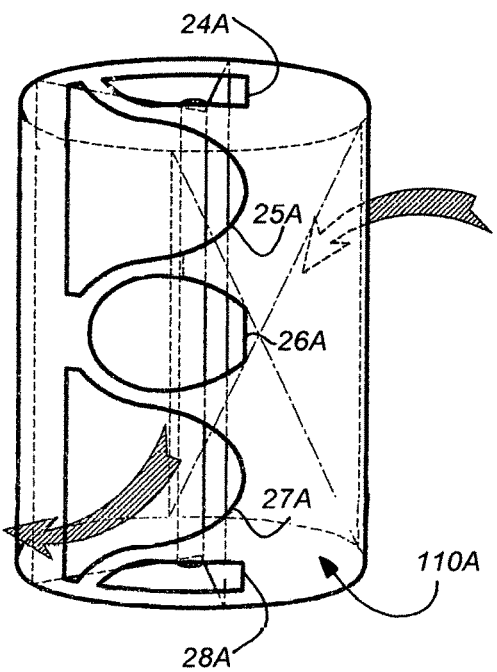
FIG. 41 is a perspective view illustrating a damper assembly having only a single set of outlet openings which are closed or opened during operation of the damper assembly.

The damper assembly illustrated in FIG. 41 includes only a single stacked set of spaced apart outlet openings 24A, 25A, 26A, 27A, and 28A, which openings 24A to 28A have, by way of example and not limitation, the same shape and dimension as openings 24 to 28 formed in wall 110 in FIG. 38.

Figure 42:
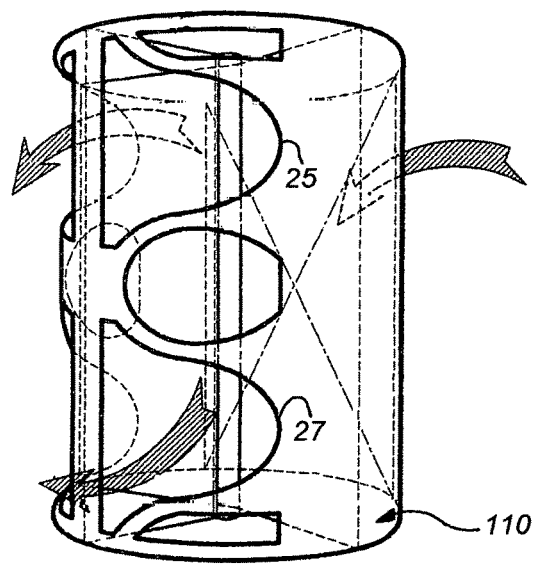
FIG. 42 is a perspective view illustrating a damper assembly having two sets of outlet openings, only one of which is open at any time during operation of the damper assembly.
Figure 43:
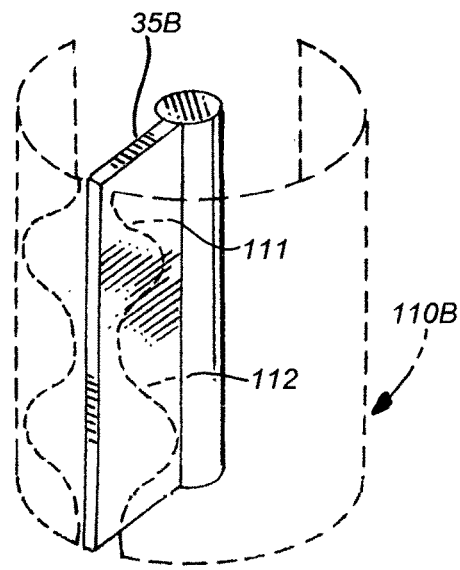
FIG. 43 is a perspective view illustrating a damper assembly of the general kind illustrated in FIG. 42 and having two sets of outlet openings and a divider such that only one of the sets of openings is open at any given time during operation of the damper assembly.
Figure 44:
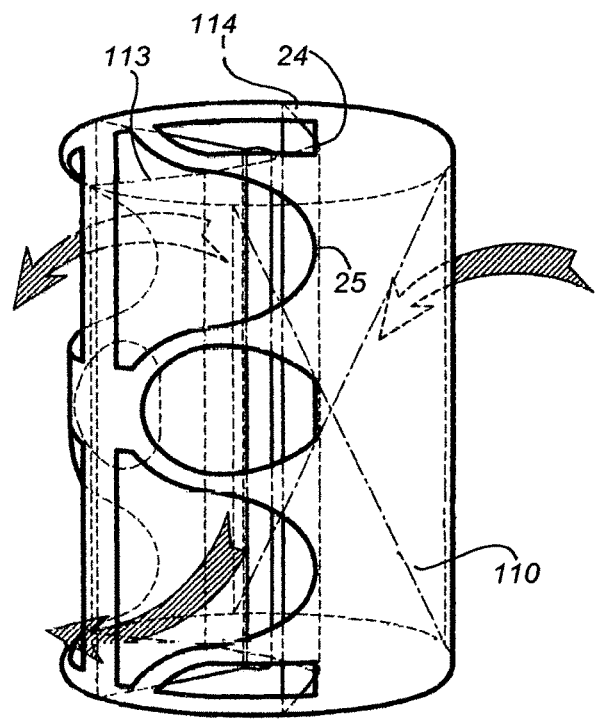
FIG. 44 is a perspective view illustrating a damper assembly having two set of outlet openings, both of which can be open during operation of the damper assembly.

The damper assembly illustrated in FIG. 42 is constructed utilizing the damper housing wall 110 illustrated in FIG. 38 and, consequently, includes two sets of stacked spaced apart outlet openings. One set of stacked spaced apart outlet openings includes openings 24 to 28; the other set of stacked spaced apart outlet openings is to the left of outlet openings 24 to 28 in FIG. 38 and comprises mirror images of outlet openings 24 to 28. The damper assembly of FIG. 42 includes a fixed air diverter partition or divider panel comparable to divider panel 35B in FIG. 43, and includes a pair of damper blades comparable in appearance and operation to blades 115 and 116 in FIG. 45. In FIG. 45, blades 115, 116 are in a position which prevents air from flowing through any of the outlet openings 117, 118, 124, 125. Blades 115 and 116 rotate simultaneously in a clockwise or counterclockwise direction, as desired, so that only one stacked set of outlet openings—either 117, 118 or 124, 125 as the case may be—is open at any given time. Accordingly, in FIG. 46, blades 115, 116 have been rotated clockwise in the direction of arrow H to permit air to flow into and through the damper assembly and out through outlet openings 117 and 118. The damper assembly of FIG. 42 operates in a similar fashion so that at any given time air is prevented from flowing through any outlet openings, or, is permitted to flow through only one set of outlet openings in the manner illustrated in FIG. 46.

Figure 46:
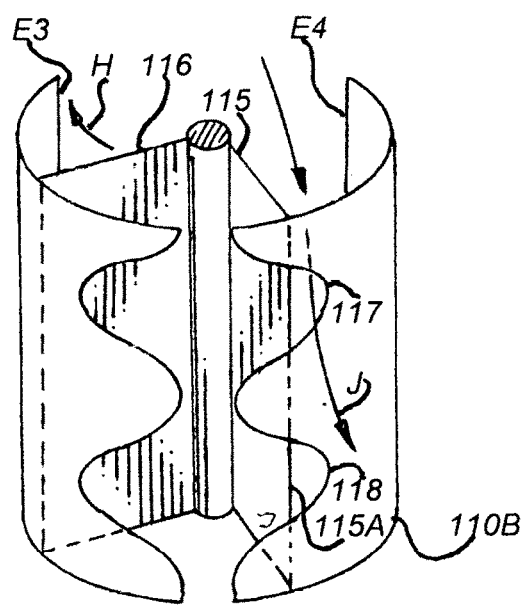
FIG. 46 is a perspective view further illustrating the damper assembly of FIG. 45 and how only a single set of openings is open at a time.

Divider panel 35B (FIG. 43) is omitted in FIGS. 45 and 46 (as well as in FIGS. 47, 48 and 49) for the sake of clarity. As would be appreciated by those of skill in the art, panel 35B is necessary to insure that air flows through only one set of outlet openings (either the 117, 118 set if outlet openings or the 124, 125 set of outlet openings) at a time.

Figure 48:
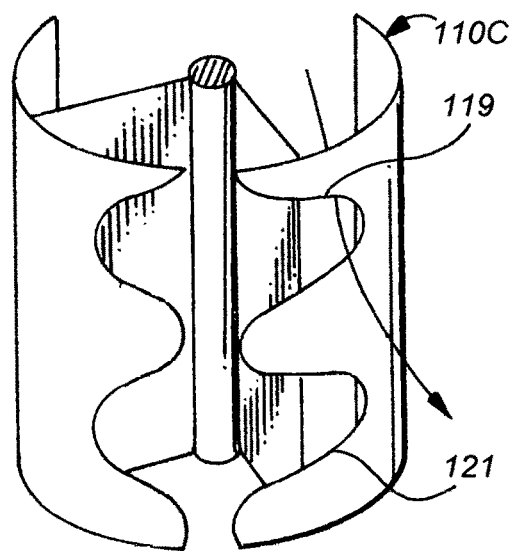
FIG. 48 is a perspective view further illustrating the damper assembly of FIG. 47 and how only a single set of openings is open at one time.

The damper assembly of FIGS. 47 and 48 includes generally cylindrical damper housing wall 110C, one set of stacked outlet openings 119, 121 formed through wall 110C, and a second set of stacked outlet openings 122, 123 formed through wall 110C. Housing wall 110C circumscribes inner space S. Outlet openings 119 and 121 each are larger (i.e., have a greater cross-sectional area) than either one of outlet openings 122 and 123. The damper assembly of FIGS. 47 and 48 is, however, operated in the same fashion as the damper assembly of FIGS. 42, 45 and 46. Damper blades 115, 116 are rotated in a clockwise or counterclockwise direction, as desired, to a position which prevent air from flowing through either set of stacked openings, or which permits air entering the damper assembly of FIGS. 47 and 48 to flow through only one set of stacked outlet openings, either set 119-121 or set 122-123.

Figure 49:
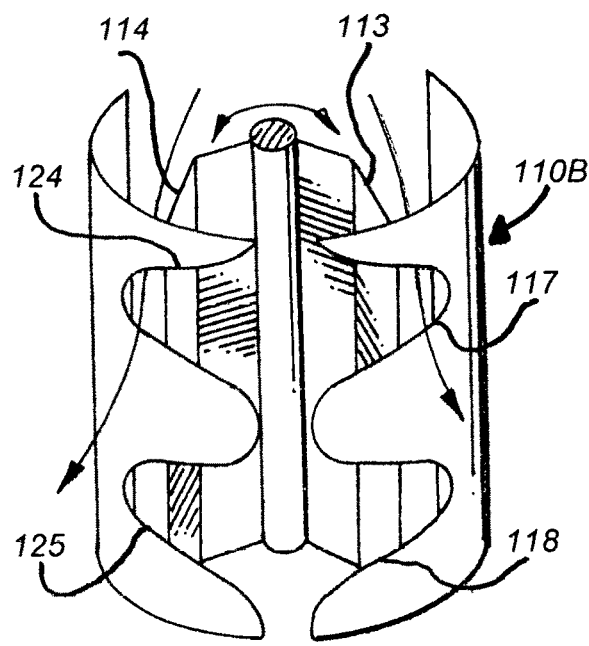
FIG. 49 is a perspective view further illustrating the damper assembly of FIG. 44 and how two sets of openings are open simultaneously.

The damper assembly of FIG. 49 includes the cylindrical damper housing wall 110B of FIGS. 45 and 46, but in contrast to the damper assembly of FIGS. 45 and 46, includes damper blades 113, 114 which can be positioned not only to permit air to flow through only one set of stacked outlet openings, but also to permit air to flow simultaneously through each set 117-118 and 124-125 of stacked outlet openings. Damper blades 113 and 114 turn simultaneously so that the orientation of one blade 113 with respect to the other blade 114 is fixed. This is also the case with damper blades 115 and 116; they turn simultaneously so that the orientation of one blade 115 with respect to the other blade 116 is fixed. As would be appreciated by those of skill in the art, damper blades 113, 114 can be positioned such that the quantity of air flowing through one set 117-118 of stacked outlet openings differs from the quantity of air flowing through the other set 124-125 of outlet openings. This is accomplished by positioning damper blades 113, 114 so that the cross-sectional area of outlet openings 117-118 which is open to air flow is different from the cross-sectional area of outlet openings 124-125 which is open to air flow.

In all illustrations herein of damper assemblies constructed in accordance with the invention, the generally cylindrical damper housing wall 110, 110A, 110B, 110C, etc. is generally viewed as fixed while the damper blade(s) 113, 114, 115, 116, etc. are viewed as being rotatable to a plurality of desired positions. As would be appreciated by those of skill in the art, in other embodiments of the invention, the cylindrical wall 110, 110A, etc. can rotate while the blade(s) 113, 114, etc. are fixed. Or, both the wall 110, 110A, etc. and the blade(s) 113, 114 can rotate.

Figure 50:
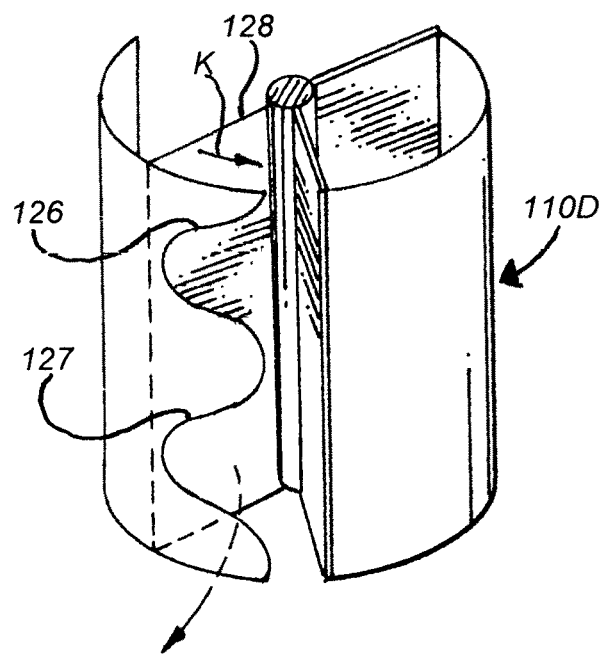
FIG. 50 is a perspective view further illustrating the mode of operation of a damper assembly of the general type illustrated in FIG. 41.

The damper assembly of FIG. 50, like the damper assembly of FIG. 41 includes only a single stacked set of outlet openings 126-127. Damper blade 128 is rotatable in clockwise or counterclockwise (indicated by arrow K) directions to prevent air from flowing through outlet openings 126 and 127 or to open at least portions of each outlet opening 126, 127 to permit air to flow therethrough. In FIG. 50, blade 128 is positioned to prevent air from flowing out through openings 126 and 127.

Example

A twelve inch high, sixteen inch diameter cylindrical damper assembly is constructed having the outlet opening configuration illustrated in FIG. 38. FIG. 42 illustrates such a damper assembly. Calculations are made for when the damper assembly is 10%, 20%, 30%, 40%, 50%, 60%, 70%, 80%, 90%, and 100% open. These calculations are summarized in FIGS. 25 to 34 and are discussed further below. The airflow through the damper assembly is also measured when the damper assembly is 10%, 20%, 30%, 40%, 50%, 60%, 70%, 80%, 90%, and 100% open.

Figure 25:
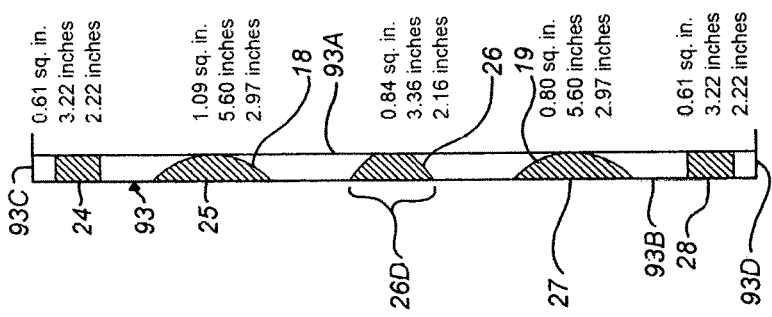
FIG. 25 is a view from inside a damper assembly illustrating, when the damper blade is moved to a position in which the damper is 10% open, a rectangular portion of the damper assembly wall and portions of outlet openings formed through the damper assembly wall.

The amount, or percent, that the damper assembly is open is determined by first measuring the total arc of travel through which a damper blade moves from when the blade is tangent to the leading edges 18, 19 of outlet openings 24 to 28 until the outlet openings are completely exposed and open to air flow. In FIG. 25, the right hand side 93A of rectangle 93 is tangent the leading edges 18, 19 of openings 24 to 28. When a damper blade 115, 116, etc. is positioned with its outer vertical edge (for example, edge 115A in FIG. 46) adjacent the interior of damper housing wall 110 and parallel and adjacent to side 93A, the damper blade is in a closed position. When the damper blade is rotated such that its outer vertical edge is positioned adjacent and parallel to the left hand side 93B of rectangle 93 in FIG. 25, then the damper assembly is 10% open. When the damper blade is rotated such that its outer vertical edge is positioned adjacent and parallel to the left hand side 94B of rectangle 94 in FIG. 26, then the damper assembly is 20% open. When the damper blade is rotated such that its outer vertical edge is positioned adjacent and parallel to the left hand side 95B of rectangle 95 in FIG. 27, then the damper assembly is 30% open. And so on.

When the damper assembly is 10% open, the damper blade has rotated through 10% of the total arc of travel noted above. When the damper assembly is 20% open, then the damper blade has rotated through 20% of the total arc of travel noted above, and so on.

Figure 26:
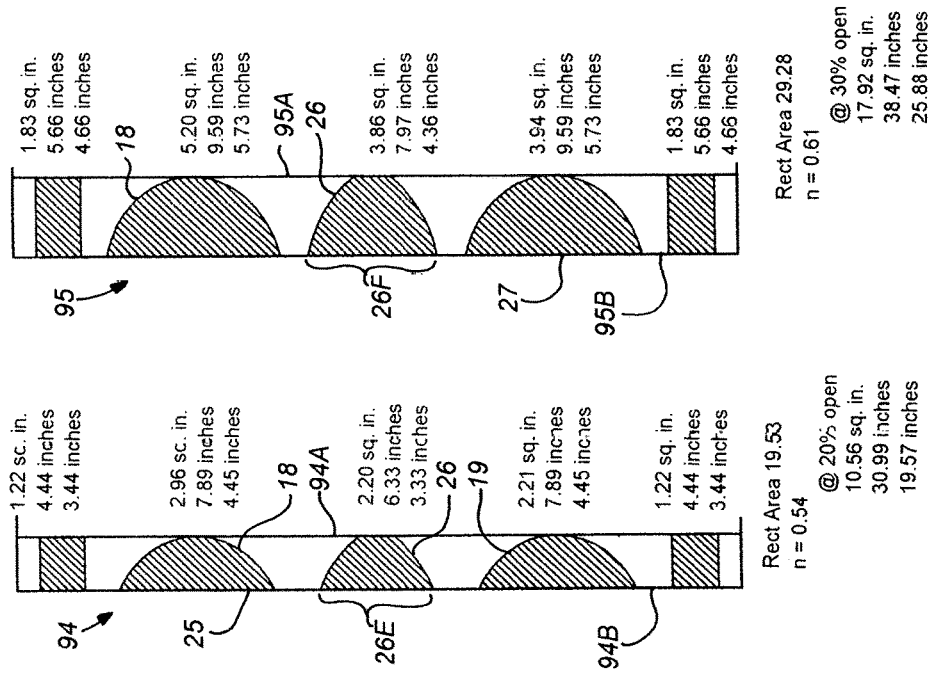
FIG. 26 is a view from inside a damper assembly illustrating, when the damper blade is moved to a position in which the damper is 20% open, a rectangular portion of the damper assembly wall and portions of outlet openings formed through the damper assembly wall.

Although the inside surface of damper housing wall 110 is curved, such curvature is, in essence, "flattened", so it can be represented in rectangular form in FIGS. 25 to 34. Consequently, FIG. 25 represents the actual surface area of the exposed inner curved surface of wall 110 when the damper is 10% open. And, FIG. 26 represents the actual surface area of the exposed inner curved surface of wall 110 when the damper is 20% open. And so on.

As can be seen by reviewing FIGS. 25 to 34, as the damper blade opens, more and more of each outlet opening 24 to 28 is exposed so that the cross-sectional area of the outlet openings 24 to 28 through which air can flow continues to increase as the damper blade moves through its arc of travel from 0% open to 100% open.

In FIGS. 25 to 34 the portions of openings 24 to 28 which are exposed as the damper blade moves from 0% open to 100% open are cross-thatched for clarity.

The rectangle 93 in FIG. 25 includes spaced apart parallel sides 93A and 93B, and, parallel spaced apart top 93C and bottom 93D. As can be seen, each rectangle in FIGS. 26 to 33 also includes spaced parallel sides and a top spaced apart from and parallel to a bottom. Rectangle 94 in FIG. 26 includes spaced apart parallel sides 94A and 94B; rectangle 95 in FIG. 27 includes spaced apart parallel sides 95A and 95B; rectangle 96 in FIG. 28 includes spaced apart parallel sides 96A and 96B; rectangle 97 in FIG. 29 includes spaced apart parallel sides 97A and 97B; rectangle 98 in FIG. 30 includes spaced apart parallel sides 98A and 98B; rectangle 99 in FIG. 31 includes spaced apart parallel sides 99A and 99B; rectangle 100 in FIG. 32 includes spaced apart parallel sides 100A and 100B; rectangle 101 in FIG. 33 includes spaced apart parallel sides 101A and 101B; and, rectangle 102 in FIG. 34 includes spaced apart parallel sides 102A and 102B.

Figure 27:
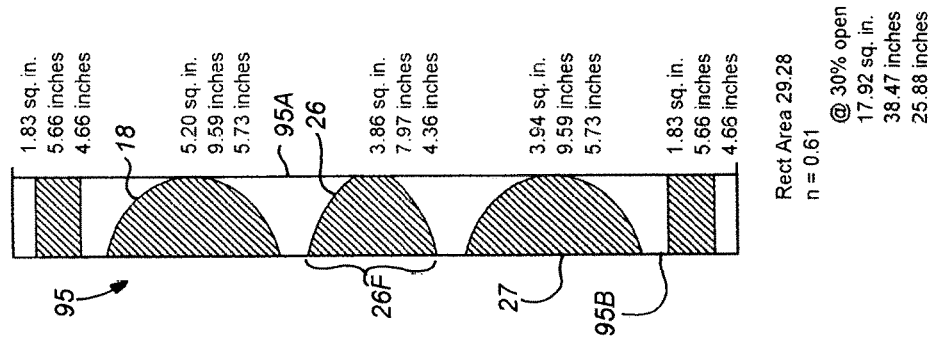
FIG. 27 is a view from inside a damper assembly illustrating, when the damper blade is moved to a position in which the damper is 30% open, a rectangular portion of the damper assembly wall and portions of outlet openings formed through the damper assembly wall.

In FIG. 25, the length of the portion of the edge of the damper blade which extends across the outlet opening 26 is indicated by bracket 26D. In FIG. 26, the length of the portion of the edge of the damper blade which extends across the outlet opening 26 is indicated by bracket 26E. In FIG. 27, the length of the portion of the edge of the damper blade which extends across outlet opening 26 is indicated by bracket 26F. And so on. Consequently, in each FIGS. 25 to 34, the portion of the edge of the damper blade which extends across an outlet opening 24 to 28 is illustrated.

Each FIGS. 25 to 34 lists for each outlet opening 24 to 28 (a) the cross-sectional area of the portion of the outlet opening 24 to 28 which is exposed when the damper open the amount indicated in the figure, (b) the "total" perimeter of the portion of the outlet opening 24 to 28 which is exposed when the damper is open the amount indicated in the figure along, which "total" perimeter includes the length of the portion of the edge of the damper blade which extends across the outlet opening 24 to 28, and, (c) the perimeter of the portion of the outlet opening 24 to 28 which is exposed when the damper is open the amount indicated in the figure but not including the length of the portion of the edge of the damper blade which extends across the outlet opening 24 to 28. For example, in FIG. 25, immediately to the right of the exposed portion of outlet opening 24 which is illustrated in FIG. 25 are the descriptors "0.61 sq. in.", "3.22 inches", and "2.22 inches". The descriptor "0.61 sq. in." indicates the cross-sectional area of the exposed portion of outlet opening 24 illustrated in FIG. 25. This exposed portion is, as noted, cross-thatched in FIG. 25. The descriptor "3.22 inches" indicates the "total" perimeter of the portion of the outlet opening 24 illustrated in FIG. 25, which perimeter includes the length of the portion of the edge of the damper blade which extends across the outlet opening 24. The descriptor "2.22 inches" indicate the perimeter of the portion of the outlet opening 24 illustrated in FIG. 25, which perimeter does not includes the length of the portion of the edge of the damper blade which extends across the outlet opening 24.

By way of further example, in FIG. 25, to the right of the exposed portion of outlet opening 27 which is illustrated in FIG. 25 are the descriptors "1.09 sq. in.", "5.60 inches", and "2.97 inches". The descriptor "1.09 sq. in." indicates the cross-sectional area of the exposed portion of outlet opening 27 illustrated in FIG. 25. The descriptor "5.60 inches" indicates the "total" perimeter of the portion of the outlet opening 27 illustrated in FIG. 25, which perimeter includes the length of the portion of the edge of the damper blade which extends across the outlet opening 27. The descriptor "2.97 inches" indicates the perimeter of the portion of the outlet opening 27 illustrated in FIG. 25, which perimeter does not includes the length of the portion of the edge of the damper blade which extends across the outlet opening 27. And so on.

Figure 62:
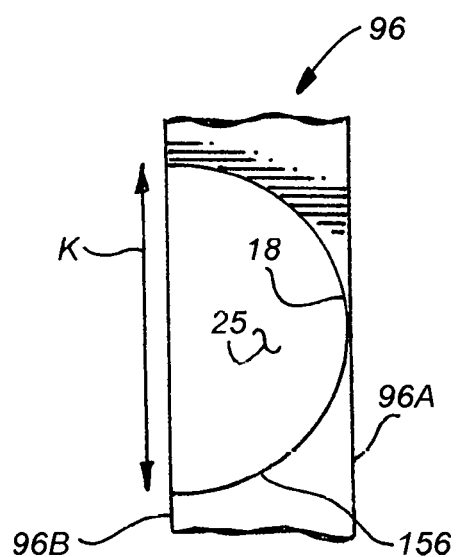
FIG. 62 is a front view illustrating a section of rectangle 96 in FIG. 28 to depict the total perimeter and perimeter of the portion of an opening 25 when the damper assembly of FIG. 28 is 40% open; and, FIG. 63 is a graph illustrating the air flow through the damper assembly of FIGS. 52 to 61 when the damper assembly is 10%, 20%, 30%, 40%, 50%, 60%, 70%, 80%, 90%, and 100% open.

A further illustration of the "total" perimeter of the exposed portion of an outlet opening 25 is made with reference to FIG. 62. In FIG. 62, a portion of rectangle 96 from FIG. 28 is illustrated. The portion of rectangle 96 shown in FIG. 62 includes the portion of outlet opening 25 which is exposed when the damper assembly is, as noted in FIG. 28, 40% open. Outlet opening 25 includes leading edge 18. The arcuate portion of the perimeter of outlet opening 25 which is exposed in FIG. 62 is indicated by reference character 156. The portion of the length of the damper blade which extends across outlet opening 25 in FIG. 62 is indicated by arrows K. The "total" perimeter of the portion of opening 25 visible in FIG. 62 equals the length indicated by arrows K plus the length of the generally semi-circular arcuate portion 156. The actual perimeter of opening 25 visible in FIG. 62 does not, however, include the length indicated by arrows K, and only includes the length of arcuate portion 156.

At the bottom of the rectangle in each FIGS. 25 to 34 are additional descriptors which indicate the area of the rectangle illustrated in the figure, the "n" value, the amount by which the damper is open to produce the rectangle illustrated in the figure, the total cross-sectional area of the outlet openings 24 to 28 illustrated in the figure, the cumulative "total" perimeter of the outlet openings 24 to 28 illustrated in the figure, and the cumulative actual perimeters of the outlet openings 24 to 28 illustrated in the figure. Accordingly, in FIG. 25 the following descriptors appear at the bottom of the rectangle illustrated in FIG. 25:

Rect Area 9.78
n=0.34
@ 10% open
4.24 sq. in.
21.00 inches
11.85 inches

The descriptor "Rect Area 9.78" indicates the area of rectangle illustrated in FIG. 25, namely the rectangle circumscribed by lines 93A, 93B, 93C, 93D.

The descriptor "n=0.34" indicates the total cross-sectional area of outlet openings 24 to 28 in FIG. 25 over the cross-sectional area of the rectangle 93A, 93B, 93C, 93D. In FIG. 25, this is 4.24/9.78, or 0.43.

The descriptor "@10% open" indicates how much the damper assembly is open to produce the rectangle and outlet openings therein illustrated in FIG. 25.

The descriptor "4.24 sq. in" indicates the cumulative cross-sectional area of the portions of openings 24 to 28 illustrated in FIG. 25, i.e. 0.61+1.09+0.84+1.09+0.61 square inches.

The descriptor "21.00 inches" indicates the cumulative "total" perimeter of the openings 24 to 28 illustrated in FIG. 25, i.e., 3.22+5.60+3.36+5.60+3.22 inches.

The descriptor "11.85 inches" indicates the cumulative actual perimeter of the openings 24 to 28 illustrated in FIG. 25, i.e. 2.22+2.97+1.47+2.97+2.22 inches.

Figure 59:
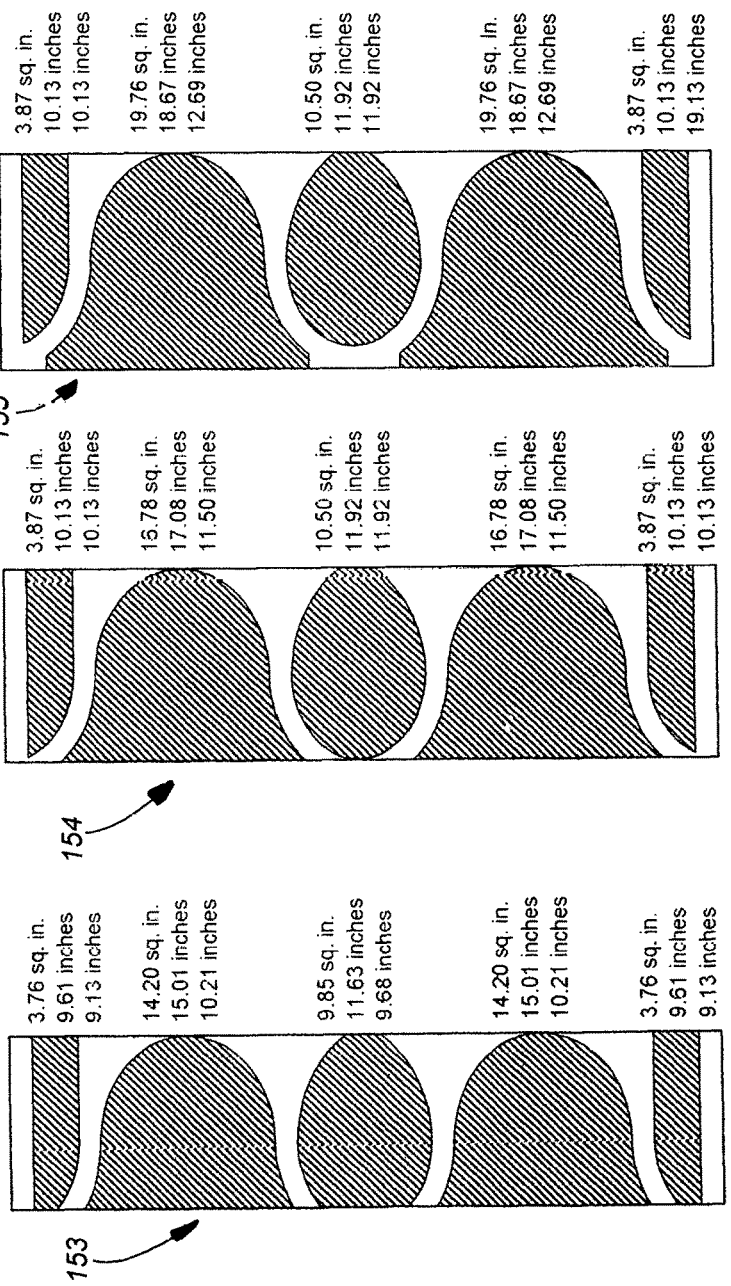
FIG. 59 is a view from inside a damper assembly illustrating, when the damper blade is moved to a position in which the damper is 80% open, a rectangular portion of the damper assembly wall and portions of outlet openings formed through the damper assembly wall.
Figure 60:
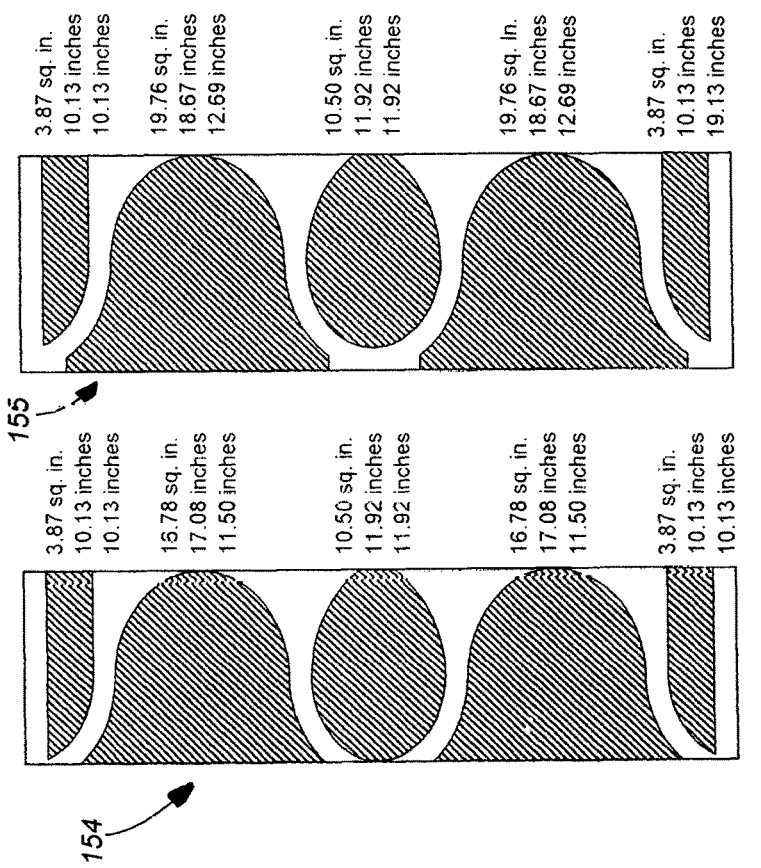
FIG. 60 is a view from inside a damper assembly illustrating, when the damper blade is moved to a position in which the damper is 90% open, a rectangular portion of the damper assembly wall and portions of outlet openings formed through the damper assembly wall.
Figure 61:
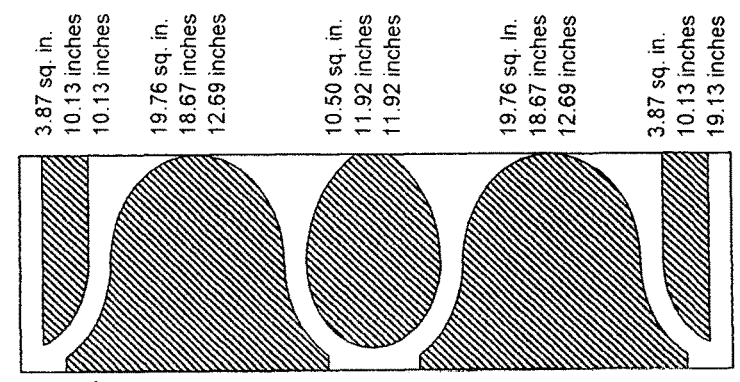
FIG. 61 is a view from inside a damper assembly illustrating, when the damper blade is moved to a position in which the damper is 100% open, a rectangular portion of the damper assembly wall and portions of outlet openings formed through the damper assembly wall.

The descriptors in the other FIGS. 26 to 34 are arranged in the same manner as those described above for FIG. 25. Further, the descriptors in FIGS. 52 to 61 are also arranged in the same manner as those described above for FIG. 25. FIGS. 52 to 61 are for a damper assembly having a generally cylindrical wall having a ten inch diameter and a height of sixteen inches. FIGS. 52 to 61, like FIGS. 26 to 34 illustrate rectangular areas which result when the damper assembly is 10%, 20%, 30%, 40%, 50%, 60%, 70%, 80%, 90%, and 100% open. FIG. 52 illustrates rectangular area 145; FIG. 53 illustrates rectangular area 146; FIG. 54 illustrates rectangular area 147; FIG. 55 illustrates rectangular area 148; FIG. 56 illustrates rectangular area 149; FIG. 57 illustrates rectangular area 151; FIG. 58 illustrates rectangular area 152; FIG. 59 illustrates rectangular area 153; FIG. 60 illustrates rectangular area 154; and, FIG. 61 illustrates rectangular area 155.

FIGS. 25 to 34 and 52 to 61 are proportionately accurate. Hence, although the drawings in these figures are not life size, and are smaller than actual size, the shape and dimension of the openings in the figures is reduced by the same amount as each rectangular area 145 to 155 and 93 to 102 is reduced in the illustrations in FIGS. 25 to 34 and 52 to 61.

Tables I and II below illustrate relationships found in the damper assembly of FIGS. 25 to 34 and FIGS. 52 to 61, respectively.

TABLE I

12 Inch Diameter by 16 Inch High Damper Assembly
FIGS. 25 to 34

| % Open | Sum of the Areas of Exposed Portions of Outlet Openings/Sum of Actual Perimeters of Outlet Openings | Sum of the Areas of Exposed Portions of Outlet Openings/Sum of the Total Perimeters of Outlet Openings | Rectangle Area/Sum of Actual Perimeters of Outlet Openings | n |
|---|---|---|---|---|
| 10 | 1:2.8 | 1:1.2 | 1:1.2 | 0.43 |
| 20 | 1:1.9 | 1:1.1 | 1:1.1 | 0.54 |
| 30 | 1:1.4 | 1:1 | 1:0.9 | 0.61 |
| 40 | 1:1.2 | 1:1 | 1:0.9 | 0.66 |
| 50 | 1:1.1 | 1:0.9 | 1:0.8 | 0.69 |
| 60 | 1:1.1 | 1:0.9 | 1:0.8 | 0.71 |
| 70 | 1:1.1 | 1:0.8 | 1:0.7 | 0.72 |

TABLE I-continued

12 Inch Diameter by 16 Inch High Damper Assembly
FIGS. 25 to 34

| % Open | Sum of the Areas of Exposed Portions of Outlet Openings/Sum of Actual Perimeters of Outlet Openings | Sum of the Areas of Exposed Portions of Outlet Openings/Sum of the Total Perimeters of Outlet Openings | Rectangle Area/Sum of Actual Perimeters of Outlet Openings | n |
|---|---|---|---|---|
| 80 | 1:1 | 1:0.8 | 1:0.7 | 0.73 |
| 90 | 1:1 | 1:0.8 | 1:0.7 | 0.74 |
| 100 | 1:1 | 1:0.8 | 1:0.7 | 0.74 |

TABLE II

10 Inch Diameter by 16 Inch High Damper Assembly
FIGS. 52 to 61

| % Open | Sum of the Areas of Exposed Portions of Outlet Openings/Sum of Actual Perimeters of Outlet Openings | Sum of the Areas of Exposed Portions of Outlet Openings/Sum of the Total Perimeters of Outlet Openings | Rectangle Area/Sum of Actual Perimeters of Outlet Openings | n |
|---|---|---|---|---|
| 10 | 1:3.5 | 1:2.5 | 1:1.4 | 0.41 |
| 20 | 1:2.1 | 1:1.7 | 1:1 | 0.51 |
| 30 | 1:1.6 | 1:1.4 | 1:0.9 | 0.58 |
| 40 | 1:1.4 | 1:1.3 | 1:0.9 | 0.63 |
| 50 | 1:1.2 | 1:1.1 | 1:0.8 | 0.66 |
| 60 | 1:1.1 | 1:1.0 | 1:0.8 | 0.69 |
| 70 | 1:1.1 | 1:1.0 | 1:0.8 | 0.70 |
| 80 | 1:1.1 | 1:1.0 | 1:0.8 | 0.72 |
| 90 | 1:1.1 | 1:0.9 | 1:0.8 | 0.72 |
| 100 | 1:1 | 1:0.9 | 1:0.7 | 0.72 |

Figure 51:
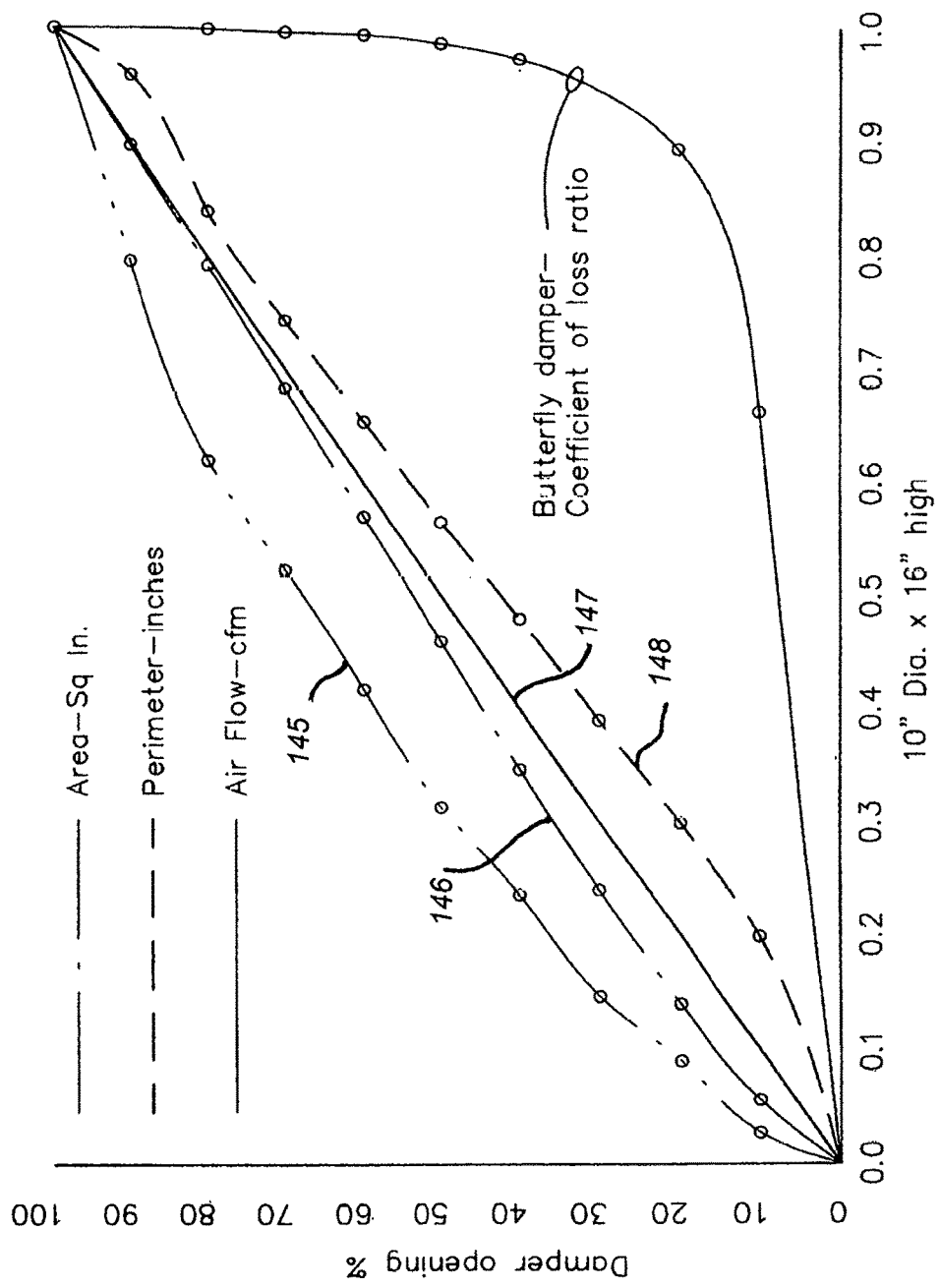
FIG. 51 is a graph illustrating outlet opening cross-sectional area, outlet opening perimeter (including damper blade edge), and airflow ratios at various damper openings.

FIG. 51 is a graph illustrating relationships produced in the ten inch diameter by sixteen inch high damper assembly of FIGS. 52 to 61.

Line 146 in FIG. 51 illustrates, for particular damper openings (i.e., 10%, 20%, 30%, etc.), the ratio of the cumulative cross-sectional areas of all of the exposed portions of outlet openings (outlet openings 24 to 28, for example) to the cumulative cross-sectional areas of all of the outlet openings when the damper assembly is 100% open. When the damper assembly is 100% open (as is the case in the illustration depicted in FIG. 61 for example), each of the outlet openings is completely open.

Line 145 in FIG. 51 illustrates, for particular damper openings (i.e., 10%, 20%, 30%, etc.), the ratio of the airflow in cubic feet per minute at a particular damper opening to the maximum airflow. The maximum air flow occurs when the damper assembly is 100% open.

Line 148 in FIG. 51 illustrates the ratio of the cumulative actual perimeters of the exposed portions of all of the outlet openings at a particular damper opening (i.e., the perimeters of the exposed portions of outlet openings 24 to 28 for example) to the cumulative actual perimeters of all of the outlet openings when the damper assembly is 100% open.

Line 147 in FIG. 51 illustrates the desired 1:1 ratio of the ratios illustrated in lines 145, 146, and 148. The ratios represented by lines 145, 146, and 148 are, however, substantially linear, and much more so than conventional damper assemblies. The perimeter values utilized in the graph of FIG. 51 do not include the lengths of the edges of a damper blade which span the outlet openings in the damper assembly, but only include the lengths of the exposed actual perimeter portions of the outlet openings.

Figure 39:
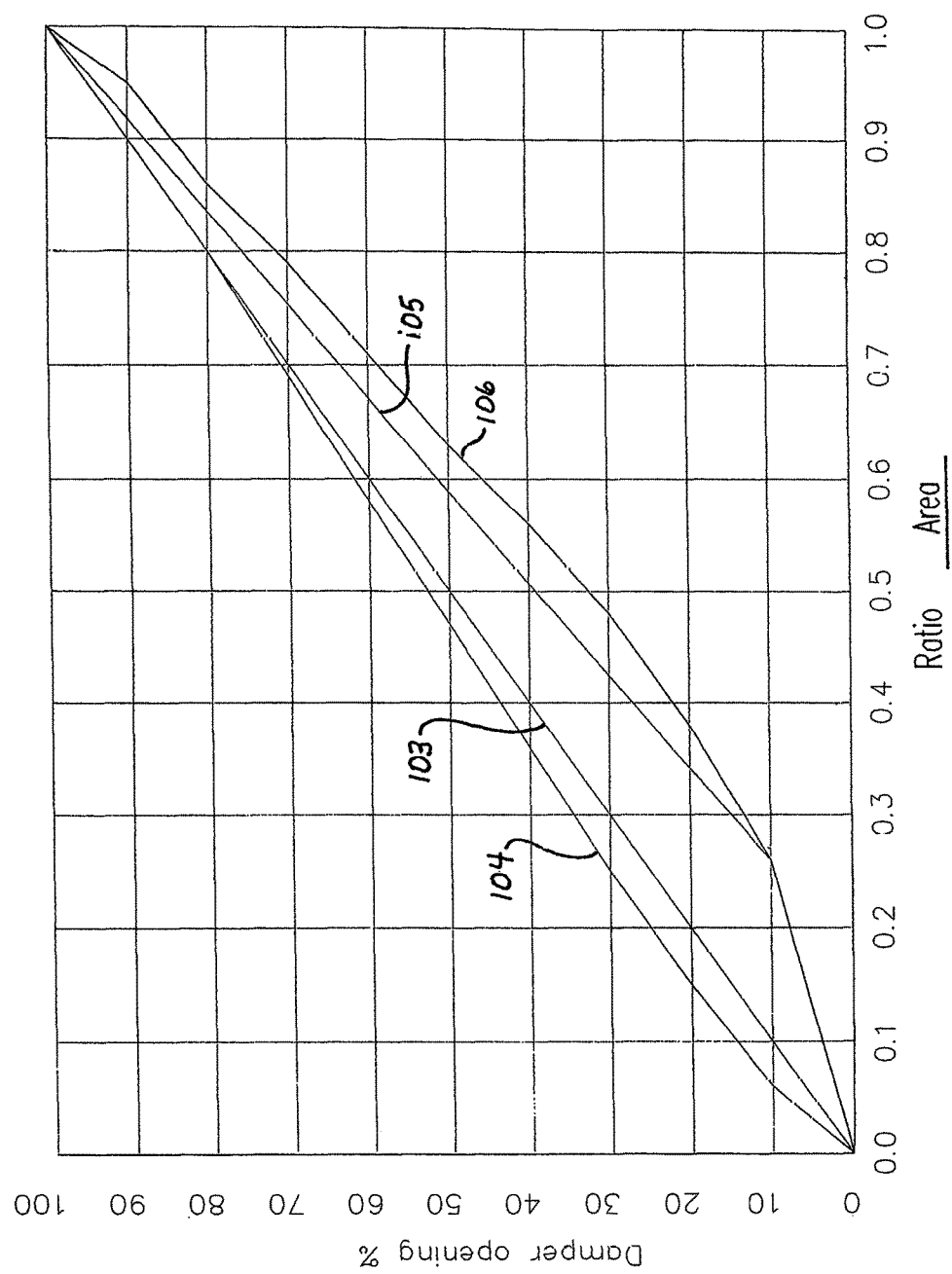
FIG. 39 is a graph illustrating outlet opening cross-sectional area, outlet opening perimeter (including damper blade edge), and airflow ratios at various damper openings.

The graph of FIG. 39 is similar to the graph of FIG. 51.

Line 104 illustrates, for particular damper openings (i.e., 10%, 20%, 30%, etc.), the ratio of the cumulative cross-sectional areas of all of the exposed portions of outlet openings (outlet openings 24 to 28, for example) to the cumulative cross-sectional areas of all of the outlet openings when the damper assembly is 100% open. When the damper assembly is 100% open (as is the case in the illustration depicted in FIG. 61 for example), each of the outlet openings is completely open.

Line 106 in FIG. 39 illustrates, for particular damper openings the ratio of the cumulative total perimeters of the exposed portions of each outlet opening at a particular damper opening (i.e., the actual perimeters of the exposed portions of outlet openings 24 to 28 for example plus the lengths of the portion of the damper blade spanning each outlet opening 24 to 28) to the cumulative actual perimeters of all of the outlet openings when the damper assembly is 100% open.

Line 105 is comparable to line 106, except that it represents the ratios of line 106 beginning at a damper opening of 10%, instead of beginning at 0% damper opening as is the case with line 105.

Line 103 in FIG. 39 illustrates the desired 1:1 ratio of the ratios illustrated in lines 104, 105, and 106. The ratios represented by lines 104, 105, and 106 are, however, substantially linear, and much more so than conventional damper assemblies. As noted above, the total perimeter values utilized in the graph of FIG. 39 do include the lengths of the edges of a damper blade which span the outlet openings in the damper assembly, along with the lengths of the exposed actual perimeter portions of the outlet openings.

Figure 40:
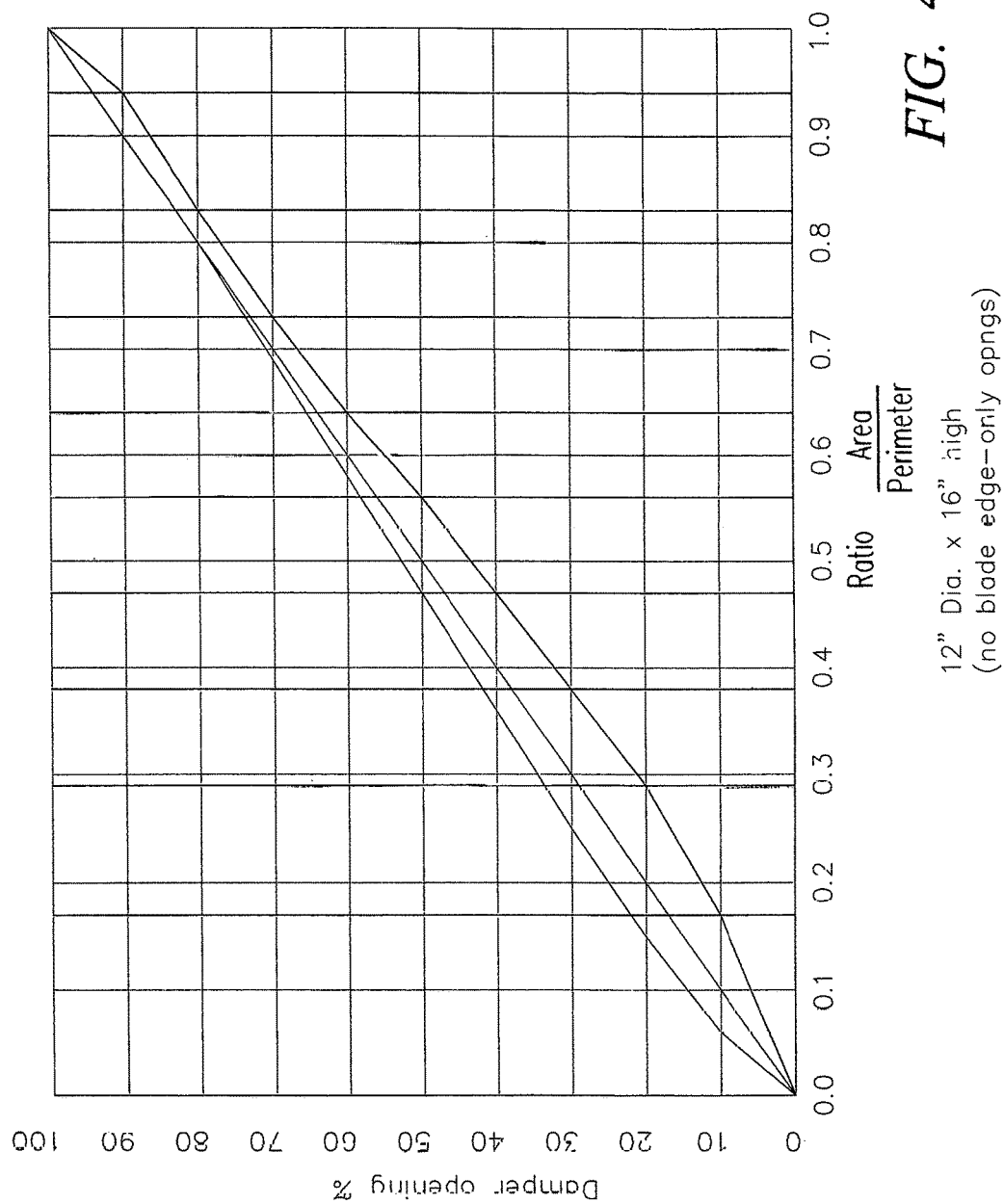
FIG. 40 is a graph illustrating outlet opening cross-section area, outlet opening perimeter (not including damper blade edge), and airflow ratios at various damper openings.

The graph of FIG. 40 is similar to the graphs of FIGS. 39 and 51.

Line 108 illustrates, for particular damper openings (i.e., 10%, 20%, 30%, etc.), the ratio of the cumulative cross-sectional areas of all of the exposed portions of outlet openings (outlet openings 24 to 28, for example) to the cumulative cross-sectional areas of all of the outlet openings when the damper assembly is 100% open. When the damper assembly is 100% open (as is the case in the illustration depicted in FIG. 61 for example), each of the outlet openings is completely open.

Line 109 in FIG. 40 illustrates the ratio of the cumulative actual perimeters of the exposed portions of all of the outlet openings at a particular damper opening (i.e., the perimeters of the exposed portions of outlet openings 24 to 28 for example) to the cumulative actual perimeters of all of the outlet openings when the damper assembly is 100% open.

Line 107 in FIG. 40 illustrates the desired 1:1 ratio of the ratios illustrated in lines 108 and 109. The ratios represented by lines 108 and 109 are, however, substantially linear, and much more so than conventional damper assemblies. The perimeter values utilized in the graph of FIG. 40, in contrast to the graph of FIG. 39, do not include the lengths of the edges of a damper blade which span the outlet openings in the damper assembly, but only include the lengths of the exposed actual perimeter portions of the outlet openings.

In the practice of the invention, the shape and dimension and number of outlet openings 24 to 28 can vary as desired, as can the height and diameter of the damper assembly. Accordingly, an outlet opening can, by way of example and not limitation, be semi-circular, be semi-elliptical, be a hybrid (a combination of two or more shapes), be triangular, be rectangular, etc. In order, however, to achieve the linear flow characteristics desired in the practice of the invention, it is important for the ratios set forth in Tables I and II to be generally maintained.

In particular, the ratio of the cumulative cross-sectional areas of the exposed portions of the outlet opening(s) to the cumulative actual perimeter length(s) of the exposed portions of the outlet opening(s) (which perimeter lengths each include only the actual perimeter of the exposed outlet opening(s) and do not include the length of the portion of a damper blade edge extending across an outlet opening(s)) when the damper assembly is 50% to 90% open, is in the range of 1:0.8 to 1:1.4, more preferably is in the range of 1:0.9 to 1:1.2, and most preferably is in the range of 1:1 to 1:1.1. In another embodiment of the invention these ratios are maintained when the damper assembly is 10% to 100% open. In another embodiment of the invention, these ratios are maintained when the damper assembly is 50% to 100% open. In another embodiment of the invention, these ratios are maintained when the damper assembly is 10% to 40% open. In another embodiment of the invention, these ratios are maintained when the damper assembly is open an amount selected from a group consisting of 10% to 100% open. In another embodiment of the invention, these ratios occur when the damper assembly is open at at least one amount selected from a group consisting of 10% to 100% open.

Further, the ratio of the area of a rectangle (for example, rectangle 97 in FIG. 29) at a particular damper assembly opening (50% for example in FIG. 29) to the "total" perimeter of the exposed portion(s) of the outlet opening(s) when the damper assembly is 50% to 90% open, is preferably in the range of 1:0.6 to 1:1.4, more preferably in the range of 1:0.7 to 1:1.3, and most preferably in the range of 1:0.8 to 1:1.2. As noted earlier, the "total" perimeter of an exposed portion of an outlet opening includes both the perimeter length of the exposed portion and the length of the portion of a damper blade edge extending across the outlet opening. In another embodiment of the invention these ratios are maintained when the damper assembly is 10% to 100% open. In another embodiment of the invention, these ratios are maintained when the damper assembly is 50% to 100% open. In another embodiment of the invention, these ratios are maintained when the damper assembly is 10% to 40% open. In another embodiment of the invention, these ratios are maintained when the damper assembly is open an amount selected from a group consisting of 10% to 100% open. In another embodiment of the invention, these ratios occur when the damper assembly is open at at least one amount selected from a group consisting of 10% to 100% open.

Further, the ratio of the area of a rectangle (rectangle 97 for example in FIG. 29) at a particular damper assembly opening (50% for example in FIG. 29) to the actual perimeter of the exposed portion(s) of the outlet opening(s) (this perimeter does not include the length of the portion of the blade edge traversing the outlet opening(s)) when the damper assembly is 50% to 90% open, is preferably in the range of 1:0.5 to 1:1.1, more preferably in the range of 1:0.6 to 1:1, and most preferably in the range of 1:0.7 to 1:1.0. In another embodiment of the invention these ratios are maintained when the damper assembly is 10% to 100% open. In another embodiment of the invention, these ratios are maintained when the damper assembly is 50% to 100% open. In another embodiment of the invention, these ratios are maintained when the damper assembly is 10% to 40% open. In another embodiment of the invention, these ratios are maintained when the damper assembly is open an amount selected from a group consisting of 10% to 100% open. In another embodiment of the invention, these ratios occur when the damper assembly is open at at least one amount selected from a group consisting of 10% to 100% open.

Further, the statistical variance of the value of n when the damper assembly is 50% to 100% open is less than 0.05, preferably less than 0.04, more preferably less than 0.03, and most preferably less than 0.02. In another embodiment of the invention these variances are maintained when the damper assembly is 10% to 100% open. In another embodiment of the invention, these variances are maintained when the damper assembly is 50% to 100% open. In another embodiment of the invention, these variances are maintained when the damper assembly is 10% to 40% open. In another embodiment of the invention, these variances are maintained when the damper assembly is open an amount selected from a group consisting of 10% to 100% open. In another embodiment of the invention, these variances are maintained when the damper assembly is open at least two different amounts selected from a group consisting of 10% to 100% open.

The damper assembly of the invention facilitates producing a linear increase in air flow as the damper assembly is opened. This facilitates control of airflow into and out of a building structure.

In particular, the rate of air flow when the damper assembly is 50% open, 60% open, 70% open, 80% open, 90% open, and 100% open increases substantially linearly such that a straight reference line representing air flow at each of said second operative positions can be drawn which preferably varies from each of the actual measured air flow rates by no more than 20% of the actual flow rate, more preferably varies from each of the actual air flow rates by no more than 15% of the actual flow rate, and most preferably varies from each of the actual air flow rates by no more than 10% of the actual flow rate. For example, if the actual air flow when the damper assembly is 50% open is 100 cubic feet per second, and the reference line indicates an air flow rate of 120 cubic feet per second, then the flow rate indicated by the reference line varies by 20% from the actual air flow rate.

In other embodiments of the invention, the rate of air flow increases in a more linear fashion than conventional damper assemblies when the damper assembly of the invention is 10%, 20%, 30%, and 40% open.

Figure 63:
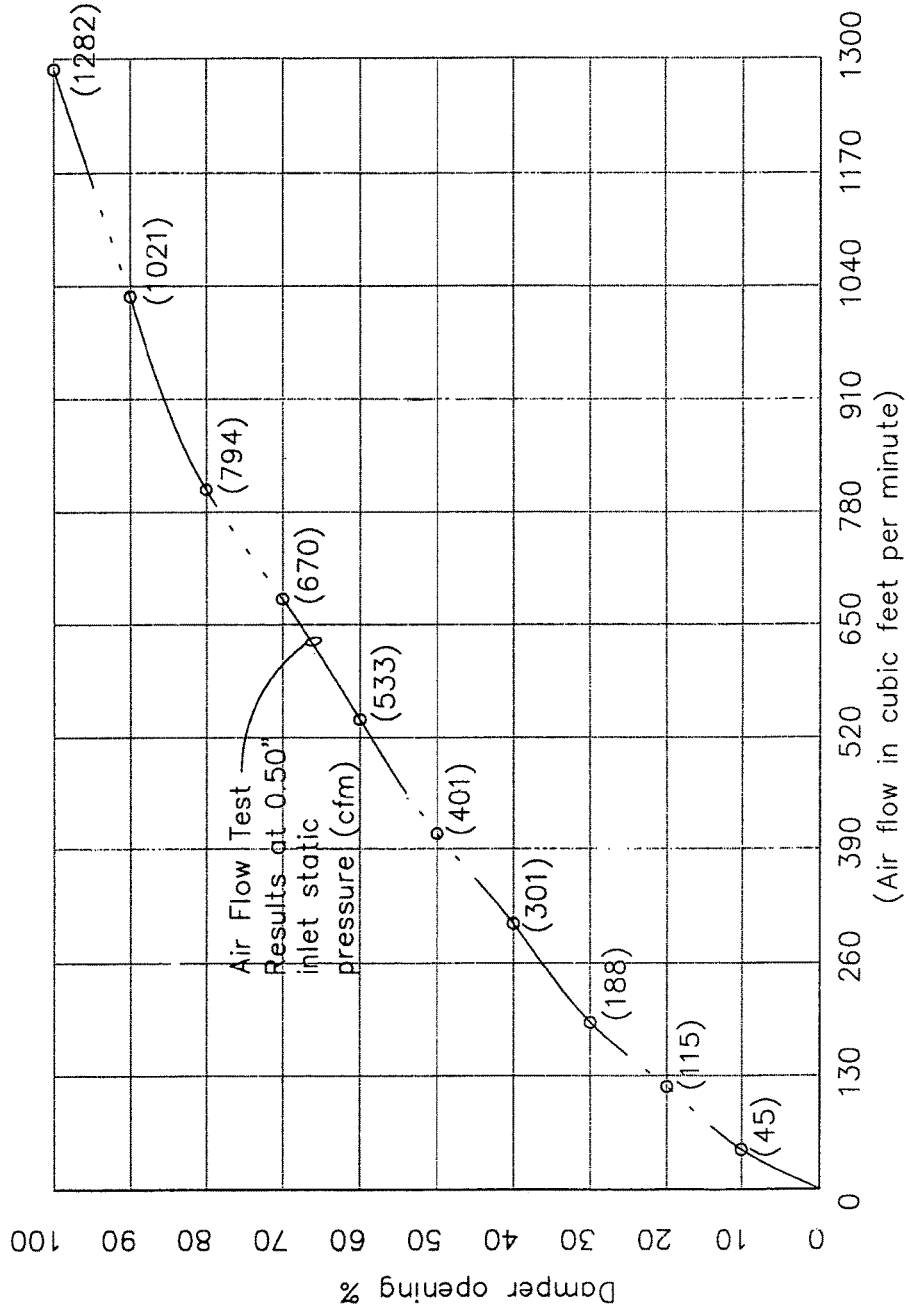

The graph of FIG. 63 illustrates air flow rates in a ten inch diameter by sixteen inch high damper assembly having the components illustrated in FIGS. 35 to 38 (along with a V-shaped damper blade assembly comparable to the one illustrated in FIG. 12). The air flow rates in FIG. 63 occur when an inlet static pressure of 0.50" is maintained while the damper assembly opens from 0% to 100%.

As would be appreciated by those of skill in the art, the cylindrical wall of the damper assembly of the invention can take on an hour-glass shape or other shapes which is symmetrical about a centerline and in which the same cross-sectional shape is produced by any vertical plane which extends through the vertical centerline of the wall. For example, in a "true" cylinder (i.e., a cylinder having the same diameter along its entire length), the cross-sectional area produced by such a vertical plane is in the shape of a rectangle, regardless of the points at which the plane enters the cylinder, passes through the centerline of the cylinder, and exits the cylinder. In a damper wall having an hour-glass shape, the cross-sectional area produced by such a vertical plane is in the shape of an hour-glass drawn on a sheet of paper, regardless of the points at which the plane enters the hour-glass shaped cylinder, passes through the centerline of the hour-glass shaped cylinder, and exits the hour-glass shaped cylinder. And, each such hour-glass cross-sectional area has an equivalent shape and dimension. If the cylindrical wall of a damper assembly has an hour-glass shape, the edge of a damper blade would, as would be appreciated by those of skill in the art, be concave and would generally conform to the inner surface of the wall as the damper blade moved through its arc of travel inside the damper assembly.

Having described my invention in such terms as to enable those skilled in the art to understand and practice it, I Claim:

1. An air circulation system comprising
   (a) a building structure;
   (b) an inlet air duct extending at least partially in said building structure;
   (c) an air outlet duct extending at least partially in said building structure;
   (d) a damper assembly interconnecting said air inlet duct and said air outlet duct and including,
      (i) a cylindrically shaped damper housing wall enclosing an inner space and having a top and a bottom,
      (ii) a first damper blade pivotally mounted inside said damper housing wall in said inner space and including a first blade edge adjacent and conforming to said damper housing wall,
      (iii) a second damper blade pivotally mounted inside said damper housing wall in said inner space and including a second blade edge adjacent and conforming to said damper housing wall,
      (iv) at least one air inlet opening formed in said damper assembly to receive air from said inlet air duct and to direct air into said inner space,
      (v) a first air outlet opening formed in said damper assembly to direct air into said air outlet said damper assembly including a scalloped edge,
      (vi) a second air outlet opening formed in said damper assembly to direct air into said air outlet duct;
   at least one of
      said damper housing wall, and
      said damper blades
   being rotatable between at least two operative positions;
   (e) a closed operative position in which said damper blades are in a closed position to prevent air from moving through said air outlet openings;
   (f) an open operative position wherein
      (i) said first damper blade has pivoted from said first closed operative position to said second open operative position to permit air from said inner space to flow through at least a part of said first air outlet opening, said part of said first air outlet opening having a cross sectional area, a total perimeter and an actual opening perimeter,
      (ii) said second damper blade has pivoted simultaneously with said first damper blade from said first closed operative position to said second open operative position to prevent air from flowing from said inner space into said second outlet opening,
      (iii) a portion of said first blade edge and a section of said scalloped edge collectively circumscribe said part of said first air outlet opening, said portion of said first blade edge extending across said first air outlet opening and having a first length, said section of said scalloped edge having a second length,
      (iv) said second length of said section of said scalloped edge comprises said actual opening perimeter,
      (v) said first length of said portion of said first blade edge and said second length of said section of said scalloped edge comprise said total perimeter of said part of said first air outlet opening,
      (vi) a first rectangular portion of said damper housing wall is exposed which,
         extends from said top to said bottom of said damper housing wall,
         includes said part of said first outlet opening,
         has an area collectively circumscribed by said first edge of said first damper blade, by a line tangent to said part of said first outlet opening and spaced apart from said first edge of said first damper blade, and by portions of said top and bottom of said damper housing wall,
      said first rectangular portion being exposed to air flowing through said damper assembly,
      (vii) a ratio of said area of said first portion of said damper housing wall to said total perimeter of said part of said first outlet opening is in the range of 1.0:0.6 to 1.0:1.4,
      (viii) a ratio of said cross sectional area of part of said first outlet opening to said outlet opening perimeter is in the range of 1.0:0.8 to 1.0:1.4,
      (ix) a ratio of said area of said first rectangular portion to said outlet opening perimeter is in the range of 1.0:0.5 to 1.0:1.1; and,
   (g) a fan directing air into said air inlet duct, through said air inlet opening, and into said inner space circumscribed by said damper housing wall.

2. The system of claim 1 wherein in said open operative position, said damper assembly is 50% open.

3. The system of claim 1 wherein in said open operative position, said damper assembly is 60% open.

4. The system of claim 1 wherein in said open operative position, said damper assembly is 70% open.

5. The system of claim 1 wherein in said open operative position, said damper assembly is 80% open.

6. The system of claim 1 where an amount by which said damper assembly is open is selected from a group consisting of 50% open, 60% open, 70% open, 80% open, and 90% open.

7. The system of claim 1 wherein when said damper assembly is moved from said open operative position to 40% open to 50% open to 60% open to 70% open to 80% open to 90% open, the rate of air flow increases substantially linearly such that a straight line representing air flow at each of said open operative positions can be drawn which varies from each of the air flow rates by no more than 20%.

8. The system of claim 7 wherein said straight line varies from each of the air flow rates by no more than 15%.

9. The system of claim 8 wherein said straight line varies from each of the air flow rates by no more than 10%.

10. An air circulation system comprising
    (a) a cylindrically shaped damper housing wall circumscribing an inner space and having a top and a bottom;
    (b) a first damper blade pivotally mounted inside said damper housing wall in said inner space and including a first blade edge adjacent and conforming to said damper housing wall;
    (c) a second damper blade pivotally mounted inside said damper housing wall in said inner space and including a second blade edge adjacent and conforming to said damper housing wall;
    (d) at least one air inlet opening formed in said damper housing wall;
    (e) at least one air outlet opening formed in said damper housing wall, said damper assembly including a scalloped edge, at least one of said damper housing wall and said damper blades being rotatable between at least two operative positions, (f) a closed operative position in which at least one of said damper blades and said damper housing wall is in a closed position to prevent air flowing into said inner space from said air inlet opening from moving through said air outlet opening, (g) an open operative position in which
- (i) said first damper blade has pivoted from said first closed operative position to said second open operative position to permit air from said inner space to flow through at least a part of said first air outlet opening, said part of said first air outlet opening having a cross sectional area, a total perimeter and an actual opening perimeter,
- (ii) said second damper blade has pivoted simultaneously with said first damper blade from said first closed operative position to said second open operative position,
- (iii) a portion of said first blade edge and a section of said scalloped edge collectively circumscribe said part of said air outlet opening, said portion of said first blade edge extending across said first air outlet opening and having a first length, said section of said scalloped edge having a second length,
- (iv) said second length of said section of said scalloped edge comprises said actual opening perimeter,
- (v) said first length of said portion of said first blade edge and said second length of said section of said scalloped edge comprise said total perimeter of said part of said air outlet opening,
- (vii) a first rectangular portion of said damper housing wall is exposed which,
  - extends from said top to said bottom of said damper housing wall,
  - includes said part of said air outlet opening,
  - has an area collectively circumscribed by said first edge of said first damper blade, by a line tangent to said part of said air outlet opening and spaced apart from said first edge of said first damper blade, and by portions of said top and bottom of said damper housing wall,
  said first rectangular portion being exposed to air flowing through said damper assembly,
- (viii) a ratio of said area of said first portion of said damper housing wall to said total perimeter of said part of said air outlet opening is in the range of 1.0:0.6 to 1.0:1.4,
- (viii) a ratio of said cross sectional area of said part of said air outlet opening to said outlet opening perimeter is in the range of 1.0:0.8 to 1.0:1.4,
- (ix) a ratio of said area of said first rectangular portion to said outlet opening perimeter is in the range of 1.0:0.5 to 1.0:1.1; and, (h) a fan directing air into said air inlet duct, through said air inlet opening, and into said inner space circumscribed by said damper housing wall.

11. The air circulation system of claim 1 wherein said form of said first portion of said damper housing wall is rectangular.

12. The air circulation system of claim 10 wherein said area of said first portion of said damper housing wall is rectangular.

* * * * *